Dec. 29, 1953    M. DEN HERTOG    2,664,467
CYCLIC PULSE CONTROLLED TELECOMMUNICATION
SELECTION SYSTEM
Filed June 30, 1950    20 Sheets-Sheet 3

Inventor
MARTINUS DEN HERTOG
By
Robert Harding Jr.
Attorney

Inventor
MARTINUS DEN HERTOG

Inventor
MARTINUS DEN HERTOG
By
Attorney

Dec. 29, 1953     M. DEN HERTOG     2,664,467
CYCLIC PULSE CONTROLLED TELECOMMUNICATION
SELECTION SYSTEM
Filed June 30, 1950     20 Sheets-Sheet 16

Inventor
MARTINUS DEN HERTOG

Dec. 29, 1953  M. DEN HERTOG  2,664,467
CYCLIC PULSE CONTROLLED TELECOMMUNICATION
SELECTION SYSTEM
Filed June 30, 1950  20 Sheets-Sheet 18

Inventor
MARTINUS DEN HERTOG

By *Robert Harding*
Attorney

Dec. 29, 1953 M. DEN HERTOG 2,664,467
CYCLIC PULSE CONTROLLED TELECOMMUNICATION
SELECTION SYSTEM
Filed June 30, 1950 20 Sheets-Sheet 19

FIG. 19.

| COMB | $P_a$ | $P_b$ | $P_c$ | TIME UNIT | COMB | $P_a$ | $P_b$ | $P_c$ | TIME UNIT | COMB | $P_a$ | $P_b$ | $P_c$ | TIME UNIT | COMB | $P_a$ | $P_b$ | $P_c$ | TIME UNIT | COMB | $P_a$ | $P_b$ | $P_c$ | TIME UNIT |
|---|---|---|---|---|---|---|---|---|---|---|---|---|---|---|---|---|---|---|---|---|---|---|---|---|
| 00 | 1 | 1 | 1 | 1 | 25 | 1 | 1 | 2 | 31 | 50 | 1 | 1 | 3 | 61 | 75 | 1 | 1 | 4 | 91 | | | | | |
| 01 | 2 | 1 | 1 | 2 | 26 | 2 | 1 | 2 | 32 | 51 | 2 | 1 | 3 | 62 | 76 | 2 | 1 | 4 | 92 | | | | | |
| 02 | 3 | 1 | 1 | 3 | 27 | 3 | 1 | 2 | 33 | 52 | 3 | 1 | 3 | 63 | 77 | 3 | 1 | 4 | 93 | | | | | |
| 03 | 4 | 1 | 1 | 4 | 28 | 4 | 1 | 2 | 34 | 53 | 4 | 1 | 3 | 64 | 78 | 4 | 1 | 4 | 94 | | | | | |
| 04 | 5 | 1 | 1 | 5 | 29 | 5 | 1 | 2 | 35 | 54 | 5 | 1 | 3 | 65 | 79 | 5 | 1 | 4 | 95 | | | | | |
| 05 | 1 | 2 | 1 | 7 | 30 | 1 | 2 | 2 | 37 | 55 | 1 | 2 | 3 | 67 | 80 | 1 | 2 | 4 | 97 | | | | | |
| 06 | 2 | 2 | 1 | 8 | 31 | 2 | 2 | 2 | 38 | 56 | 2 | 2 | 3 | 68 | 81 | 2 | 2 | 4 | 98 | | | | | |
| 07 | 3 | 2 | 1 | 9 | 32 | 3 | 2 | 2 | 39 | 57 | 3 | 2 | 3 | 69 | 82 | 3 | 2 | 4 | 99 | | | | | |
| 08 | 4 | 2 | 1 | 10 | 33 | 4 | 2 | 2 | 40 | 58 | 4 | 2 | 3 | 70 | 83 | 4 | 2 | 4 | 100 | | | | | |
| 09 | 5 | 2 | 1 | 11 | 34 | 5 | 2 | 2 | 41 | 59 | 5 | 2 | 3 | 71 | 84 | 5 | 2 | 4 | 101 | | | | | |
| 10 | 1 | 3 | 1 | 13 | 35 | 1 | 3 | 2 | 43 | 60 | 1 | 3 | 3 | 73 | 85 | 1 | 3 | 4 | 103 | | | | | |
| 11 | 2 | 3 | 1 | 14 | 36 | 2 | 3 | 2 | 44 | 61 | 2 | 3 | 3 | 74 | 86 | 2 | 3 | 4 | 104 | | | | | |
| 12 | 3 | 3 | 1 | 15 | 37 | 3 | 3 | 2 | 45 | 62 | 3 | 3 | 3 | 75 | 87 | 3 | 3 | 4 | 105 | | | | | |
| 13 | 4 | 3 | 1 | 16 | 38 | 4 | 3 | 2 | 46 | 63 | 4 | 3 | 3 | 76 | 88 | 4 | 3 | 4 | 106 | | | | | |
| 14 | 5 | 3 | 1 | 17 | 39 | 5 | 3 | 2 | 47 | 64 | 5 | 3 | 3 | 77 | 89 | 5 | 3 | 4 | 107 | | | | | |
| 15 | 1 | 4 | 1 | 19 | 40 | 1 | 4 | 2 | 49 | 65 | 1 | 4 | 3 | 79 | 90 | 1 | 4 | 4 | 109 | | | | | |
| 16 | 2 | 4 | 1 | 20 | 41 | 2 | 4 | 2 | 50 | 66 | 2 | 4 | 3 | 80 | 91 | 2 | 4 | 4 | 110 | | | | | |
| 17 | 3 | 4 | 1 | 21 | 42 | 3 | 4 | 2 | 51 | 67 | 3 | 4 | 3 | 81 | 92 | 3 | 4 | 4 | 111 | | | | | |
| 18 | 4 | 4 | 1 | 22 | 43 | 4 | 4 | 2 | 52 | 68 | 4 | 4 | 3 | 82 | 93 | 4 | 4 | 4 | 112 | | | | | |
| 19 | 5 | 4 | 1 | 23 | 44 | 5 | 4 | 2 | 53 | 69 | 5 | 4 | 3 | 83 | 94 | 5 | 4 | 4 | 113 | | | | | |
| 20 | 1 | 5 | 1 | 25 | 45 | 1 | 5 | 2 | 55 | 70 | 1 | 5 | 3 | 85 | 95 | 1 | 5 | 4 | 115 | | | | | |
| 21 | 2 | 5 | 1 | 26 | 46 | 2 | 5 | 2 | 56 | 71 | 2 | 5 | 3 | 86 | 96 | 2 | 5 | 4 | 116 | | | | | |
| 22 | 3 | 5 | 1 | 27 | 47 | 3 | 5 | 2 | 57 | 72 | 3 | 5 | 3 | 87 | 97 | 3 | 5 | 4 | 117 | | | | | |
| 23 | 4 | 5 | 1 | 28 | 48 | 4 | 5 | 2 | 58 | 73 | 4 | 5 | 3 | 88 | 98 | 4 | 5 | 4 | 118 | | | | | |
| 24 | 5 | 5 | 1 | 29 | 49 | 5 | 5 | 2 | 59 | 74 | 5 | 5 | 3 | 89 | 99 | 5 | 5 | 4 | 119 | | | | | |

Inventor
MARTINUS DEN HERTOG

By Robert Harding Jr.
Attorney

Dec. 29, 1953     M. DEN HERTOG     2,664,467
CYCLIC PULSE CONTROLLED TELECOMMUNICATION
SELECTION SYSTEM

Filed June 30, 1950     20 Sheets-Sheet 20

Inventor
MARTINUS DEN HERTOG

By
Attorney

Patented Dec. 29, 1953

2,664,467

UNITED STATES PATENT OFFICE 2,664,467

CYCLIC PULSE CONTROLLED TELECOMMUNICATION SELECTION SYSTEM

Martinus den Hertog, Antwerp, Belgium, assignor to International Standard Electric Corporation, New York, N. Y., a corporation of Delaware Application June 30, 1950, Serial No. 171,341

Claims priority, application France July 29, 1949

29 Claims. (Cl. 179—18)

1

The present invention relates to a selection system for electrical circuits or equipments, particularly, but not exclusively, for automatic telephone exchanges.

One of the features of the invention consists in an automatic telecommunication system comprising call detectors of subscribers' lines common to a group of lines and detecting the calls coming from lines of this group, means being provided in said call detector device to respond simultaneously to the indication of identity of several calling lines, non-numerical connecting devices being provided in order, under the control of said call detector devices, successively to connect each of the lines which are calling simultaneously.

Another feature of the invention consists in an automatic telecommunication system comprising incoming subscribers' lines and a call detector device common to several lines, devices associated with a group of lines being provided in order to produce electrical calling impulses corresponding to positions differently situated in time in accordance with a cycle of time units, one time unit being assigned individually to each of the lines of a group, arrangements being provided in the call detector to respond to any number of calling impulses coming from the corresponding calling lines, a group of non-numerical connecting devices being provided in order, under the control of a call detector device, successively to connect each of the lines which are calling simultaneously.

Another feature of the invention consists in a system of automatic telecommunication in accordance with the preceding feature in which the call detector device comprises means for retransmitting the calling impulses from a calling line to a non-numerical connecting device, which is arranged to select an incoming line in accordance with the position in the time cycle corresponding to the groups of calling lines, of a calling impulse transmitted to said non-numerical device by the call detector.

Another feature of the invention consists in an automatic telecommunication system in which arrangements are made in the call detector to retransmit impulses corresponding to all the lines which are calling simultaneously, a non-numerical connecting device being arranged to respond to one of the impulses of the calling lines which are transmitted to it by the call detector device and to connect the corresponding calling line.

Another feature of the invention consists in

2 an automatic telecommunication system, in which the call detector device is arranged to make connection successively to several non-numerical equipments, and successively to control the setting of said non-numerical equipments by means of calling impulses from several lines which are calling simultaneously.

Another feature of the invention consists of an automatic telecommunication system comprising register controllers which are associated with non-numerical devices, and are put in operation before the associated non-numerical devices are connected to a calling line, arrangements being provided to effect the connection of a call detector to a free non-numerical device having access to a free register-controller or vice versa.

Another feature of the invention consists in an automatic telecommunication system in which the operation of a final selector, in order to effect the connection to a desired line, is stopped at the very moment in which the desired line makes a call.

Another feature of the invention consists of an automatic telecommunication system in accordance with the preceding feature in which direct connections to a line which is calling and is called simultaneously are made under the control of electrical impulses in accordance with a cycle of time impulses each of which identifies a different line in a group, the impulses employed to control on the one hand the connection to a calling line, and on the other hand the connection to the same line when it is called, having substantially the same time unit, the impulse corresponding to the calling line being slightly ahead of the impulse corresponding to the same line when called, means being provided so that the devices actuated by the calling line impulse prevent the wanted line impulse from being effective.

Another feature of the invention consists of an automatic telecommunication system comprising register controllers and also a selection system composed of a common control device associated with a certain number of individual selector switches, devices being provided so that several register controllers, seized in order to establish different connections, may be successively connected and simultaneously connected to a common control device, means being provided so that each register controller can, when it is connected to the common control device, take part in the selection control operations between the said control device and the said register controllers.

Another feature of the invention consists of an automatic telecommunication system comprising selector equipment and register controllers, a selection being made by co-operation of a common control device and a register controller among several which are simultaneously associated therewith, means being provided under the control of a common control device, to place in suspense the other register controllers which are simultaneously connected, means also being provided to set in position, in accordance with the operated selection, one of the individual associated selector switches, and means finally being provided, in order immediately to resume the operations for control of selection between the common control device and the remaining register controllers, when said individual selector switch has been set.

Another feature of the invention consists of an automatic telecommunication system in which the common control device comprises means for sending selection control signals to the register controllers, each signal completely identifying an outlet of the individual associated selection switches.

Another feature of the invention consists of an automatic telecommunication system, comprising sources of control signals associated with the common control device and provided in order to transmit a series of electrical impulses corresponding to successive time units in accordance with a cycle of time units, each unit characterising a particular outlet.

Another feature of the invention consists of an automatic telecommunication system in which each register controller comprises means for detecting an electrical impulse corresponding to a particular time unit and for returning an impulse to the selection device in a time unit having a particular time relation with the detected impulse, arrangements being provided in the selection device to respond to said returned impulse and to determine its relation in time with the corresponding impulse which has been transmitted, the setting of an individual selector switch being controlled by devices corresponding to said revertive impulse.

Another feature of the invention consists in an automatic telecommunication system in accordance with the preceding feature, comprising devices in order, under the control of means responding to the revertive impulse, for terminating the transmission of other impulses to the register controllers, the particular time relation between an impulse detected by the register controller and the returned impulse being such that the impulse which has to be transmitted immediately after the detected impulse, and also the following impulses, are suppressed.

Another feature of the invention consists of an automatic telecommunication system comprising a test device in each register controller to effect a test on a circuit terminating in the common control device after the detection of an impulse by a register controller, this test device being such that after two or more registers respond to the same impulse, the device of one of them operates alone, the other register or registers which have responded to the impulse being automatically restored to the position for control of selection and remaining in suspense for other selection operations in combination with the common control circuit.

Another feature of the invention consists of an automatic telecommunication system comprising call detector devices associated with the incoming subscribers' lines, call finders and final selectors associated with the same common control device, and register controllers, said call detector device, as also the said common control circuits, being provided to handle simultaneous calls.

Another feature of the invention consists of an automatic telecommunication system comprising several circuits between a detector device and a common control device for transmitting blocking impulses corresponding to the calling lines from the detector circuit to the common control circuit, for the purpose of stopping the final selection operation of the common control circuit provided for the selection of said lines, means being provided to send impulses characteristic of the calling lines of the detection device to the common control circuit for the purpose of controlling the line-finder and to send a revertive impulse from the common control circuit to the detector device in order to block the impulses from the calling lines during the operation of a line finder; circuits being provided between the common control devices and the register controllers on the one hand for the transmission of line impulses from the common control device to the register controllers, and on the other hand for the transmission of blocking impulses from a register controller to a common control device when a line impulse has been selected, in order to prevent the transmission of other line impulses while an individual switch of the final selector is actuated.

Another feature of the invention consists of an automatic telecommunication system, in which the line finders and the final selectors are composed of multi-switches with individual switches, each individual switch having a control circuit common to the assembly of switches of a multi-switch, and peculiar to said multi-switch, and each call detector circuit comprising an individual switch of a multi-switch giving access to register controllers, each multi-switch associated with the call detectors having a control circuit common to the assembly of switches of a multi-switch and peculiar to said multi-switch, arrangements being made so that each register controller is associated with an individual switch forming part of a multi-switch giving access to cord circuits provided for conversation and inserted between the line finders and the selectors, each multi-switch associated with register controllers having a control circuit which is peculiar to it and common to the assembly of the individual switches of which it is composed, the operation of an individual switch of a register controller being controlled from the call detector equipment.

Another feature of the invention consists of an automatic telecommunication system in which the switches of the call detector give direct access to the cord circuits of which the free condition is tested by the means of circuits associated with the register controllers, said circuits thus making it possible to test the availability of the register controllers.

Another feature of the invention consists of a system of automatic telecommunication comprising means for rendering busy all the non-numerical devices (or register controllers) which have access to the same register controllers (or non-numerical devices) as the non-numerical device (or register controller) selected until a free register controller (or non-numerical equipment) is individually seized for use and connected to the selected non-numerical device (or register controller).

Various other features will appear from the following descritpion given as a non-limitative example with reference to the attached drawings which on the one hand show simplified diagrams, and on the other hand, detailed circuits of a central office with 100 lines making use of the characteristics of the invention.

Figures 1–16 are linked up.

Fig. 19 shows a table indicating the method of employing the impulses of Fig. 18 to control the selections.

Figure 1:
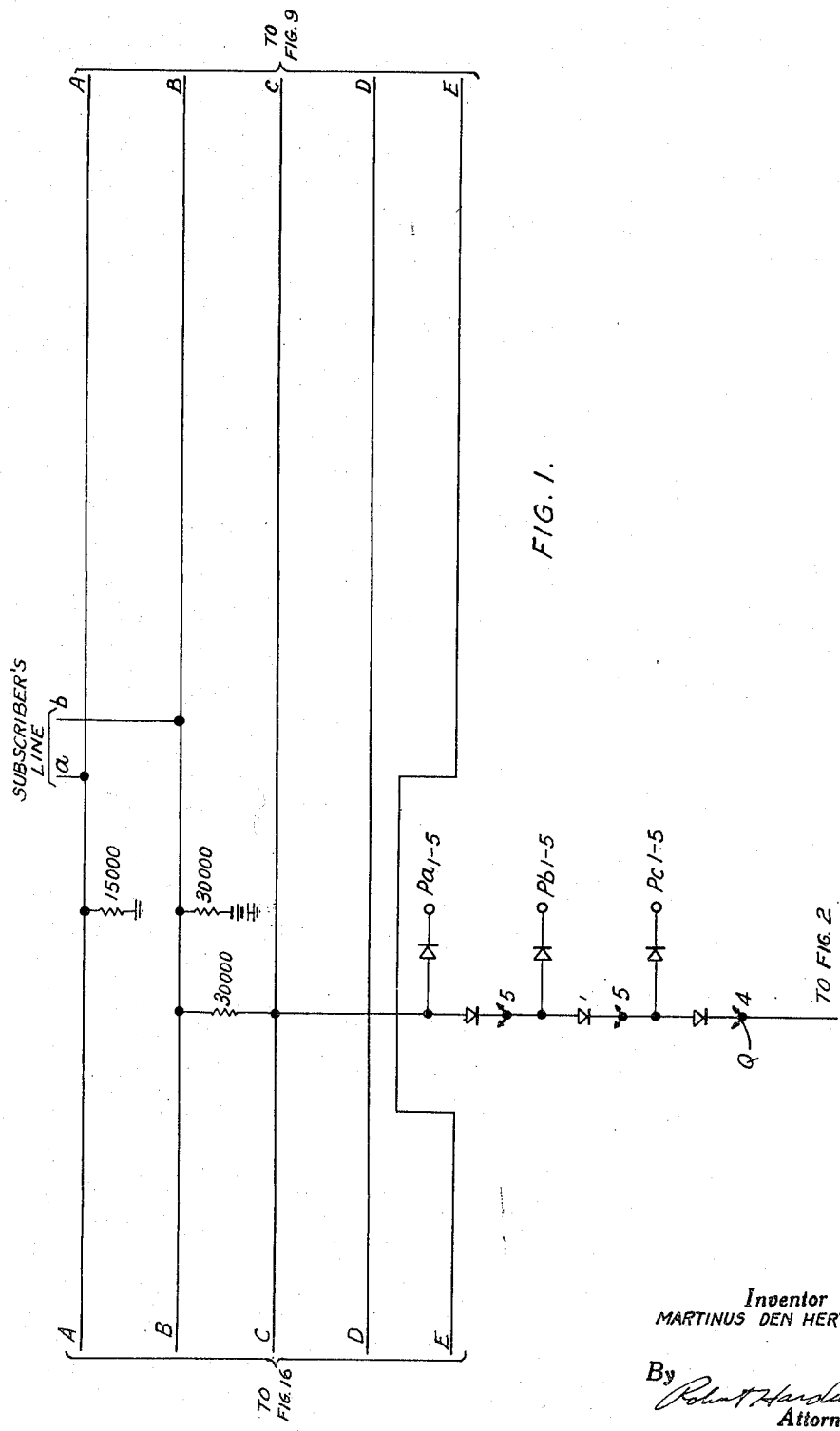
Fig. 1 shows a circuit associated with a subscriber's line for an exchange with 100 lines.

The system is provided in such a way that the line finders and the selectors operate under the control of similar members; thus, the first line finders and the final selectors employ the same common control circuit.

In order to simplify the circuits and the description as much as possible only an exchange with 100 lines has been described; it is obvious that central offices of larger capacity will require one or more additional selection stages, and in certain cases, a second stage of line finders. The group selectors and the second line finder will operate in a similar manner and will employ the same common control switch.

To further simplify the drawings the multi switches which are of the cross bar type, used in the embodiment described are shown in a "detached contact" format. Thus the operating magnets for both horizontal and vertical bars are shown as integral parts of the circuits in which they occur, while the set of contacts which are closed when a particular pair of magnets are energised are shown detached from these magnets.

Although for reasons of simplicity the description of the selection operations has been restricted merely to control by the tens and units digits, equipments have also been illustrated and described which only become necessary when exchanges with more than 100 lines are provided, this being done in order to show how it is possible by means of the present invention, to solve the problems which arise in large exchanges. For example, although a single call detector can handle all the calls coming from a group of 100 lines, I shall describe the arrangements provided to handle calls received in several call detectors, and in order to explain certain characteristics of the invention, I shall also describe circuits which are only necessary in an exchange with several thousand lines. The description of a line finder equipment and an additional selection equipment would add nothing to the understanding of the present invention, and in order to avoid an unnecessarily long and complicated description which would become too involved, the description of the selection equipment has been reduced to the simplest case.

The line finders and the final selectors have a capacity of 100 lines and the subscriber's line circuits are accordingly divided into groups of 100 lines. In the example described there is only one group of 100 lines. The subscribers' lines of which the numbers only differ in the tens or units digits consequently belong to the same group of finders and final selectors which make up the switches of a multi-switch provided for 100 lines.

The subscribers' lines are served by call detectors associated with cord circuits. A certain number of individual switches act as cord finders and a certain number of these cord finders constitute a multi-switch and have access to a group of cord circuits multiplied on said multi-switch.

The number of cord finders, each associated with a call detector, and together forming a multi-switch, is a function of the traffic.

Figure 12:
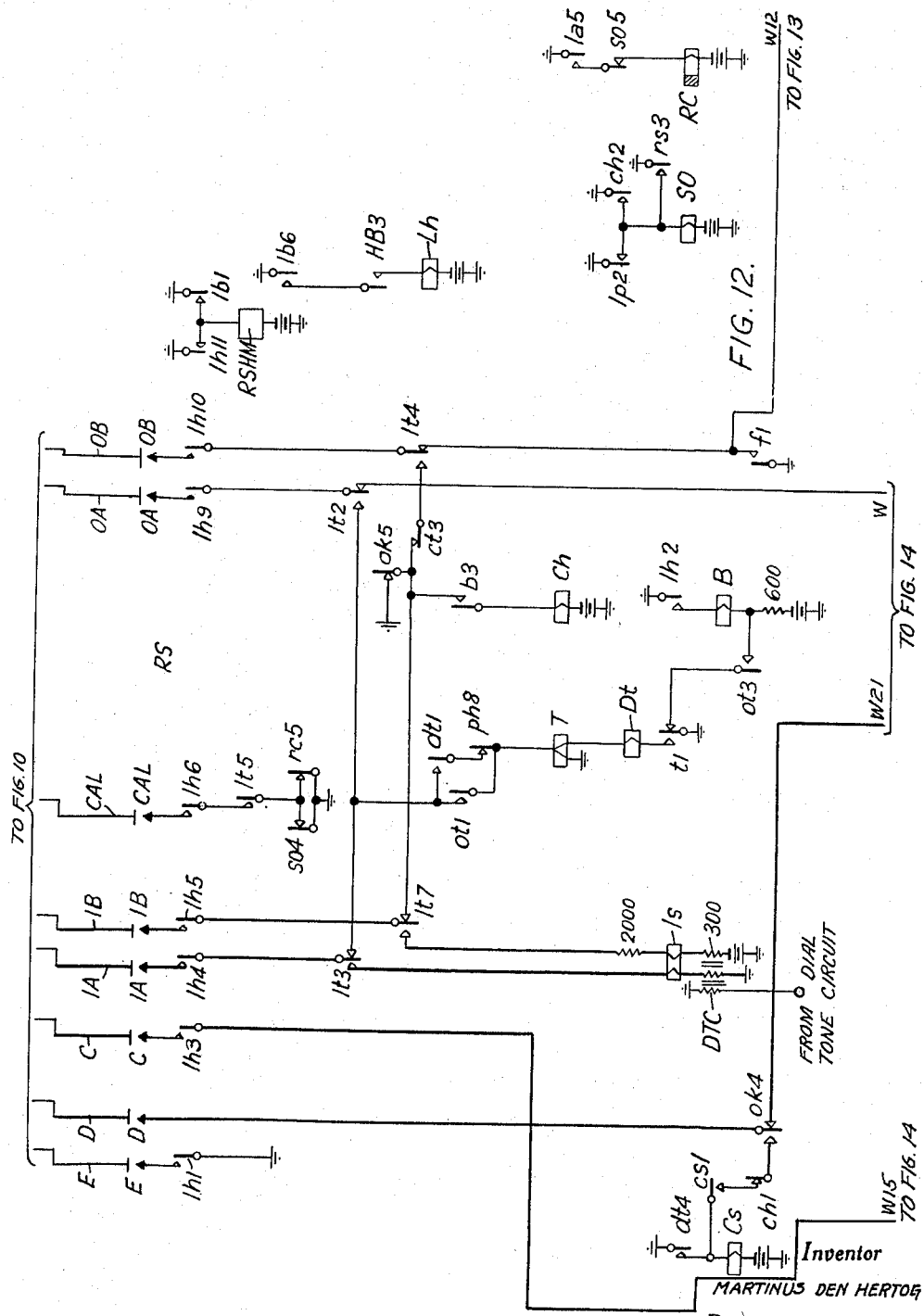
Figs. 12, 13, 14 and 15 show the circuit of the register controller.

A certain number of register controllers are associated with the cord circuits by means of a multi-switch RS (Fig. 12). A common control switch is provided for a group of register-controllers using the same multi-switch. When a cord circuit is selected by a call detector circuit, it is possible to ensure that the selected cord circuit has access to a free register by extending the test circuit of each cord circuit through the common control circuit or circuits controlling the register circuits associated with the cord circuit as far as the associated register-controllers.

All the selection and discrimination operations employed in the control of the switches and interconnections are controlled by means of electrical impulses situated in time in accordance with cycles of impulses, which vary in duration according to the operation to be carried out, but which are all obtained from several sources of electrical impulse cycles; the relation between said cycles being such that each impulse of a second cycle has a duration equal to the complete duration of a first cycle and each impulse of a third cycle has a duration equal to the complete duration of the second cycle, and so on. By employing combinations of impulses belonging to a certain number of such sources, a cycle of resultant impulses is obtained made up of the impulses of the first cycle, said resultant cycle comprising a number of impulses equal to the product of the number of impulses contained in each of the cycles; thus, for example, cycles comprising 6, 5 and 4 impulses give a resultant cycle of 120 impulses.

Figure 18:
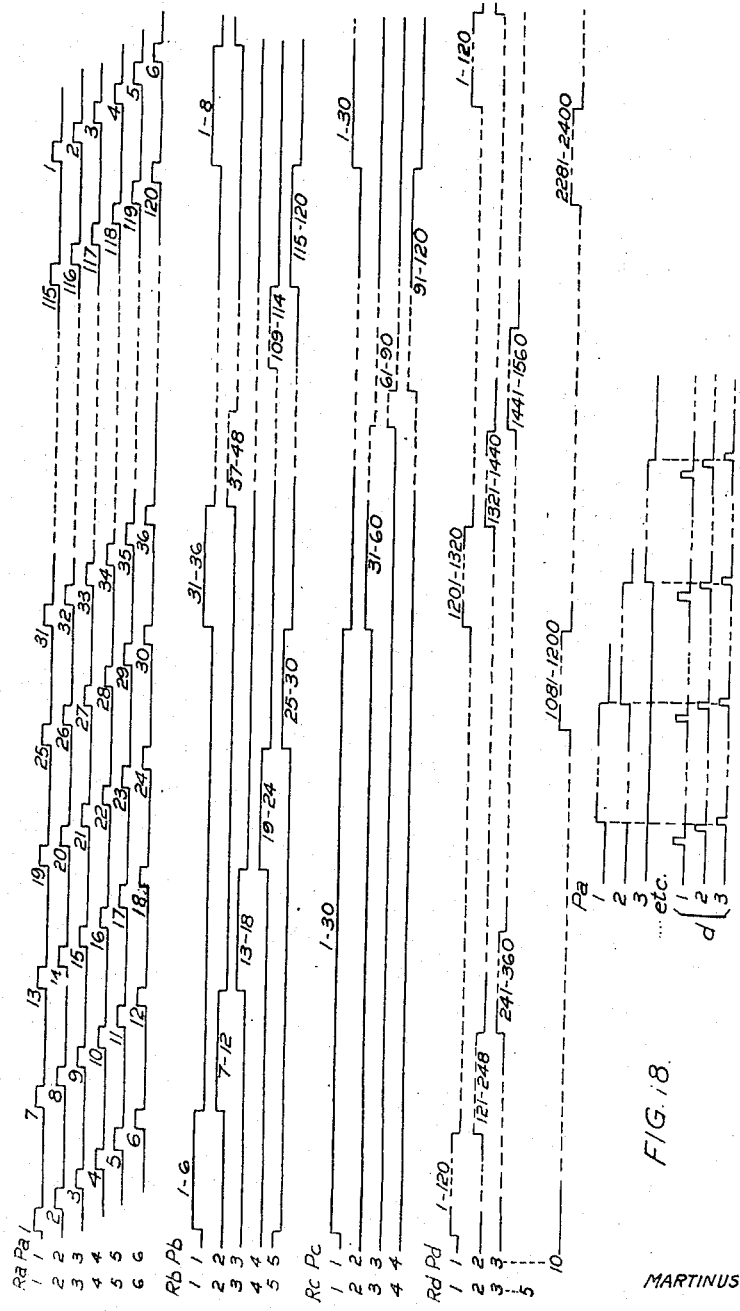
Fig. 18 shows a diagram of the cycles of time impulses employed to control the selection.

Fig. 18 shows the diagrams of the impulses produced by the different sources, said impulses being employed as time bases in order to obtain a 12,000-element code.

Two main groups of impulse sources have been provided; the first are designated by the references Pa, Pb . . . and the others by Ra, Rb . . . ; the principal difference between these two groups of impulse sources lies in their difference of potential. The sources P are always intended to be inserted in the grid circuit of an amplifier tube, and their potentials have been determined accordingly. The sources R are always provided in order to be applied to the control electrodes of the cold cathode tubes, and their potentials have been adapted to the operative conditions of said devices.

Each of the groups Pa . . . Ra comprises 6 sources supplying impulses displaced with respect to each other so that the impulse produced for each of the sources comes after that of the preceding source. Thus the 6 sources supply an impulse during 6 consecutive time units in a periodic cycle. The length of each of these impulses corresponds to the duration of the time unit on which the whole system is based, and in the following will be taken as the unit of time.

Each of the two groups Pb and Rb comprises 5 sources supplying an impulse for five consecutive time units in accordance with a periodic cycle. The length of each of these impulses corresponds to 6 time units of the sources Pa and Ra and their period to 30 time units of the same sources.

Each of the two groups Pc and Rc comprises 4 time impulse sources, the length and period of which respectively correspond to 30 and 120 time units of the sources Pa and Ra.

The group Pd comprises 10 sources of which the impulses correspond to 120 time units of the sources Pa and Ra and the period to 1200 time units. These 10 sources, like those of the other groups, produce time impulses displaced with respect to each other so that the impulse produced for each of the sources comes after that of the preceding source.

Five sources Rd have been provided which are identical with sources Pd1 . . . 5 with regard to the characteristics relating to time.

Fig. 18 also shows the relation between the source Pa and the three detector sources d1, d2 and d3. The detector sources d1 and d2 transmit impulses which are within the corresponding impulse Pa, even when said impulse is shortened. The detector source d3 which corresponds to d2 transmits an impulse at the beginning of the next transmission period of the basic source Pa.

The sources of the three first types, that is, Pa, Pb and Pc are employed to control the transmission of a signal made up of a time impulse, and the detection of a signal made up in the same manner. The simultaneous use of any three sources of different types makes it possible to obtain 6×5×4=120 different time signals. At the transmitting end, these 120 time signals are used to scan 100 outlets and 20 additional indications which may be associated temporarily with said circuits in any desired way. In order to permit the scanning of the 100 outlets, said circuits have been distributed over the 120 time units in such a way that the five first units only are used for scanning the circuits, in each of the successive groups of 6 time units 1 . . . 6, 7 . . . 12, . . . , while the last time unit is not used for this operation. In other words, the sources of periodic impulses Pa1 . . . 5 are employed for scanning the 100 outlets, while the source of periodic impulses Pa6 is not used for this purpose. Consequently, the source Pa6 will be successively used to scan the 20 remaining electrical conditions during the 20 impulses sent by said source in a period of 120 time units.

At the receiving end, the impulses are received after having been displaced by one time unit, by reason of the successive use of the detector impulses d2, d3 for the transmission and reception of the impulses, an impulse transmitted in time unit No. 1 being received in time unit No. 2, etc. Consequently, the impulses transmitted during the five first time units of each group of 6 time units will be received during the five last time units of each of said groups. The sources Ra2 . . . 6 will thus be employed when the impulses characterising the 100 outlets, and which are transmitted by means of sources Pa1 . . . 5, are received. The impulse source Ra1 is only used exclusively when the twenty special indications previously mentioned are received, which are transmitted by means of source Pa6.

Sources Pd1 . . . 10 are used to associate a particular group indication with each of the outlets, thus in the case of outlets of a group selector, these sources are used to characterise the group of said outlets.

Fig. 19 is a table showing the arrangement of transmitting sources Pa . . . Pc in combination with three stages of gates supplying impulses to the register controllers. The table shows the sources which must be employed for the gates associated with each outlet. This table also indicates the time unit in which an impulse must be sent for each of the outlets.

Each of the multi-switches used in the system comprises a certain number of horizontal bars, each of which may be regarded as representing an individual switch capable of handling a call like a single-motion switch of a well known type. 100 outlets have been provided, accessible to all the individual switches and common to said switches.

When a vertical bar and a horizontal bar have operated successively, a certain number of contacts placed at the points of intersection of these bars are closed, the individual switch being connected through said contacts to the circuit concerned. In the switch shown these contacts are five in number, the five contacts placed at one of the points of intersection being designated by A, B, C, D, E. On one side of these contacts, are shown the connections terminating in the outlets which can be reached through the vertical bar concerned; on the other side are shown the connections associated with the individual switches. The 100 outlets are divided up into two groups of 50, 50 co-ordinate points being provided between each horizontal bar and the vertical bars and comprising two series each of five contacts. Each vertical bar is associated with an individual operating magnet, the energisation of said magnet actuating the bar upwards. One horizontal bar is provided for each of the $x$ individual switches making up the multiswitch; there is one individual horizontal magnet for each switch and two horizontal servo-magnets common to all the switches. The operation of an individual horizontal magnet does not actuate the corresponding horizontal bar, but the operation of a horizontal servo-magnet followed by one of the horizontal servo-magnets actuates the corresponding horizontal bar to the left or to the right to close one or other of the series of contacts at the co-ordinate point determined by the vertical bar and the horizontal bar which have operated.

Although the line finders of the selector and the final selector are, as described above, 100-point switches and employ horizontal servo-magnets to select between two sets of 50 outlets; the multi-switches CCS (Fig. 2) and RS (Fig. 12) respectively provided between the call detector circuits and the cord circuits and between the register controllers and the cord circuits do not require so large a number of outlets, and furthermore do not require horizontal servo-magnets; the individual horizontal magnets directly control the horizontal bars, as is the case with the multi-switches normally used.

A call detector, common to 100 subscribers' lines, can regenerate the impulses produced by a call on any number of these lines, so that an impulse characterising the identity of each of the calling lines is regenerated.

When two or more lines are calling at the same time, the call detector in co-operation with its common control circuit, seizes a free cord circuit and a free register circuit and causes their connection to one of the calling lines, after which it seizes another free cord and another free register and connects them to the next calling line etc. The calling lines are connected haphazard in the order of arrival of the impulses characterising the identity of each line; the line whose impulse first reaches the common control circuit of the line finder, after connection to a register, is the first to be connected.

The common control circuit, which is common to a certain number of call detector circuits associated with a group of cords can, by electronic means, simultaneously accomplish the hunting of a free cord circuit for any number of call detectors served by it.

If we assume that two or more call detectors in a group are simultaneously hunting a free cord, the common control circuit, after having found a cord circuit, will allocate it to one of the calling call-detectors. This allocation of free cord to the call-detector circuit takes place haphazard and by electronic means.

As soon as one of the call detectors has been connected to a free cord, as has just been described, the common control circuit hunts for another free cord for another call detector which is waiting.

When the subscriber's loop is opened (Fig. 1), the negative terminal of a 48 v. battery is connected on the one hand to wire B through a 30,000 ohm resistance, the wire B being on the other hand connected to the wire C through another 30,000 ohm resistance. Wire C is also connected to three rectifier cells, the other ends of which are applied to such a potential that these rectifier cells are rendered non-conductive when the line is not busy, no current then flowing through the rectifier cell system to the call detector.

These rectifier cells are arranged to act as gating circuits. The positive pole or terminal of a controlled rectifier cell is normally connected over a low resistance to a relatively negative potential when it is in its low resistance condition, but at the appropriate time position for it to assume its high resistance condition it is connected to a relatively positive potential. These potentials are obtained from the timed pulse sources, and in the circuit shown the relatively negative potential is —40 volts and the relatively positive potential is —16 volts. Each individual subscriber's line is connected via an assembly including three such rectifier cells to the call detector. The arrangement is such that all three rectifier cells individual to a particular subscriber's line have their positive ends brought to the relatively positive potential at a time position individual to that line. Then and only then can the subscriber's line influence the call detector.

When the line loop is closed, when the subscriber removes his receiver, a current flows in the following circuit: earth, 15,000-ohm resistance wire A, subscriber's line loop, wire B, 30,000-ohm resistance, battery. The potential of the wire B is then brought to about —16 v. The exact value of the potential on the wire B depends upon the resistance of the subscriber's loop.

Figure 2:
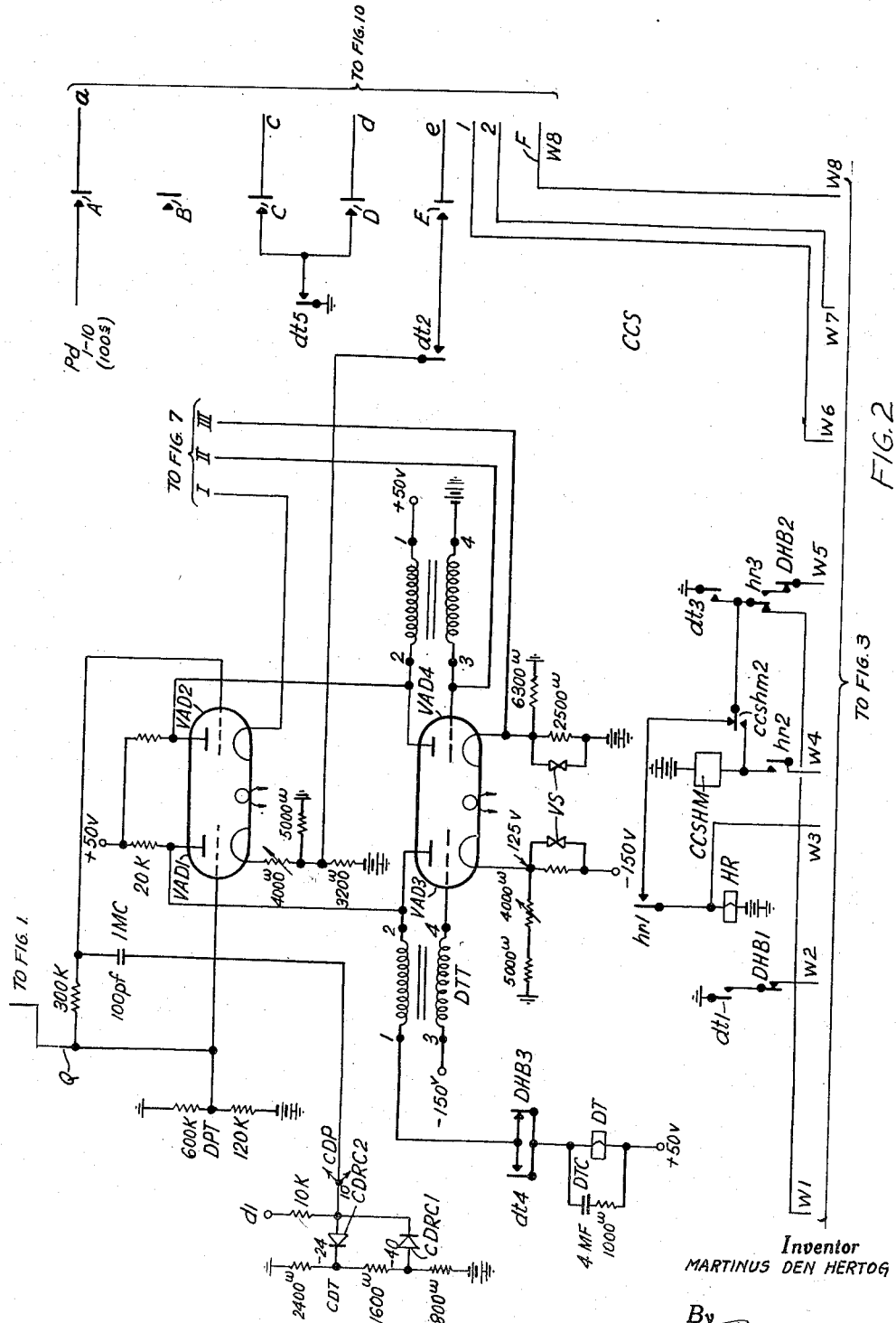
Fig. 2 shows a call detector circuit common to a plurality of subscribers' lines. A multi-switch composed of a plurality of switches is provided to connect the call detector circuits to the cord circuits.

The potential of the wire B now makes it possible, on principle, for a current to be established from the wire B, through the rectifier cells connected in series with the wire Q terminating on the grid circuit of the tube VAD1 (Fig. 2). Said grid circuit is held at a potential of —40 v. by means of potentiometer DPT, so that the required cells then become conductive. Moreover, by means of three successive stages of rectifier cells connected on the one hand to the wire terminating in the call detector (Fig. 2) and on the other hand, to the sources of current $Pa1 \ldots 5$, $Pb1 \ldots 5$, $Pc1 \ldots 4$, this current is prevented from being established in certain time units between the wire B and the call detector circuit.

These sources are normally at the potential of —40 v., but this potential may be raised in different time units, to —16 v. The current can only be established and maintained to the call detector when said sources are all brought to the potential of —16 v. On the other hand, when one of said sources of potential is maintained at —40 v., it is the last potential which is effectively connected through the rectifier cells to the wire leading to the call detector; thus, this wire, maintained at —40 v., does not pass any current to the call detector, and the difference of potential between the wire B and the wire leading to the call detector is absorbed in the 30,000 ohm resistances connecting them. The branching of the rectifier cells which has just been described acts as a gate by means of which the current flowing on the wire leading to the call detector can be suppressed.

The first of these rectifier systems is special to each line and connected to one of the five sources $Pa1 \ldots 5$. These sources are each maintained at a potential of —16 v. during one of the five consecutive time intervals, each source during a different time interval, while the impulses of each source are reproduced, with five time intervals between them, during which the potential of the source is —40 v.

The period of the impulses of each source corresponds to 6 time units, source $Pa1$ being maintained at —16 v., during time unit No. 1, source $Pa2$ during time unit No. 2, etc., until source $Pa5$ is maintained at the potential of —16 v. in the time unit No. 5 for a group of 6 time units. During the 6th time unit of each recurring interval, none of the sources Pa1 ... 5 is maintained at −16 v., but a 6th source Pa6, which is not shown in this circuit, is maintained at −16 v.

The 100 lines of a group are divided into 20 groups of five lines; in each group of five lines the systems of rectifier cells are connected to the various sources Pa, that is: those of the first line of each group to source Pa1, those of the 2nd line to source Pa2, etc., and those of the 5th line of each group to source Pa5.

The five lines of each group are connected through a first rectifier cell system, special to each line, with a second rectifier cell system connected in series, said rectifier cell system being common to each group of five lines. Twenty of said rectifier cells are thus provided for 100 lines.

These twenty rectifier cells are divided into four groups of five. In each group of five, the rectifier cell system is connected to one of the sources Pb1 ... 5, that is, the first of each group to source Pb1, the second of each group to source Pb2, etc., and the 5th of each group to source Pb5.

The sources Pb1 ... 5 are maintained at a potential of −16 v. during one of the five consecutive time units, each of these time units corresponding to 6 time units of the sources Pa, and coinciding with one of the cycles Pa1 ... 6. This occurs for each source in different time units, that is, for source Pb1 during time units 1 ... 6, for source Pb2 during time units 7 ... 12, etc., and for source Pb5 during time units 25 ... 30. During the time intervals elapsing between the impulses of each source, which correspond to 24 time units, the sources of potential are at −40 v., and it is easy to see that the period of recurrence of the impulses of the sources of potential Pb is 30 time units.

Each of the second groups of rectifier cells is connected to a common point, which itself is connected to a third system of rectifier cells. Said system of rectifier cells is common to one of the four preceding groups, that is, to a group of 25 lines.

There are thus four of said third rectifier cell systems, which are each respectively connected to one of the four sources Pc1 ... 4.

Sources Pc1 ... 4 are brought to the potential of −16 v., each during a different time interval among four consecutive time intervals; each of these time intervals corresponds to 30 time units and coincides with one of the cycles of the sources Pb1 ... 5, that is: for source Pc1 during the time intervals 1 ... 30, for the source Pc2 during the time intervals 31 ... 60, for the source Pc3 during the time intervals 61 ... 90, for the source Pc4 during the time intervals 91 ... 120. Each of the sources is brought to −40 v. during an interval lasting 90 time units. The period of recurrence of the impulses from the sources correspond to 120 time units.

The four sets of rectifier systems which have just been described are connected by means of a single wire Q, to the call detector circuit.

The operation of the system will now be explained. When one line is calling, the wire Q, terminating on the call-detector, is maintained at −40 v., except during that time unit which is characteristic of the identity of the calling line; during this time unit the potential of the wire Q terminating on the call detector is about −16 v. During this time unit none of the branch rectifiers associated with the calling line are conductive, owing to the fact that the sources of potential connected thereto are at the potential of −16 v. This occurs for each of the 100 lines forming the same group, during a different time interval, so that by determining the time unit in which the impulse of −16 v. is transmitted to the call detector, the identity of the calling line is determined.

As has previously been explained, a call on one of the lines of the group is characterised by an impulse on the common wire Q connecting the 100 subscribers' lines to the call detector, this impulse being repeated once every 120 time units, during the particular unit permitting the identification of the tens digit and the units digit of the calling subscriber's number.

These impulses are applied to the grids of two amplifier tubes VAD1 and VAD2, in the call detector circuit. The grids of the two amplifier tubes are normally maintained at the potential of −40 v., by a potentiometer DPT made up of two resistances of 600,000 ohms and of 120,000 ohms. These amplifier tubes, which are combined to form a double triode, control respectively impulse regenerator tubes VAD3, VAD4, said tubes forming a second double triode.

The first of these impulse regenerators VAD3 is used to energise the relay DT, each time that a line is calling. This relay prepares all the subsequent operations necessary to connect a free cord circuit and a free register circuit to the calling line. Relay DT is, moreover, employed as a line relay common to a group of 100 lines served by a call detector.

The second impulse regenerator transmits, for each impulse received from the calling line, a fresh impulse which is a little shorter than the original impulse and a little retarded in relation to the normal time unit of the original impulse. These impulses are used for the selection of the calling line by a line finder, as will be described later.

An impulse from a calling line through the common wire Q is directly transmitted to the grid of the left-hand amplifier tube VAD1, the grid of which is normally biassed in such a way that this tube is blocked in the absence of impulses. The grid of the left hand regenerator tube VAD3 is also biassed so that no current flows through either of the two windings of the transformer DTT, or through said tube. The impulse brings the grid of amplifier tube VAD1 to a more positive potential; current then flows in the anode circuit and the potential of the anode becomes more negative on account of the relative values of the resistances connected in series in the cathode and anode circuits. This potential variation is transmitted to the anode of the regenerator tube VAD3, thus causing the flow of current in the primary winding of transformer DTT. Current then flows in the secondary winding of said transformer DTT and the grid of the regenerator tube is brought to a more positive potential. If the difference of potential is of sufficient amplitude to cancel the effect of the grid bias, the generator is triggered off. The anode current begins to flow through the anode winding of transformer DTT, thus making the grid more positive; the process is cumulative and the anode current increases. Thus, almost immediately the grid potential is brought above the cathode potential, a relatively powerful grid current begins to flow, restricting a subsequent increase of the grid potential. At this moment, the anode and grid current begin to decrease, the latter more quickly than the former, so that the difference between the number of the ampere-turns in the winding of the transformer inserted in the grid circuit and the number of ampere-turns in the winding inserted in the anode circuit continue to increase.

After a period, the duration of which to a great extent depends on the self-inductance of the windings of the transformer and the anode resistance of the tube, the grid current is again brought to 0. From this moment any decrease of anode current produces by induction a reduction of the grid potential which in turn produces a fresh reduction of the anode current. The tube is thus rapidly blocked and thus remains in a stable condition until a fresh trigger impulse is received.

In this way, a rectangular impulse is produced, the amplitude and duration of this impulse depending neither on the amplitude nor shape of the triggered impulse.

The type of transformer used and the value of the other elements of the circuit are such that in accordance with the method described, an impulse lasting approximately 10 milliseconds is applied to the winding of the relay DT which is connected in series with the anode winding.

With a time basis giving 5,000 impulses per second, a time unit has a duration of .2 millisecond, and the impulses produced by the calling line are reproduced every 24 milliseconds corresponding to 120 time units. Relay DT is maintained operative for each period of 24 milliseconds by the discharge of the 4 mf. condenser DTC, which is charged during each impulse of 10 milliseconds; thus relay DT remains operative as long as impulses are arriving from the calling line, provided that its energising circuit is closed.

The impulses arriving through the wire Q of any calling line are not directly transmitted to the grid of the right hand amplifier tube VAD2; they are transmitted through a 300,000 ohms resistance. This grid is connected through a low capacity condenser IMC to a point CDP, common to a group of call detectors: said common point is connected by means of two rectifier cells CDRC1, CDRC2, to a potential divider device CDT, in such a way that said common point can neither become more negative than —40 v. nor more positive than —24 v. Its potential is determined by a source $dl$, which is connected to the common point through a 10,000 ohms resistance, the characteristics of which source are shown in Fig. 18. Normally, this source is relatively negative, and supplies short, relatively positive impulses towards the end of each impulse Pa. The potential limiter prevents the variations of potential, produced on account of the connection of this impulse source to the grid amplifier tube VAD2 through condenser IMC, from exceeding 16 v. in amplitude; under these conditions the amplifier tube remains blocked. This is due to the fact that normally the grid potential is about —20 v. with respect to the cathode potential, the potential of the cathode being maintained at approximately —20 v. under the control of suppressor tube SVA4 (Fig. 7), which is located in the common control circuit for the line finders and final selectors, and which is connected by means of the wire I, shown in both Fig. 2 and Fig. 7.

I will now consider a time unit during which an impulse arrives from a calling line circuit; during the beginning of this time unit the source $dl$ will be at the potential of —40 v. and the impulse, which is positive with respect to —40 v., will progressively charge the condenser IMC via the 300,000 ohms resistance so that the grid potential becomes approximately —32 v. It is obvious that, under these conditions, amplifier tube VAD2 remains blocked.

While the grid is brought to the potential of —32 v., source $dl$ is transmitting a positive impulse of which the amplitude is —16 v.; owing to this, the grid of the amplifier tube is brought to the potential of —16 v. Owing to the fact that the cathode is at a potential of —20 v., the combination of effects produced on the one hand by the calling impulse and on the other hand by the impulse transmitted by the source $dl$, causes the unblocking of the tube VAD2, a single impulse being insufficient to produce such a result.

This releases the operation of the right hand regenerator tube VAD4 in accordance with a method identical with that already described for the left-hand regenerator tube VAD3. The type of transformer employed and the values of the other circuit elements are such that the duration of the impulses transmitted in this case corresponds to about half a time unit that is, 0.1 millisecond.

When the next impulse and the coincidence impulse transmitted by the source $dl$ terminate, the condenser IMC is progressively discharged. When the next impulse is transmitted by source $dl$, the condenser is discharged, so that the impulse transmitted by source $dl$ cannot release the amplification and regeneration stage, provided that no call has appeared on the line corresponding to the next time unit; if the latter eventuality arises, condenser IMC will not be discharged, due to the arrival of another call impulse, and the amplification and regeneration stage would again be released by the positive impulse from $dl$. An impulse will thus be transmitted for each calling line.

The cathode resistance of regenerator tube VAD4 transforms the current impulse into potential impulses, and, owing to the presence of the varistor VS connected in the cathode circuit, the potential of this impulse is maintained substantially constant for the whole duration of the impulse.

The impulses of the regenerator tube may be seized either in the cathode circuit or in the grid circuit, which in practice gives impulses of the same amplitude as the cathode circuit.

The impulses obtained from the cathode circuit are employed to transmit through wire III the identity of the calling line to the common control circuit of the line finders and final selectors (Fig. 7); the common control circuit employs this indication to start the hunting of the calling line by the line finder, under the control of the register circuit, as described later.

The impulses obtained from the grid circuit are sent by the wire II to the common control circuit of the line finders and the final selectors (Fig. 7), where they act on the suppressor tube SVA4, so that the impulse regenerator SVA1— SVA2 employed in the common control circuit for the selection of the desired line by a final selector, cannot operate, and so as thus to engage the line in call position. A line cannot therefore be selected by a final selector starting from the time unit in which it is calling; priority is thus given in this manner to the outgoing calls.

A call detector which finds a calling line may be connected to a common control circuit (Figs. 3, 4, 5) serving a group of call detectors, in any time unit, irrespective of the fact that one or more call detectors of the group are already employing the common control circuit.

The connection of the common control circuit is made by the operation of relay DT, which applies an earth, through the closed make contact dt3, back contact hr3, lead w1, back contact dek4 (Fig. 3), to the operative circuit of the relay DES of the common control circuit.

Relay DT further applies another earth through make contact dt1 and back contact DHB1, lead w2, to the common control circuit, but without immediate effect.

The operation of relay DES (Fig. 3) energises relay DEB through make contact des1, back contact deh2, back contact dec4, causing selection for a free cord by the common control circuit.

Figure 3:
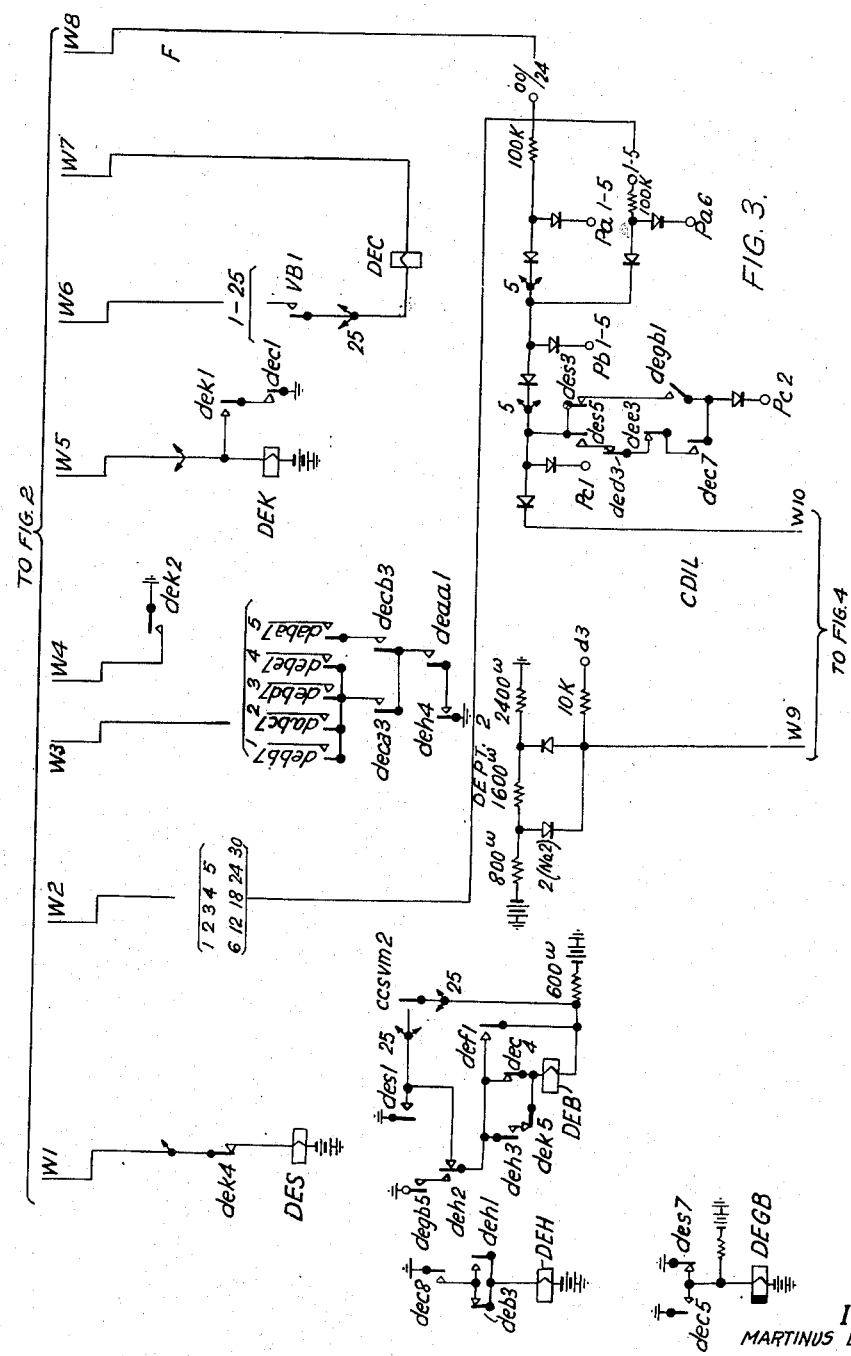
Figs. 3, 4 and 5 show the common control circuit provided to control the operation of the multi-switch associated with the call detector circuits.
Figure 13:
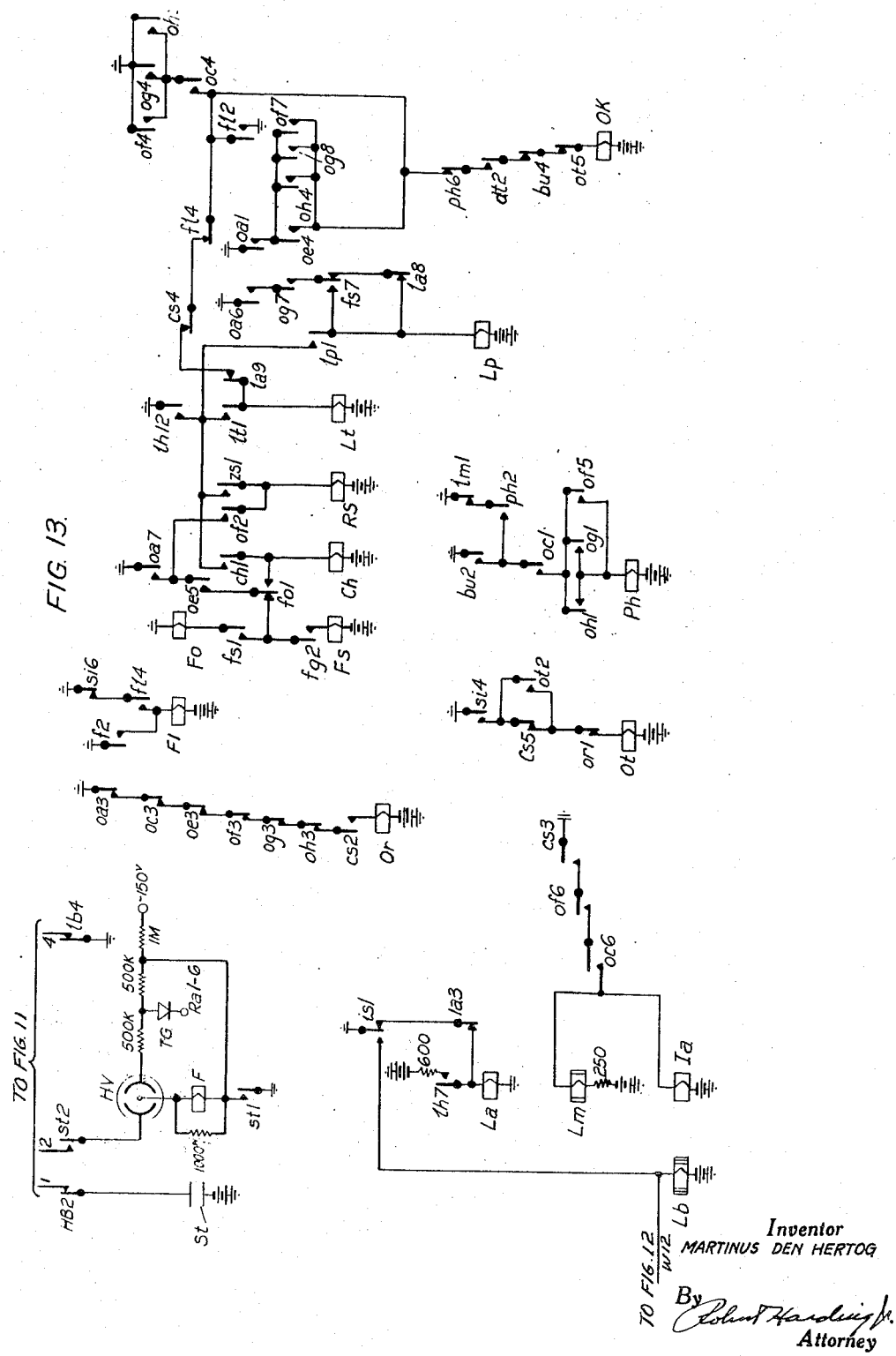

The free cord circuits are characterised by the potential of the earth on test wire F lead w8 which is connected to one of the terminals numbered 00-24 in the common control circuit of the call detector through the following circuit: earth in the register, back contact lb4 (Fig. 13), 10,000 ohm resistance in the common control circuit (Fig. 11), wire RSF, back contact rsh6, make contact rsb4 of relay RSB, in the common control circuit of the register, said relay being normally energised by means of a circuit which is easy to follow, back contact ccbc9 in the cord circuit (Fig. 10), to wire F, Fig. 2, lead w8 to Fig. 3 and contact pin of the common control circuit of the call detector corresponding to the cord circuit.

Terminals numbered 00-24 correspond to the numbers of the output of cord finders CCS forming part of the call detector circuit of Fig. 2. The number 25 is chosen arbitrarily but in practice it depends on the traffic.

The earth applied to one of the terminals 00-24 indicates a free cord circuit provided to modify the grid potential of the triode DEV2 (Fig. 4) over lead w10, which is normally maintained at —40 v. by the potential divider DEPT1 comprising resistances of 240,000 ohms and 1,200,000 ohms, said potential divider being connected to the grid through another resistance of 200,000 ohms.

Owing to the insertion of three stages of rectifier cell systems between each of the terminals 00-24 and the grid, an earth applied to any one of these terminals can only influence the grid potential during the corresponding time unit, out of the 120 time units, owing to the fact of the presence of impulse sources connected to the rectifier cell systems, as has previously been described.

A group of 25 outlets of this kind can be individually identified by 30 time units of the source Pa, corresponding to one time unit of the source Pc; consequently, a single source Pc1 is employed for the third stage of rectifier cells. The transmission of an impulse under the control of source Pc1 can be prevented by connecting a second source Pc2 in parallel to the first in such a way that one of the two sources Pc is always at —40 v.

When the circuit is in the normal condition, i. e. when the relay DES is idle, a relay DEGB is energised through back contact des7. Under these conditions an auxiliary rectifier corresponding to the source Pc2 is connected in parallel with the corresponding rectifier cell system to the source Pc1. It will be seen that the rectifier cell system normally used, connected to source Pc1, is short circuited when the circuit is free, by means of back contact des3 and make contact degb1, by the auxiliary rectifier cell system connected to the source Pc2, so that the potential on the common wire of the outputs 00-24 is accordingly maintained at any instant at —40 v; by shunting one source Pc1 by another, all the impulses corresponding to the 25 time units are eliminated, so that when the circuit is free the grid potential is not affected by any earth existing on the free outlets.

The relay DES, in operating, opens the shunt circuit by the back contact des3. Owing to this, the first outlet which, owing to the existence of an earth on its wire F, can signal a free cord circuit, in the corresponding time unit causes the transmission of a positive impulse to the grid circuit of the amplifier tube DEV2 in the time unit which is characteristic of said circuit.

The grid circuit of the tube DEV2 is controlled, in a similar manner to that employed with regard to the circuit of the regenerator-amplifier stage of the call detector, by an impulse source d3 (Fig. 3, over lead w9), details of which are shown in Fig. 18.

This source ensures the transmission of a positive impulse at the beginning of each impulse of the basic source; it can only release the amplifier tube and the regenerator tube associated therewith if the 100 pf. condenser, by means of which it is connected to the grid, has been charged during the preceding time unit by an impulse from a free outlet. It will be assumed that in spite of the fact that the impulse has already ended at the moment when d3 transmits a positive impulse, the condenser will not have been substantially discharged at this moment, so that the charge on the condenser obtained from the outlet during the preceding time unit, and from the source d3 at the beginning of the next time unit, are still added to each other.

The impulse regenerator comprising the triode DEV1 and a transformer DET now produces an impulse in accordance with a method identical with that already described in relation to the tube VAD3 (Fig. 2). This impulse begins at the beginning of the impulse transmitted by d3 or slightly after and has an approximate duration of 150 microseconds so that it coincides with the greater part of the time unit following that in which the outlet sends it an impulse.

The impulse is seized in the cathode circuit of the regenerator tube DEV1 and sent to an assembly of 16 cold cathode tubes DEVA1 ... 6, DEVB1 ... 5, DEVC1 ... 4, and DEVD. One tube of each of the three groups mentioned and the tube DEVD will be ionised. The tubes DEVA ... DEVC will be ionized in accordance with a combination indicating that a free outlet has been found (Fig. 19). The tubes DEVC are not necessary for the 25 cord circuits, but would be necessary if the number of cord circuits were increased. The tube DEVD, in being ionised, modifies the potential of its cathode which is normally at —150 v., due to the fact that it is connected to the negative terminal of a 150 v.-battery through the winding of relay DEF and a resistance in series. This potential is established at —75 v. and is transmitted through the rectifier cell DERD to a point of a potential divider DEPT3 which is normally at the potential of —142 v. This potential divider is connected at its ends on the one hand to the negative terminal of a 150 v. battery and on the other hand to the positive terminal of a 50 v.-battery; another point of the potential divider, connected to the grid of suppressor tube DEV3, is normally at a potential in the vicinity of —21.5 v. A second adjustable potential divider DEPT4 connects a negative 20 v.-potential by means of another rectifier cell DERV to this grid and thus prevents said grid from being brought to a more negative potential.

As long as the grid of suppressor tube DEV3 is maintained at —21.5 v., its cathode is approximately maintained at the same potential. This potential moreover, is transmitted by the make contact deb4 to the cathode of the amplifier tube DEV2, which under these conditions, can respond to the impulses transmitted to its grid by the assembly of gates.

When the cold cathode tube DEVD is ionised, the point of the potential divider DEPT3 which at the origin was —142 v., is raised to —75 v.

Owing to this, the potential of the point of the potential divider which is applied to the grid of suppressor tube DEV3, is modified so as to be raised to about 0 volt and tube DEV3 operates; owing to this, the cathode of this tube is at about the same potential. Moreover, the potential of the cathode of the amplifier tube DEV2 is also brought to 0 volt, which makes it strongly positive with respect to its grid potential; in this way, no impulse can be transmitted by means of tube DEV2 in order to indicate free cord circuits in the following time units. This also applies to any impulse which might arrive in a time unit immediately following that corresponding to the first cord tested, because the tube DEVD is ionised during this moment, sufficiently soon before the next impulse d3, to prevent the amplifier tube from responding.

In the circuits described the switches of the call detectors CCS (Fig. 2) give access to the cord circuits, which at the same time are connected to the register controllers by means of the switches RS (Fig. 12) in the register controller.

It would also be possible for the switches of the call detectors, to give direct access to the register controller, which, as already described, would be associated with the cord circuits by means of switch RS. As already stated, a call detector circuit is connected to a cord circuit only if an associated register controller is free. In this latter case, a detector circuit is only connected to a register controller if said register circuit were associated with a free cord circuit.

As soon as a free cord circuit has been determined by the ionisation of a combination of tubes DEVA—DEVC, the vertical bars corresponding to the outlet of the switch CCS are actuated.

This is obtained by the operation of the anode relays DEAA . . . DEAF, DEBA . . . DEBE, DECA . . . DECD in series with the tubes and connected to earth by means of make contact deb2. These relays comprise a certain number of make contacts through which one of the 25 vertical magnets of the switch CCS is actuated. The assembly of these contacts appears in Fig. 5. Magnet CCSVM in operating is maintained by means of its own make contact ccsvm1, make contact dec6 and earth. The relay DEC (Fig. 3) has been operated, as will be explained below.

During the operations described above, the common control circuit serving the group of registers to which the tested cord circuit has access, is seized in order, on the one hand to prepare the connection of a free register circuit with said cord circuit, and, on the other hand, to render this group of registers, and at the same time, all the free cord circuits which have access thereto, temporarily inaccessible, and thus to prevent other common control circuits of the call detectors from testing one of these free cord circuits in the interval comprised between the moment in which the cord circuit has been tested and the moment in which it seizes and engages a register circuit.

The seizure of the common control register circuit is effected when the impulse energising the combination of tubes and relays of the common control circuit of call detectors (Fig. 4) is also transmitted to the common control circuit of the register (Fig. 11), serving the group of registers to which the tested cord has access.

The impulse transmitted by the impulse regenerator is transmitted to the point X between two resistance coils of a potential divider composed of three resistance coils DEPT5 (Fig. 5); this point is normally at the potential —110 v. The potential divider is connected to a signal circuit at a point Y equally situated between two resistances of said potential divider; this point Y is normally at the potential of —50 v. When the impulse regenerator transmits an impulse, the potential of point X is raised to —50 v.; this has the effect of raising the potential of point Y and circuit CRC momentarily to —17.5 v.

Figure 11:
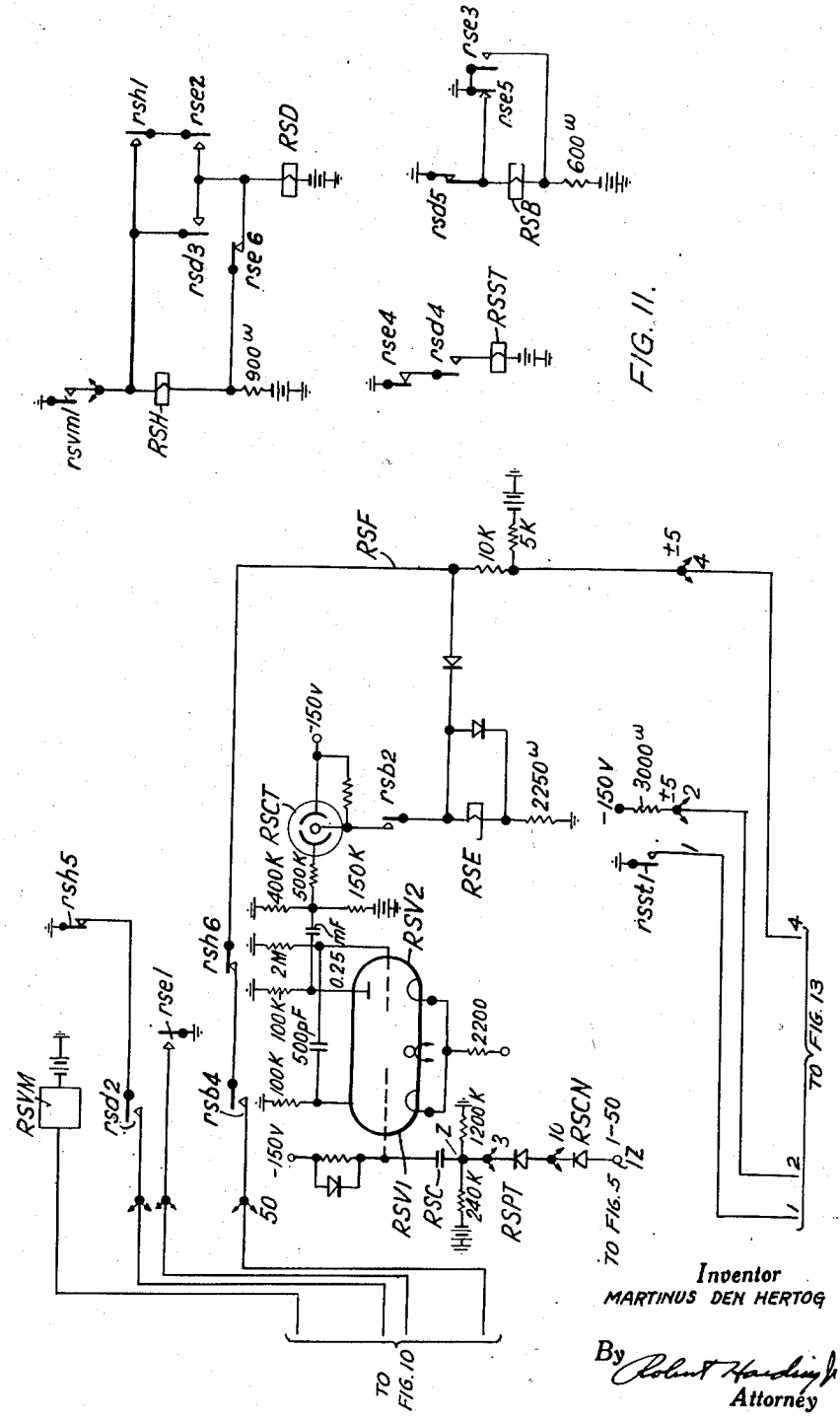
Fig. 11 shows the register common control circuit which controls the operation of a multi-switch provided in order to make the connections between the register controller and the cord circuit.

If the call detector and register circuits are connected to the cord circuit in the same way, the wire connected to the point Y of potential divider DEPT5 (Fig. 5) is directly connected to the point Z of the potentiometer RSPT (Fig. 11). This will be the case in the office of 100 lines described. If, however, the call detector circuits and the registers are connected to the cord circuit according to the different groupings, as may happen in larger central offices, it will then be necessary to interconnect the points Y of the call detector circuits to the points Z of the common control circuits of registers so as to permit such differences.

The comparator circuit CRC (Fig. 5) and the concentration circuit RSCN (Fig. 11) are described in order to illustrate the manner in which such arrangements can be carried out when necessary. The comparator circuit CRC shown comprises three stages of comparison; the wire from the point Y is connected to one comparison device; this device is connected to 5 comparison devices, which in their turn are each connected to five other comparison devices. It is thus possible to meet the requirements of an exchange with 10,000 lines, for example. A smaller number of comparison stages can of course be employed.

The comparator circuit distributes the impulses which may occur successively at the point Y at the ends of the comparison device CRC, one at each end of the wires OZ. These wires are interconnected with the points IZ (Fig. 11) of the corresponding concentrator circuits RSCN in the common control circuit of the register, each comprising one rectifier cell per wire in each stage, so as to prevent interference between the different wires. The circuit shows, for example, 25 wires on the output of the comparator device, these being connected through a first stage of 5 wires, which themselves are connected to the point Z of the potentiometer RSPT. Such comparators and concentrators are described in U. S. patent application Serial No. 167,672, filed June 12, 1950.

These systems of rectifier cells are connected in such a way that the impulses of —17.5 v. are only sent to that one of the terminals OZ corresponding to the outlet of the switch CCS to which the tested cord circuit is connected. Any number of terminals OZ numbered 00 . . . 24 may be connected to any number of terminals IZ, numbered from 1 . . . 50 (Fig. 11), corresponding to the cord circuits having access to the group of registers served by each register common control circuit. It will consequently be seen that the terminals OZ, on one of which the 17.5 v. impulse is transmitted, are distributed over the common control circuits of the registers like the cord circuits corresponding to these contact-pins on the groups of registers corresponding to these common control circuits; consequently, an impulse arriving on a contact-pin corresponding to the tested cord circuit will be transmitted to the particular register common control circuit corresponding to the group of registers to which this cord has access. As has previously been indicated, the terminals IZ corresponding to the cord circuits associated with the registers are, by means of two decoupling stages employing rectifier cells, of the potentiometer RSPT and the coupling condenser RSC, connected to the grid circuit of the triode RSV1 of the double triode RSV1, RSV2 which makes up a double amplifier stage. Each of these amplifiers changes the polarity of the impulse transmitted to it; thus, at the output a positive amplitude impulse is obtained which is sufficient to ionise a cold cathode tube RSCT in the common control circuit of the register.

Thus we have a stage of distribution, in which an impulse corresponding to an outlet of switch CCS is supplied at one time position to that terminal of the OZ terminals whose time position identifies the seized cord circuit. Following the stage of distribution we have a stage of concentration from call detectors to the register common control circuit. This concentrator stage can "collect" impulses from a number of call detectors, which impulses each represent an outlet of a switch CCS which corresponds to a cord circuit associated with one of the registers with which that register common control circuit is associated.

A potential of about —75 v. is then applied from the anode of this tube and through the contact rsb2 to the test wire RSF, by means of which the availability of the circuit is verified; this immediately prevents other call detector circuits from being able to find the potential of the earth on this wire; thus, all the free cord circuits through which this wire passes will be temporarily rendered inaccessible.

It has been noticed that, by a judicious distribution of the cords on the various register groups, arrangements can be provided so that the cords connected to each group of registers may be successively tested by the cord finders with a minimum time between every two tests, so that the operation of the cold cathode tubes RSCT, which takes place in the time unit immediately following that in which a free cord has been found, occurs sufficiently long before the time unit in which the following cord can be tested, in order to prevent such a test taking place.

Another consequence of the ionisation of a cold cathode tube RSCT, is that the relay RSE operates in the common control circuit of the register (Fig. 11) and indicates that the blocking of the other free cord circuits is effective.

Figure 10:
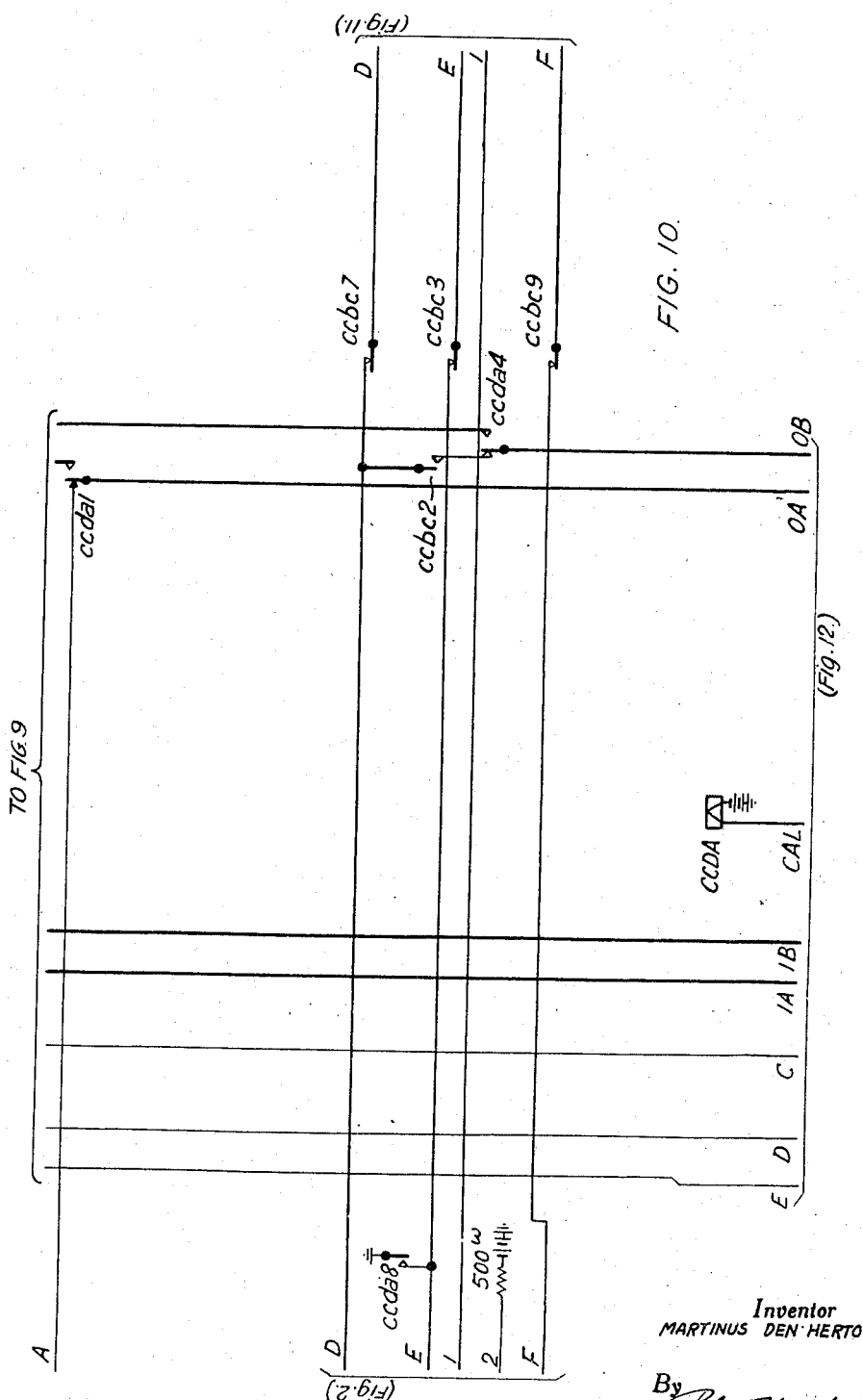

The following energisation circuit of relay DEC of the common control circuit of the call detector is completed; earth on make contact rse1 (Fig. 11), (which checks the operation of the cold cathode tubes RSCT of the common control circuit of the register), wire 1 of the cord circuit, through Fig. 10 to the call detector circuit (Fig. 2), common control circuit of call detector (Fig. 3), make contact of the vertical bar VB1, relay DEC, lead w7, call detector circuit (Fig. 2), lead 2 of the cord circuit to the 500-ohm resistance, and battery, (Fig. 10). It may be noted that by means of the circuit described, at the same time both the presence of the battery potential of the central office in the cord circuit tested and the effective seizure of the register common control circuit is checked. The relay DEC (Fig. 3), in energising, produces the following operations:

(1) It re-closes by its make contact dec5, the energisation circuit of the slow-acting relay DEGB, which was opened by the contact des7 after the seizure of the call detector common control circuit, in such a way that relay DEGB is not released.

(2) It opens by its back contact dec4 the energisation circuit of the relay DEB, said relay DEB then releasing rapidly. It will be noted that, from the moment in which the cold cathode tubes (Fig. 4) are ionised, the relay DEF has been energised in series with the tube DEVD. The winding of relay DEB is short-circuited. The relay DEB in this way is made slow-acting and does not release as long as the contact dec4 is not open and has not suppressed the short-circuit.

(3) It applies an earth to the relay DEH through the make contact dec8 and the back contact deb3, in such a way that said relay is energised from the moment in which relay DEB has released. Relay DEH is held by means of contacts deh1 and dec8.

(4) It prepares by the make contact dec7 a circuit in which an auxiliary rectifier cell can be connected as will subsequently be explained.

(5) It closes the locking circuit of the vertical magnets of the switch CCS, as, for instance, CCSM (Fig. 5), already referred to above.

The relay DEB in releasing, by means of its contact deb2, removes earth from the anode circuit of all the cold cathode tubes of the call detector common control circuit (Fig. 4); said tubes are deionised and the anode relays released, including those which caused by their contact the energisation of the vertical magnet CCSVM.

The relay DEF being idle, and the relay DEH being operative, a circuit is again closed, by means of contacts deh2, deh3, in order to energise relay DEB which is again energised with a retardation caused by the time of release of the relay DEF, so as to check that all the cold cathode tubes are deionised and their anode relays have released.

Owing to the operation of the relay DEB, a second hunt will be made to find, not a free cord circuit, but the call detector or one of the call detectors which may be connected to the selected cord circuit.

The wires passing through the make contact dt1 and the back contact DHB1, in each of the call detector circuits (Fig. 2) associated with the same common control circuit, are each connected by means of gates, similar to those of the circuit CRC during each corresponding impulse Pa6, to the corresponding identification wire CDIL. Five of these wires are shown among the 20 wires which may be provided owing to the presence of the sources Pa, Pb, Pc.

It will be understood from the following description that the impulses coming from the call detectors through the wires CDIL will only act on the tube DEV2 if the relay DEC is operative.

An explanation will first of all be given of the functions of the right hand triode DEV4, which forms part of the double triode DEV3, DEV4. During the first hunting, that is to say, while the relay DEC was idle, the anode of this tube DEV4 was connected by means of back contact dec3, to the grid of the amplifier tube DEV2. The grid of tube DEV4 is connected to the impulse source Pa6 by a potentiometer DEPT6 and a small condenser DECN1; said grid is then rendered positive only during every sixth time unit of a group of 6. Consequently, during these time units the tube will become conductive and the anode relatively negative so that it will absorb any impulse which might arrive during any one of these time units, while the impulses corresponding to sources Pa1 . . . 5 that is to say, those employed for hunting free cord circuits, are not effected.

The impulses transmitted by the call detector through the wire CDIL are thus present during the first hunting of a free cord circuit but their effect is cancelled, as has previously been described, by the action of suppressor tube DEV4. During the second hunting which must follow, the suppressor tube DEV4 is disconnected from the back contact dec3 which now connects the source Pa6 by means of a gate, to the grid circuit of amplifier tube DEV2. Consequently, any impulse whatsoever, whatever its origin, transmitted on the grid of the tube DEV2 during the time units Pa1 . . . 5 will now be absorbed, and only those impulses which arrive during the time units in which the source Pa6 transmits positive impulses, can act on the amplifier regenerator stage.

When such an impulse is detected by the tube DEV2, the corresponding impulse transmitted by the tube DEV1 ionises a combination of cold cathode tubes DEVA, DEVB, DEVC and the tube DEVD, according to the time unit in which the impulse is received. In all cases however, in the group of tubes DEVA, only DEVA1 can be ionised, causing the energisation of the relay DEAA, since an impulse sent during the sixth time unit of a group of 6 time units is received during the first time unit of the next group of 6 time units.

It will now be seen that owing to this, no circuit will be closed for any one of the vertical magnets CCSVM, of which the energisation circuits do not comprise contacts of the relay DEAA.

Moreover, by means of the make contacts deh4, deaa1 (Fig. 3), and combinations of contacts of the anode relays DEBA . . . DEBE, DECA . . . DECD, of the cold cathode tubes, an operative circuit is completed for a relay HR (Fig. 2) in one of the call detector circuits, that is to say, that one from which the impulses have been detected. This relay completes a holding circuit for itself through the make contact hr1, back contact ccshm2, make contact dt3 and earth. The change of position of contact hr3 then removes the earth from the starting relay DES, which releases, in order to connect it to the back contact DHB2, in order to energise relay DEK in the common control circuit. This latter relay completes a holding circuit for itself through the make contact dek1, make contact dec1 and earth, and opens at a second point the energising circuit of the relay DES through its back contact dek4. Moreover, through its make contact dek2, it closes an operative circuit for the horizontal magnet CCSHM.

The magnet CCSHM now displaces the horizontal bar of the call detector circuit and this closes the contacts A . . . E in such a way that a call detector circuit with a call in hand is now connected to the selected cord circuit.

By the displacement of the horizontal bar of the switch CCS, the contacts DHB1, DHB2 of the call-detector circuit (Fig. 2) disconnect the earths respectively connected by the contacts dt1, dt3, to the common control circuit of the call detector. This circuit now remains under the control of the relay DEC and of the contact rse1, of the relay RSE in the common control circuit of the register (Fig. 11), until it has been effectively checked that the cord circuit has been connected to the call detector circuit and that the register common control circuit has received the indication to make the connection of a free register circuit.

This is due to the fact that, when a circuit is established through the switch CCS to energise the vertical magnet RSVM (Fig. 11) of the switch RS corresponding to the selected cord circuit, (Figs. 9, 10, 11), the selected vertical magnet RSVM operates by means of the following circuit: call detector circuit, (Fig. 2) earth on make contact dt5, contact D and lead d of the switch CCS cord circuit (Fig. 10), back contact ccbc1 and lead d to Fig. 11, vertical magnet RSVM of the register common control circuit (Fig. 11).

The operation of magnet RSVM closes the corresponding make contact rsvm1 which energises relay RSH. By means of the following circuit: make contact rsvm1, make contact rsh1, make contact rse2, relay RSD is energised and is held by means of make contacts rsd3 and rsvm1. The contact rsh6 opens the test circuit of the registers. When relay RSE is energised, the closing of contact rse3 short-circuits the winding of relay RSB, thus making it slow-acting. Relay RSB has not yet released, but the opening of contact rsd5 suppresses the short-circuit and relay RSB releases immediately.

By the opening of contact rsb2, the cold cathode tube RSCT is deionised and relay RSE releases. The busy condition on the test wire is maintained, despite the deionisation of the cold cathode tube, because contacts rsb4, rsh6 are open in this test wire RSF.

The release of the relay RSE indicates to the call detector that the common control circuit can be released, which is done by opening make contact rse1 of the circuit in which relay DEC (Fig. 3) is energised. The release of relay DEC opens through contact dec3 the energising circuit of relay DEH, and by its contact dec1 the energising circuit of relay DEK. The vertical magnet actuated (Fig. 5) releases its armature owing to the opening of contact dec6; the vertical bar of switch CCS returns to normal. The horizontal bar is maintained by the horizontal magnet CCSHM (Fig. 2) of the call detector circuit. Relay DEB (Fig. 3) has been released by the opening of contact dek5, from the moment in which relay DEK has been energised; by means of contact deb2, the cold cathode tubes have been deionised, releasing their anode relays.

The release of relay DEK again prepares through contact dek4 the energising circuit of relay DES, so that from this moment this relay can operate to handle the next call.

Relay DEB cannot be re-energised until the make contact def1 has suppressed the short-circuit on its winding, by means of which it is made certain that relay DEB remains idle for a sufficient time for the release of the anode relays of the cold cathode tubes.

Vertical magnet CCSVM has been held in the operative position after the time unit in which the cold cathode tubes have been extinguished for the first time (i. e. after the release of relay DEB, which takes place on account of the opening of contact dec4 at the moment when the relay DEC operates).

The extinction of the tubes caused the opening of the operative circuit of the vertical magnet on account of the release of the corresponding anode relays, the holding circuit passing through a make contact ccsvm1 of vertical magnet CCSVM, a contact dec6 of relay DEC, and earth. This holding circuit is opened by the contact dec6 at the moment in which relay DEC releases, which takes place before the release of relay DEK because the latter is held through a make contact of DEC. The starting relay DES can only operate for a new call if relay DEK has released, because a back contact dek4 is inserted in the operative circuit of this relay. At this moment, it is not certain that the vertical magnet has already returned to normal; but, as long as this has not happened, a make contact ccsvm2, associated with any one of these magnets which may have been energised, holds DEB short-circuited, thus preventing DEB from operating for a fresh call as long as any vertical bar is raised.

The release of relay RSE of the common control circuit of the register (Fig. 11) starts the hunting for a free register circuit by the operation of the common starting relay RSST which is energised through back contact rse4. On an individual make contact for each group register, one of which is shown at rrst1, a circuit is completed by which the individual starting relay St of each free register circuit (Fig. 13) can operate, through back contact HB2 of the horizontal bar of the switch RS. By the operation of individual relay St, it is made certain that the potential of the battery is connected to the register concerned, and this relay by its two make contacts st1 and st2 prepares the operative circuits of cold cathode tube HV in the register circuit. The cathodes of all the tubes of the free registers of a group are connected to the negative terminal of 150 v. battery (Fig. 11) by the make contact st2, through a common 3,000 ohm resistance, of which the purpose is to prevent the ionisation of more than one tube at a time in one group. The make contact st1 applies earth to the control electrode through two 500 ohm resistances in series; one of the sources Ra1 . . . 6 (a different source for each register of a group) is connected to the common point of the two 500-ohm resistances through a rectifier cell TG. Consequently the control electrodes of the different tubes of a register group are only brought to a relatively low positive potential when the source Ra connected to them is relatively positive, which happens for the various tubes of a group at different moments; in this way it is avoided that more than one tube at a time receives a sufficient potential on its ionisation path, thus causing its ionisation. The first tube ionised will determine the use of the associated register and by the ionisation of its discharge gap, reduces the potential on the cathode of the other tubes of the group, which thus cannot be ionised, even if their control electrode becomes relatively positive.

The register circuit of which the tube HV is ionised will now be considered; relay F operates in series with the discharge gap and by its make contact f1 (Fig. 12) closes the energisation circuit of the relay Lb over lead w12. This has the effect of making the register busy by suppressing the earth on the test wire through back contact lb4 and causes the connection of the cord to the register by closing the energisation circuit of the horizontal magnet RSHM (Fig. 12) of the switch RS corresponding to the register, by means of the following circuit: earth, make contact lb1. The closing of contact f2 completes the energisation circuit of the relay Fl which is blocked by means of make contact f14 and si5 in the normal position. Moreover, in the common control circuit (Fig. 11) relay RSB is again energised by the release of relay RSE. The horizontal bar is displaced and two sets of 5 contacts are closed, thus establishing the connection between the register of which the horizontal magnet RSHM (Fig. 12) has been energised, and the cord of which the vertical bar was raised. The horizontal bar now opens back contact HB2 causing the release of individual starting relay St (Fig. 13) of the register.

The release of relay St extinguishes tube HV of the register, releasing relay F; slow-acting relay Lb begins to release slowly.

The closing of contact lb6 (Fig. 12) and the contact of the horizontal bar HB3 has actuated relay Lh and the operation of 1h7 has prepared a circuit for relay La. The closing of contact lh2 closes the energising circuit of relay B. Relay Ch operates by means of a circuit containing contact b3 in the operative position and contact ok5 in the normal position.

Moreover, by the closing of the contacts of the switch RS and by the energisation of the relay Lh of the register circuit, the energisation circuit of the relay LFA of the linefinder circuit (Fig. 6) has been completed. This relay operates by means of earth connected in the register circuit by the following circuit: back contacts ok5, lt7, make contact lh5, contact IB, wire IB of the cord circuit (Figs. 10, 9) to wire B to the line finder circuit (Fig. 6), back contact lfhm2, winding of relay LFA, battery.

By the make contact lfa9, (Fig. 6), earth is applied by the wire F for the operation (Fig. 9) of the relay CCBC of the cord circuit, and this has the effect, by means of back contact ccbc7, 3, 9 (Fig. 10) of suppressing the connection between the call detector circuit and the register common control circuit. Owing to this, vertical magnet RSVM of the latter circuit (Fig. 11) releases, and by the opening of its make contact rsvm1 disconnects earth from the energisation circuit of the relays RSD, RSH, which release. By the contact rsd4, the common starting relay RSST releases, the vertical bar returns to normal. By the contact rsd5, the energisation circuit of relay RSB is closed, this relay already being energised by the back contact rse5. The register common control circuit is now in the normal condition, and the test wire is again established by make contact rsb4 and back contact rsh6 to the remaining free cord circuits, so that these circuits are again available, provided that one or more registers are free.

Relay CCBC (Fig. 9) of the cord circuit, by its operation establishes a circuit by which the relay Lb (Fig. 13) of the register circuit is maintained operative under the control of the call detector until the connection between the register and the calling line has been established. The holding circuit for relay Lb is as follows: earth, make contact dt5 (Fig. 2), contact D of switch CCS, wire D, make contact ccbc2 (Fig. 10), back contact ccda4 of the cord circuit (Fig. 10), contact OB of switch RS, make contact lh10 (Fig. 12), back contact lt4, lead w12, winding of relay Lb (Fig. 13), battery.

By the contact A of the switch CCS of the call detector circuit a connection may be established from one of the sources Pd1 . . . 10 to the register circuit; this connection would be used to indicate to the register circuit the number of the 100's of the group in which the calling line is connected, in the event that the requirements of the exchange make this necessary. This indication would be used to control the selection of a first finder circuit for free lines in the group concerned by a second line finder circuit, which would operate in the same manner as the group selector under identical conditions, and would use the same common control switch. Under the conditions described, all the circuits seized are maintained under the control of relay DT of the call detector circuit. This relay, through its make contact $dt3$, maintains the horizontal magnet CCSHM of the switch CCS, by which the call detector has reached a cord circuit, and, by its make contact $dt5$, maintains the relay $Lb$ of the register as has been described. The relay $Lb$ in turn maintains on the one hand horizontal magnet RSHM (Fig. 12) of the switch RS by its make contact $lb1$, and on the other hand relay $Lh$ by its make contact $lb6$, said relay $Lh$ by its contacts connecting the register to the cord circuit.

Figure 6:
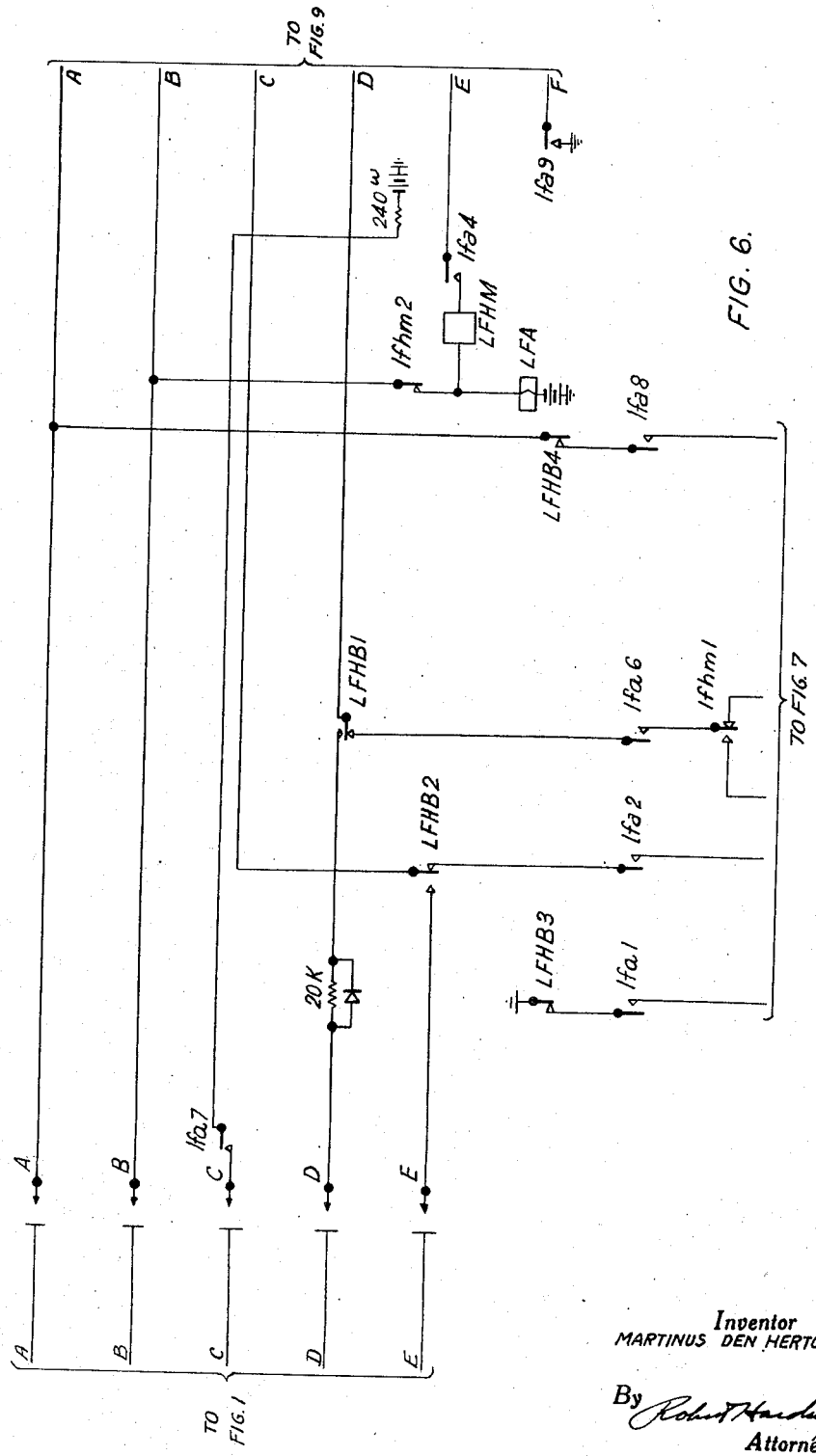
Fig. 6 shows a line finder circuit. The line finders are composed of the individual switches of a multi-switch of which the principle will be described later.

The register circuit, as has been previously described, applies earth to the wire B so as to energise relay LFA in Fig. 6 by means of back contact $lfhm2$ of horizontal magnet LFHM.

The operation of relay LFA immediately causes the connection of the line finder circuit to its common control circuit by connecting the wires A, C and D of the cord circuit by means of make contacts $lfa8$, $lfa2$, $lfa6$, respectively; the common control circuit is rendered operative by an earth applied to it through back contact LFHB3, and make contact $lfa1$.

Relay LFA, moreover, prepares its holding circuit by means of the wire E in series with the winding of horizontal magnet LFHM and make contact $lfa4$, but the magnet LFHM cannot operate in the time unit concerned because an earth is applied to the two ends of its winding; a direct earth is in fact connected by means of the following circuit: wire E to contact E of switch RS in the register (via Fig. 10), make contact $lh1$ (Fig. 12), earth. Earth is applied through contact $lfa9$ to the energisation circuit of relay CCBC in the cord circuit (Fig. 9), the relay CCBC is energised.

The earth applied to make contact $lfa1$ and the back contacts $lfsh1$, $lfsc3$, causes the energisation of relay LFSB (Fig. 7) in series with a resistance connected to the feed battery of the common control circuit; this relay in closing its contacts $lfsb1$, 2, 3, prepares the circuits permitting the control of selection by the line finder of the calling line. As has previously been described, the call detector circuit (Fig. 2) comprises a regenerator tube VAD4 which transmits impulses in its cathode circuit and in its grid circuit in coincidence with the impulse coming from the calling line or lines connected thereto.

Figure 7:
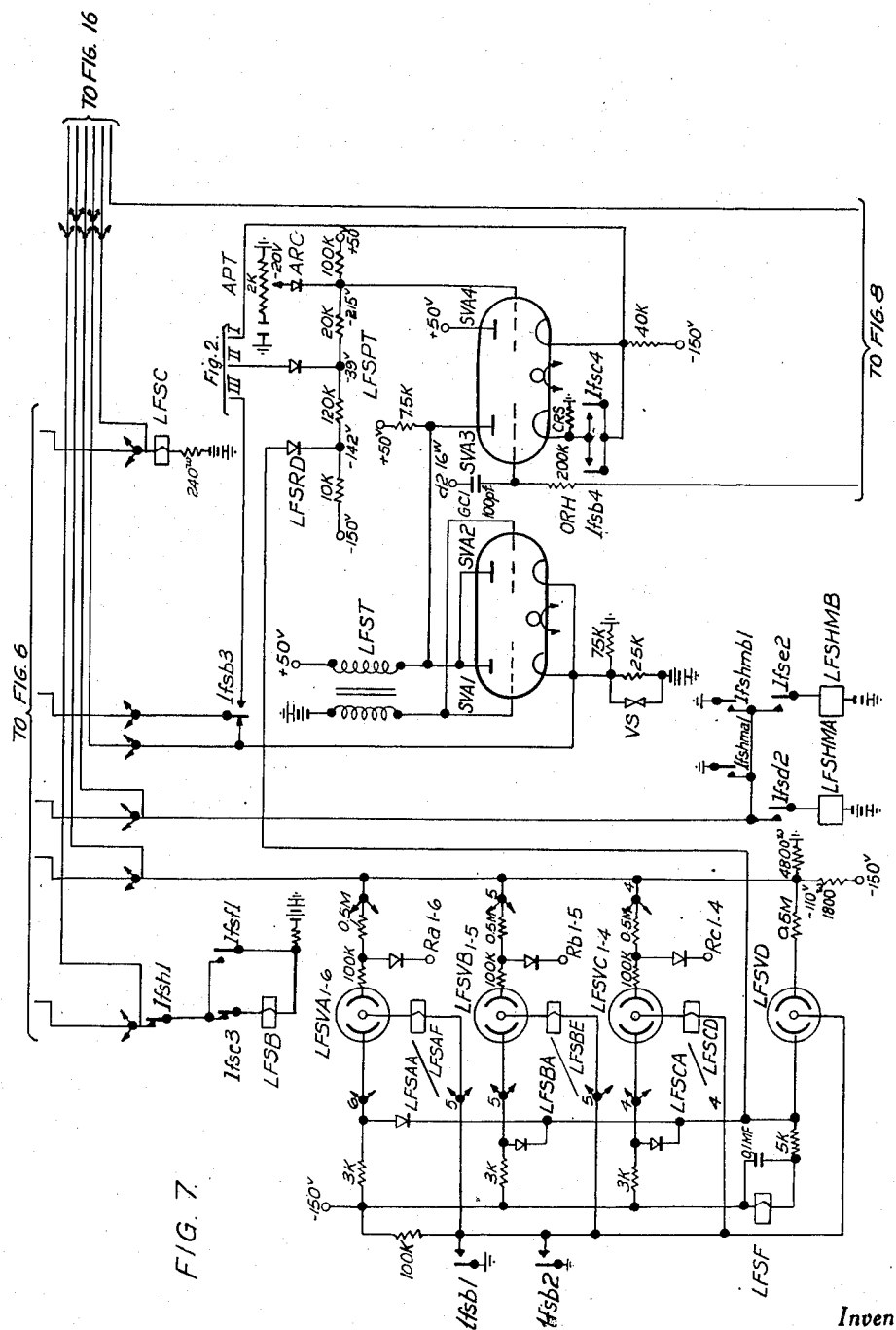
Figs. 7 and 8 show the common control circuit employed to control both the operation of the line finders and the operation of the final selectors. The inset to Fig. 8 shows tables which will be referred to in the course of the description.

The impulses obtained in the cathode circuit are transmitted through the wire III from Fig. 2 to the common control circuit of the line finder (Fig. 7). An impulse is sent for one time unit every 120 time units, said impulse being characteristic of the tens and units digits of the calling line number; this impulse is sent by the wire III to the common control circuit. By the closing of make contact $lfsb3$, this impulse will be transmitted through back contact $lfhm1$ (Fig. 6), make contact $lfa6$, and back contact LFHB1 to the wire D, which is connected through the cord circuit to the register circuit.

It will be noted that in the register controller the contact $f13$ has connected the grid of tube $Va2$ to earth by means of the following circuit: make contact $ch2$, make contact $f13$, and back contact $la7$. The grid of the tube $Va4$ is also earthed through back contact $fs4$. Neither of the tubes $Va2$, $Va4$ can thus interfere with the impulses amplified by the tube $Va1$. The grid of the tube $Va3$ is connected by means of the back contacts $Ot4$, $si5$, $fs2$ to all the impulse sources $Pa2 \ldots 6$, connected in parallel by means of rectifier cells. The tube $Va3$ thus permits the reception of impulses by the tube $Va1$ at any moment except during the time units of transmission of the source $Pa1$, that is, during 5 time units out of 6 of each cycle $Pa$ which is allocated to the selection control.

During each of the impulses from the source $Pa2 \ldots 6$, the current flows from the negative battery of the exchange to the point of $-16$ v. potential supplied by one of said sources, through the grid resistance of $Va3$ and the rectifier corresponding to the source concerned; the grid will be brought to the potential of $-16$ v. during the duration of the impulses $Pa2 \ldots 6$, the tube $Va3$ then being conductive. However, during each of the impulses supplied by the source $Pa1$, a potential of $-40$ v. will be applied to the grid of $Va3$, and said tube will no longer be conductive. There is, therefore, a negative potential on the cathode of $Va3$ during the impulses $Pa1$, the impulse generator not being actuatable by impulses coming from a common control circuit through the wire D during the impulses $Pa1$.

Impulses from a source $d3$ are continuously applied to the grid of the tube $Vo2$, (Fig. 14), which forms part of a double triode $Vo1$, $Vo2$ provided to produce impulses. When one or more of the cathodes $Va1$, $Va2$, $Va3$, $Va4$ are negative, each of the impulses $d3$ is absorbed in a 20,000 ohm resistance on account of the flow of current through said 20,000 ohm resistance and the rectifiers $Rc1$, $Rc2$, $Rc3$, $Rc4$ and the negative cathode or cathodes of the tubes. When the impulses are simultaneously applied to the grids of the tubes $Va1$, $Va3$ by the linefinder and by the sources $Pa2 \ldots 6$, all cathodes are simultaneously positive; the corresponding impulse $d3$ renders the grid of $Vo2$ positive, since there is no current flowing through the 20,000 ohm resistance and one of the rectifiers.

Consequently, the tube $Vo2$ causes the operation of the tube $Vo1$. The tube $Vo1$ forms part of an impulse regenerator which also comprises a transformer TP, TS connecting the anode and grid circuits, a resistance RRS and a varistor or thermistor TH in parallel on the grid bias circuits and the cathode circuit.

In the absence of a trigger impulse, the grid of the generator tube $Vo1$ is biassed to a value which does not permit the operation of the tube, and no current flows either in the windings of transformer TP, TS or in the tube. If a negative voltage is suddenly applied to the anode of the tube, this voltage changes sign after having been transmitted to the grid winding of the coupling transformer, said grid then becoming positive. If the amplitude of the voltage applied is sufficient to bring the polarisation of the grid to a suitable value, the generator is fired. The anode current begins to flow through the anode winding; the grid then becomes more positive and in turn produces an increase of the anode current. Almost immediately, the grid becomes more positive than the cathode; a considerable grid current begins to flow, thus restricting any subsequent rise of the grid potential. At this moment the anode and grid currents begin to decrease, the latter more rapidly, so that the difference between the ampere turns of the anode and grid windings rapidly increases.

After a period which depends to a great extent on the self-inductance of the windings of the transformer and of the resistance of the anode circuit of the tube, the grid current is cancelled. From this moment, any decrease of the anode current causes the appearance of a negative voltage in the grid winding, which in turn brings about another decrease of the anode current. The tube is then rapidly extinguished, and ceases to operate until a fresh trigger impulse arrives.

A current impulse of substantially rectangular form is thus produced in the cathode circuit, of which the amplitude and the duration are not dependent either on the amplitude or the form of the trigger impulse.

The loading resistance RRS placed in the cathode circuit of the generator makes it possible to transform the current impulse into a voltage impulse, the said voltage being maintained substantially at the same value for the whole period of the impulse.

One impulse will be produced for each trigger impulse applied to the anode, after which the tube returns to normal.

When a selection impulse from the call detector is received by the register, through the wire D, via ok4 back (Fig. 12), on the grid of the tube Va1, an amplified impulse will be applied to the grid of the tube Vo2. When the amplified impulse and a short impulse d3 coincide on the grid of the tube Vo2, an impulse is transmitted by the tube Vo1 and is applied to the cold cathode tubes Vabu, Via, Vib, Voa . . . Voh. The tube Vabu is the tube which by its condition characterises the busy state; it is only used in the case of final selectors and its circuit is opened by the contact fs5.

The tube Via is connected, and receives any control impulses, so that it operates and energises its anode relay Si. The tube Vib is isolated by the contact ph5 and cannot operate.

The tubes Voa . . . Voh are each controlled by individual sources of impulse of cycles Ra, Rb, Rc each comprising Ra1, so that none of the tubes corresponding to class of outlets will operate under the influence of the selective impulses.

Relay Si at Si6 causes the release of relay Fl (Fig. 13) so that the earth applied to the tube Va2 will be suppressed. The regenerated impulse which on account of the relative position of impulse d1 is placed in the time unit immediately following that in which it had been sent to the call detector, is sent back to the cold cathode tubes LFSVA2 . . . 6, LFSVB1 . . . 5, LFSVC1 . . . 4 and LFSVD, in the common control circuit (Fig 7) through the following circuit; lead w15 (Fig 12, make contact lh3, wire C through Fig. 10 to Fig. 9, back contact ccda3 of cord circuit (Fig. 9), wire C to Fig. 6, back contact LFHB2 in the line finder circuit (Fig. 6) and make contact lfa2.

The tubes operate, in accordance with a characteristic combination of the tens and units digits of the calling subscriber's number, while the tube LFSVD operates for any impulse whatsoever.

The operation of contact si4 (Fig. 13) applies an earth through back contact cs5, which operates the relay Ot; relay Ot is held through its contact ot2.

Each of these 15 tubes is controlled by a gate device connected to one of the impulse sources (of which the diagram and arrangement have been shown in Fig. 18), in such a way that these tubes can only be ionised in specific time units.

For example, each of the tubes LFSVA1 . . . 6 is controlled through a gate device, by one of the sources Ra1 . . . 6 so that the tube LFSVA1 can only be ionised in one of the time units in which the source Ra1 transmits relatively positive impulses, that is to say, during the time units 1, 7, 13, etc.

Moreover, the tubes LFSVB1 . . . 5 are connected, each through a gate device, to one of the sources Rb1 . . . 5, so that the tube LFSVB1 can only be ionised during one of the time units in which the source Rb1 is transmitting relatively positive impulses, that is to say, during time units 1 . . . 6, 31 . . . 36, 61 . . . 66, etc. The tubes LFSVC1 . . . 4 are controlled in a similar manner by the sources Rc1 . . . 4, of which it is easy to find in Fig. 18 the time units during which the sources are transmitting positive impulses.

Finally, there is a tube LFSVD, which is not controlled by a gate and consequently will be ionised under the influence of an impulse arriving in any time unit from the register through wire C (as described above). It is easy to see that an impulse arriving during any time unit will always cause the ionisation of a tube in each of the three groups LFSVA, LFSVB, LFSVC, so that a combination of a tube of each of the three groups is characteristic of each time unit or again characteristic of the calling line.

For example, in accordance with the table in Fig. 19, the time unit No. 1 is employed to send an impulse characteristic of the line "00" and this impulse will be sent from the register during time unit No. 2. At the moment when the sources Ra2, Rb1, Rc1 are relatively positive, the tubes LFSVA2, LFSVB1 and LFSVC1 are ionised.

Similarly, an impulse sent during the time unit No. 119 to characterise a call from line 99 arrives on the cold cathode tube during the time unit No. 120, that is to say, the moment in which only the sources Ra6, Rb5, Rc4 alone are relatively positive, so that the tubes LFSVA6, LFSVB5, LFSVC4 are ionised.

Each of the ionised tubes causes the operation of its anode relay; and through the make contacts of these three relays, the circuits are closed so as to determine the outlet to which the individual finder circuit must be connected.

First of all, the energisation circuit of one of the vertical magnets LFVM of the multi-switch is closed by the circuits controlled by the anode relays LFSAB . . . LFSAF, LFSBA . . . LFSBE, LFSCA . . . LFSCD, as subsequently will be described in relation to the final selector.

One of the relays LFSD, LFSE (Fig. 8) is energised owing to the fact that one of the relays LFSCA . . . LFSCD associated with the tubes LFSVC1 . . . 4 is operated. Relay LFSD operates under the control of one of the relays LFSCA or LFSCB by means of an energisation circuit comprising contact lfsca2 or lfscb2; the relay LFSE operates, its energisation circuit being closed by contact lfscc2 or lfscd2 of the relays LFSCC or LFSCD.

The operation of vertical magnet LFVM causes the displacement upwards of the vertical bar controlled by the vertical magnet which was operated.

In the interval, two other operations take place.

Figure 9:
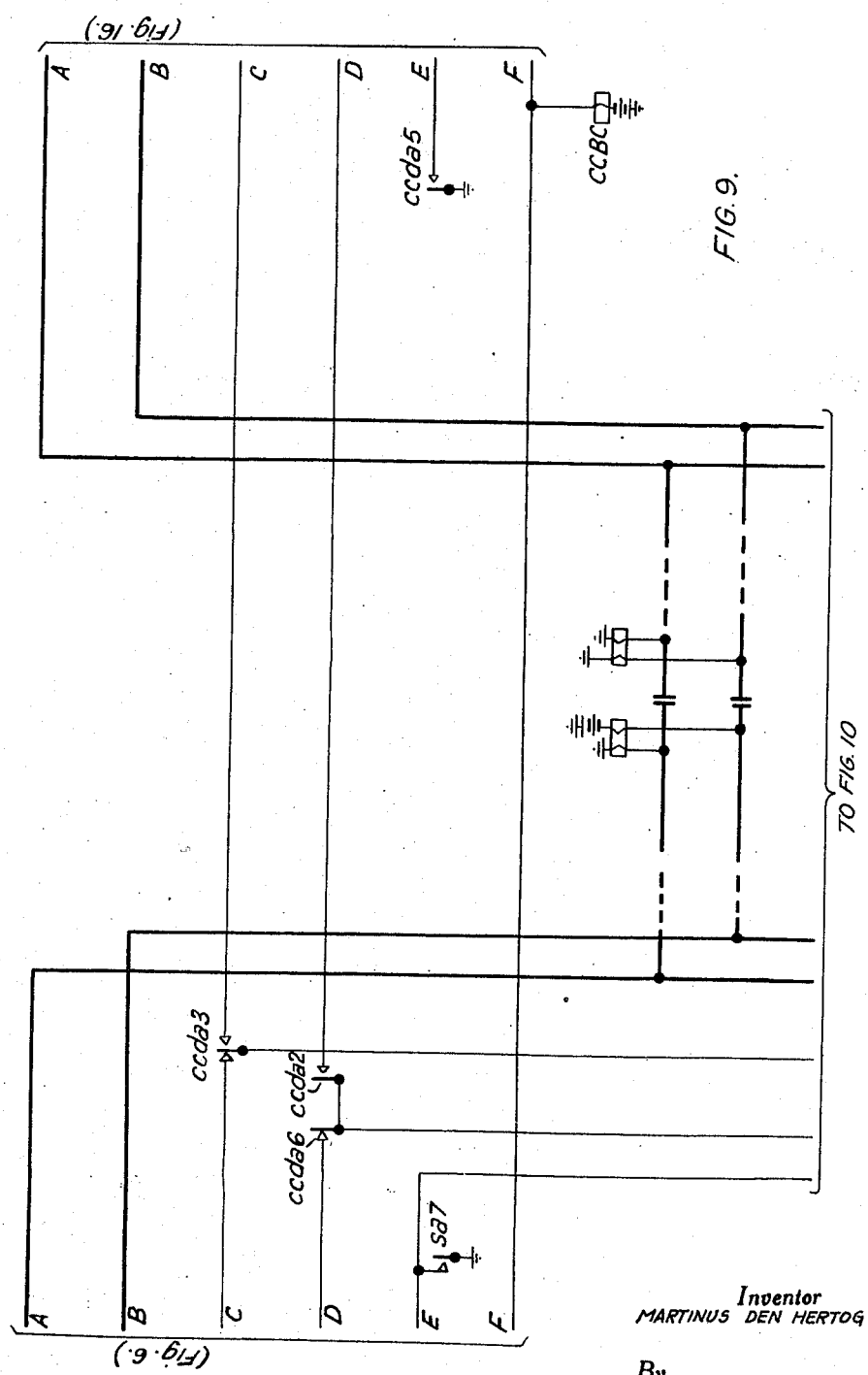
Figs. 9 and 10 show the cord circuit inserted between the line finders and the selection circuits.

On the one hand, the register circuit, after receiving the indication that selection information has arrived, as previously described, closes the circuit of test relay T; earth, relay T (Fig. 12), make contact *ot1*, back contact *lt3*, make contact *lh4*, wire IA to Fig. 10 and Fig. 9, wire A (Fig. 9) of the cord circuit, and in the line-finder (Fig. 6), back contact LFHB4 (still Fig. 6), make contact *lfa8*, relay LFSC (Fig. 7). Relay T is energised, and at *t1* connects the double test relay Dt; only one of these relays can operate, so that only one register can be connected with the same line. The energisation circuit of relay Cs is closed by the contact *dt4*. The opening of the two contacts *ot6* and *dt2* (Fig. 14) extinguishes the tubes V*oa* . . . V*oh* which were fired, and release the associated relays, so that by the set of contacts *oa3* . . . *oh3* and the make contact *cs2*, the relay Or is energised and releases relay Ot.

Figure 17:
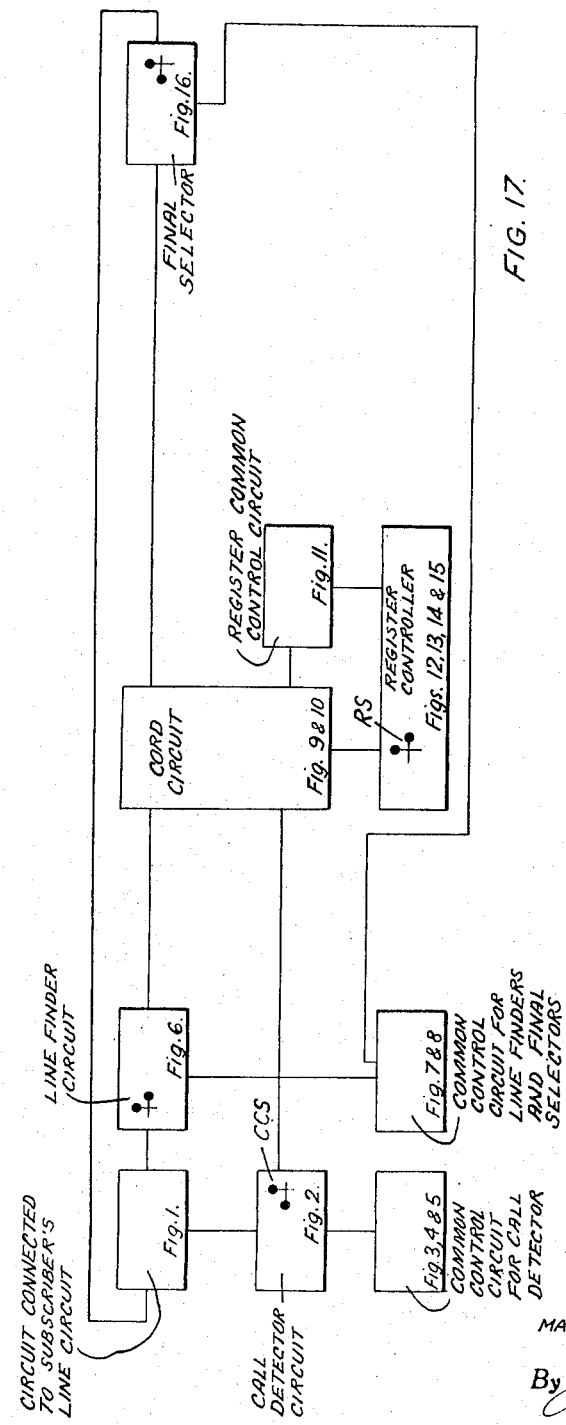
Fig. 17 shows a diagram of the connection of the various circuits connecting the calling subscriber to the wanted subscriber, and shows how the various

In any register controller which has not been able to be connected, the relay T, which was operative, releases owing to the operations of relay Dt in the register which has been able to connect. The relays Or in the registers which are not connected to a line, do not operate, and the relay B (Fig. 17) is short-circuited by the earth applied to one end of its winding by means of back contact *t1* and make contact *ot3*. Relay B is released, and releases relays Si (Fig. 14), Ot (Fig. 13), Ch (Fig. 12). Relay B reoperates on the release of Ot through contact *lh2*, and the register is ready again to receive impulses from a calling line.

In the common control circuit of the line finder the relay LFSC (Fig. 7), of which the winding is low resistance, operates owing to the presence of the test potential and closes a holding circuit for one of the relays LFSD, or LFSE (Fig. 8) which are operative, so that this relay is then rendered independent of the anode relays of the register tubes.

Moreover, the relay LFSF operates in series with the tube LFSVD and at *lfsf1* short-circuits the winding of the relay LFSB, which then begins to release slowly. Before the relay LFSB has released, the relay LFSC can operate, and by its contact *lfsc3* open the energisation circuit of relay LFSB which then releases immediately. By its release, the relay LFSB opens its contacts *lfsb1* and *lfsb2*, thus opening the anode circuits of all the tubes, so that those which are ionised are extinguished, causing the release of their anode relays.

The energisation circuit of the vertical magnet LFVM is then opened, but this magnet remains operative by means of the following circuit: make contact *lfvm1*, contact *lfsd5* or *lfse5*. A relay LFSH which is energised in this circuit opens the circuit of relay LFSB on the contact *lfsh1*.

After having thus determined the identity of the calling line, a check is first of all made to determine the class of line. For this purpose, the terminals respectively numbered 00 . . . 49 and 50 . . . 99, that is one terminal per line, are connected in accordance with any desired method of grouping, to 20 class-of-line wires COL (Fig. 8), according to the class to which each of the lines belongs.

Figure 8:
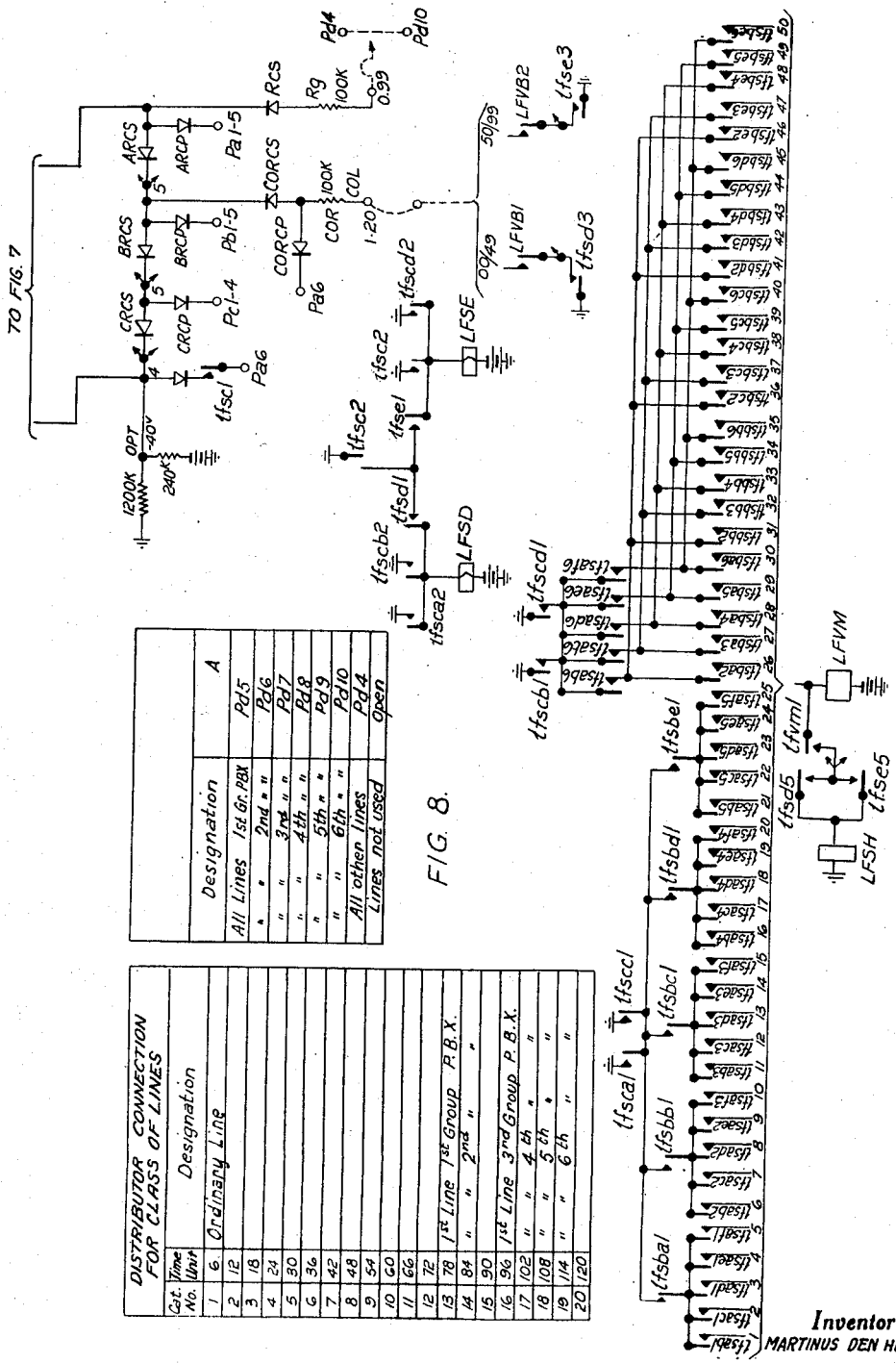

Fig. 8 shows, under the title "Distributor Connections for Class of Lines" a table indicating the wires COL 1-20 to which the various lines must be connected according to their class.

When the vertical magnet of a pair of outlets is actuated, earth is applied to the wire COL through a common make contact *lfsd3* or *lfse3* and one of the 50 contacts LFVB1, LFVB2, multipled on the vertical bars.

As shown in the drawing, the 20 terminals are each connected through a high value resistance COR, to three successive stages of gates CORCS, CORCP, BRCS, BRCP, CRCS, CRCP, controlled by the sources of impulses, so that the application of earth to any one of these wires produces an impulse in a corresponding time unit. Said impulse is applied to the grid circuit of the amplifier tube SVA3. The time unit in which this impulse is applied has been indicated, for a certain number of 20 terminals, in the table given in Fig. 8.

It will be seen that all these time units correspond to the last time unit of the 20 consecutive groups of 6 time units in a group of 120 time units defined by the sources P*a*, P*b*, P*c*. The first stage of gates, controlling all the connections of the 20 classes of lines, is connected in each class to the source P*a*6.

The relay LFSC being operative, the source P*a*6 is also connected through a gate to the grid circuit of the amplifier tube, by means of the make contact *lfsc1*, so that under these conditions these impulses will be suppressed which might arrive in any of the time units other than those associated with the 20 COL wires already mentioned.

An earth is then connected, through one of the contacts of the vertical bar corresponding to the selected line, to one of the 20 terminals according to the class of line. An impulse will then be transmitted, in the corresponding time unit, to the amplifier tube SVA3, which is then made conductive by the fact that a battery is connected to its cathode by the make contact *lfsc4*; the potential of the cathode then being such that the tube can respond to the impulses. These impulses are combined with a short impulse transmitted by the source *d2* which is connected through a small condenser GC1 to the grid of the tube SVA3, said tube being released once every 120 time units. The exact moment of this release is determined by the impulse transmitted by the source *d2* which, as may be seen in Fig. 18, is situated towards the end of the time unit in which an impulse is transmitted from the gate.

By means of a second double triode SVA1, 2, of which the anodes, cathodes and grids are connected in parallel, and in combination with a two-winding transformer, LFST, an impulse is retransmitted, said impulse beginning at the moment when the source *d2* is transmitting its short impulse and having a duration corresponding approximately to half a time unit of the source P*a*. It will then be understood that this impulse begins slightly before the end of the time unit in which a time impulse is produced by the rectifier cell system and that it is prolonged during the following time unit.

Figure 4:
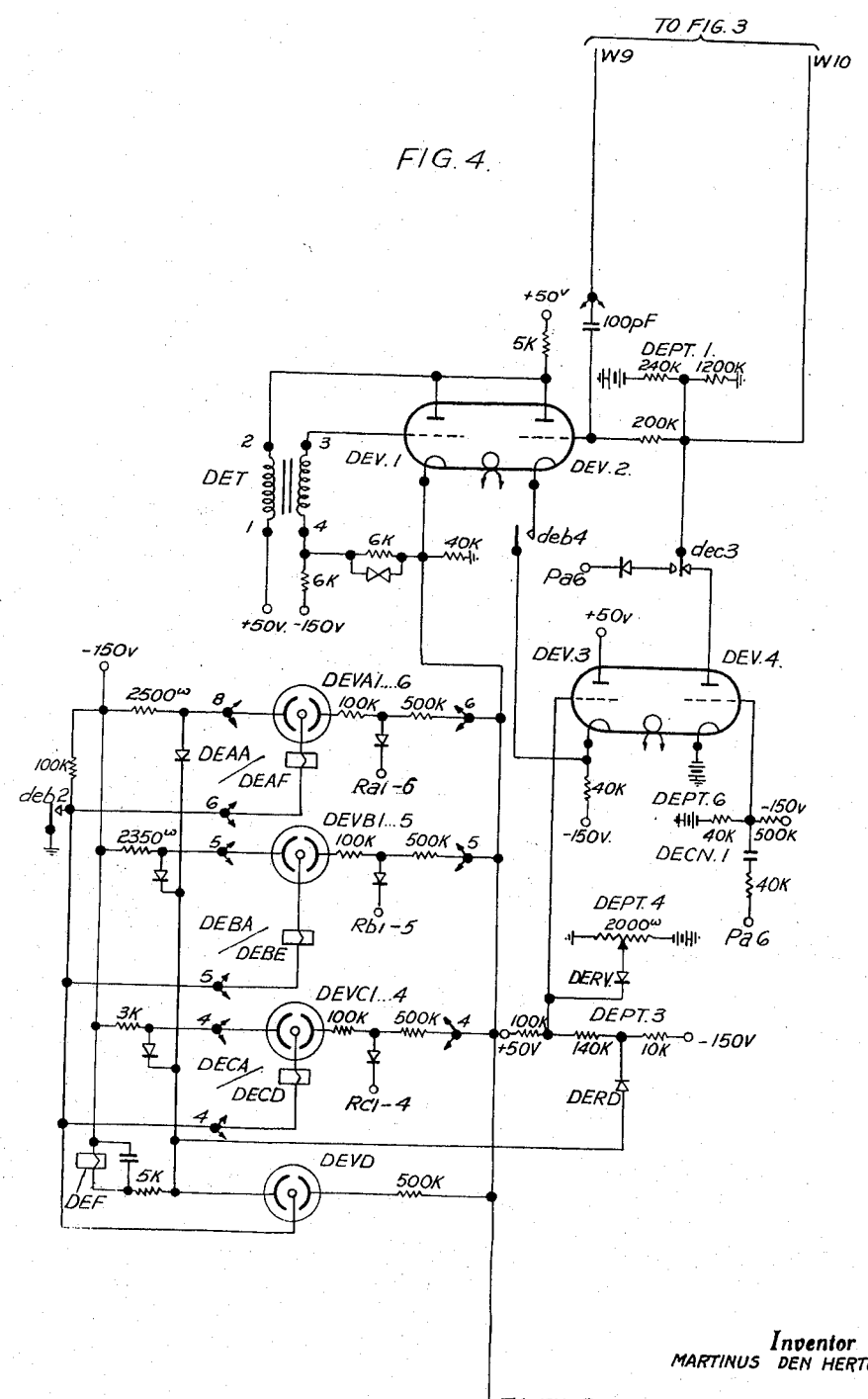
Figure 5:
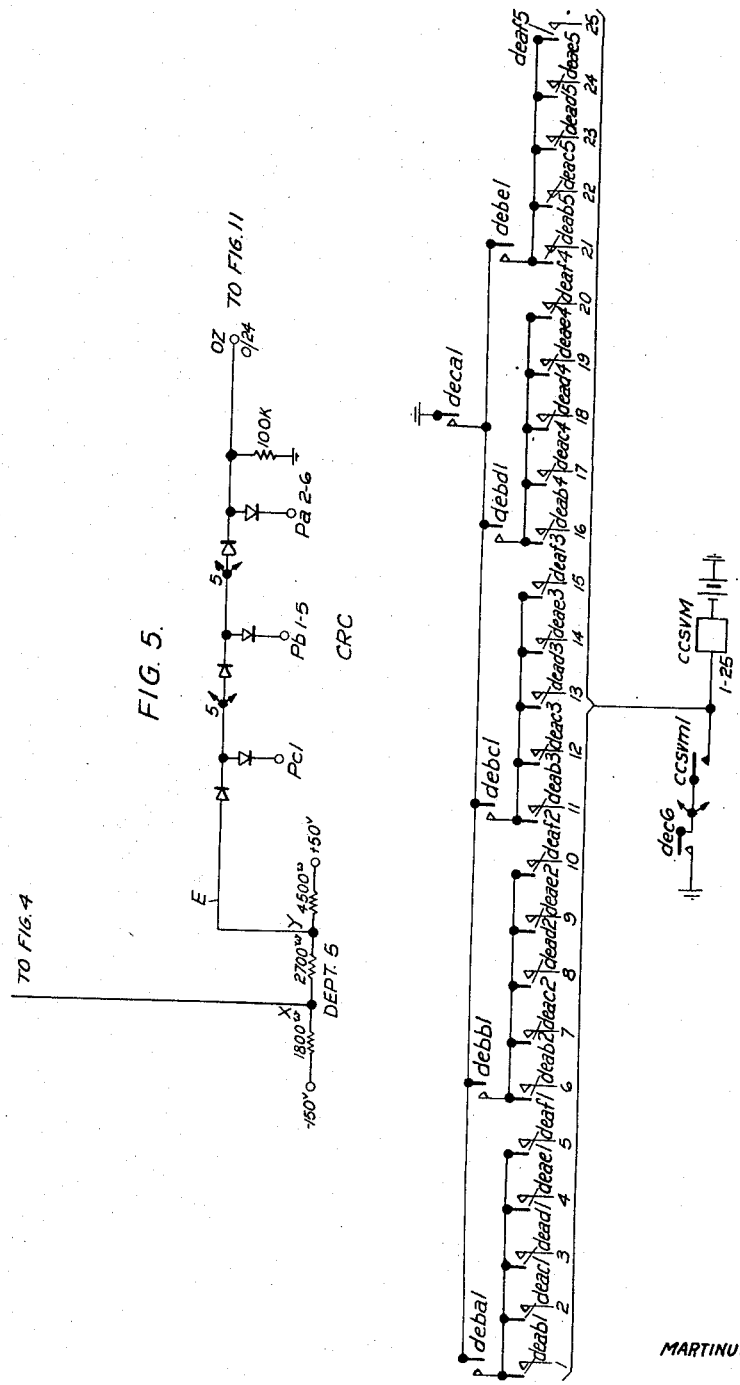

This impulse is now transmitted, by the back contact *lfsb3* of the relay LFSB (which in the meantime has released) to the wire D of the line finder circuit; this impulse is then transmitted to the grid of the tube V*a1* of the register circuit through the following circuit: contact *lfhm1*, at normal (Fig. 6), make contact *lfa6*, back contact LFHB1, wire D, cord to the register via *ccda6* back (Fig. 9), lead D via Fig. 10 to Fig. 12, *ok4* back, lead W21 through Fig. 4; the register responds to this impulse by identifying the time unit during which said impulse arrives, thus determining the class of calling line. The register records the class of line in the following manner.

The grid of tube Va2 is applied to earth through make contact ch2 and make contact or2. The grid of tube Va4 is again applied to earth through back contact fs4. The grid of tube Va3 is applied to the source Pa1 through back contact ot4, make contact si3 (contact si5 being open), so that the tube Va3 is blocked during all the impulses transmitted by the sources Pa2 . . . 6; said tube Va3 can only respond to the impulses during the transmission of impulses by the source Pa1, which only permits the detection of the impulses characteristic of the class of line.

When an impulse of this kind is detected, the tube Va1 operates and applies an amplified impulse to the grid of tube Vo2 (via lead w16) so that the tube Vo1 and the transformer TP, TS transmit an impulse via lead w15 on the wire C under the control of the detector source d3, at the beginning of the impulse immediately following that in which the impulse was applied to the grid of SVA3 in Fig. 7. The impulse sent has no effect on the common control circuit, but causes in the register the operation of a combination of tubes and relays characteristic of the class of line Voa . . . Voh, Oa . . . Oh, which for a normal line are the relays Oa, Oc. Relay Or (Fig. 13) is released.

Relay OK (Fig. 13) now operates through the following circuit: back contact ot5, back contact bu4, make contact dt2, back contact ph6, make contact oe4, make contact oa1. The opening of contact ok5 (Fig. 12) removes earth from the wire IB.

The horizontal magnet LFHM of the line finder operates in series with relay LFA (Fig. 6) by means of the earth applied through the following circuit: wire E, make contact lh1 (in Fig. 12), in the register circuit. Contact lfhm2 is opened, and disconnects the relays LFA and LFHM from the wire B and at the same time signals to the register that magnet LFHM is energized. Relay Ch (Fig. 13) of the register is released and the register then applies earth to the wire D in Fig. 9 via Fig. 10 by means of the following circuit: make contact dt4 (Fig. 12), make contact cs1, back contact ch1, make contact ok4. This earth is applied from the D wire through back contact LFHB1, make contact lfa6, and make contact lfhm1, to the common control circuit (Fig. 7), thus causing the operation of one of the two horizontal servo-magnets LFSHMA or LFSHMB according to whether contact lfsd2 or lfse2 is closed. In the example of a call transmitted by the line "00", the relay LFSD (Fig. 8) was energised and thus electro-magnet LFSHMA operates; in the case of a call sent by the line "99", the relay LFSE was energised, and thus it is magnet LFSHMB which operates. Consequently, a horizontal bar of the finder of which the horizontal magnet LFHM was energised in advance, is displaced to the left or to the right; in the first example, the linefinder connects the line "00" and in the second example, the line "99".

When the 5 contacts A . . . E connected to the calling line have been closed, the back contacts LFHB1, LFHB2, LFHB3 and LFHB4 are opened by the displacement of the horizontal bar, which at the same time closes the make contacts LFHB1 and LFHB2. This places the linefinder circuit in the talking condition, and at the same time disconnects it from the common control circuit.

Figure 14:
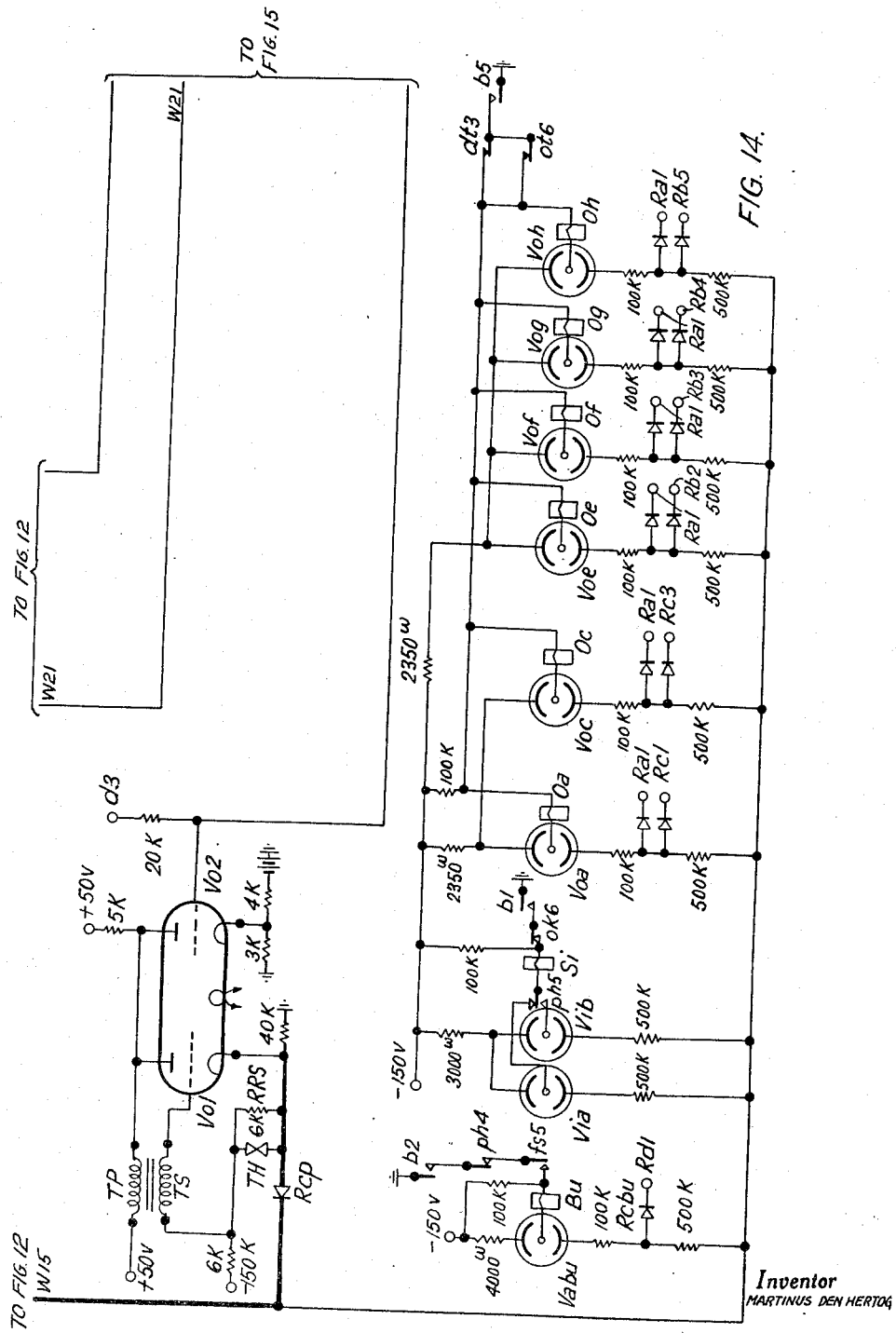

It will be noted that one of the magnets LFSHMA or LFSHMB (Fig. 7) according to the particular case, closes its holding circuit; make contact of magnet lfshma1 or lfshmb1, and contact of one of the relays LFSD or LFSE which was operative, so that the horizontal servo-magnet does not release immediately when the back contact LFHB1 is opened in the line circuit. Moreover, and on account of the opening of back contact LFHB4, the relay LFSC is released in the common control circuit, as also the test relays T, Dt (Fig. 12), connected in the register by the wire A; contact dt2 is open and releases the relay OK. The release of relay OK causes the opening of contact ok6 to release the relay Si (Fig. 14). The relay OK, through its contact ok4, suppresses the earth on wire D. The relay Cs in the register circuit releases through the opening of contact dt4.

The release of the relay LFSC (Fig. 7) causes that of the relay LFSD or LFSE (Fig. 8), which is released in its turn, which has the effect of setting the vertical bar in the normal position, as also the horizontal magnet LFSHMA or LFSHMB. The common control circuit is now released and can handle another call, owing to the fact that the relay LFSB is able to function. It will be noted that the release of the horizontal servo-magnet LFSHMA or LFSHMB does not return the horizontal bar of the finder to normal, because it is also maintained operative by the horizontal magnet LFHM which is peculiar to the line finder circuit (Fig. 6).

In the register, the release of relay Cs (Fig. 12) and the operation of the relays corresponding to an ordinary line causes the operation of relay Lt (Fig. 13) by means of the following circuit: back contact la9, back contact cs4, back contact fl4, make contact ce4, make contact oa1. Relay Lt is locked by the set of contacts: lt1 operative, and lh12 operative.

The relay CCDA of the cord circuit (Fig. 10) is then energised through a circuit which will be described later.

The common control circuit of the line finder and of the final selector can simultaneously handle any number of individual line finders and/or final selectors, so that it effects its selective operations for several calling lines and/or several wanted lines at a time, the selection of each line being controlled by a register which handles each call. Consequently, it will be seen that the individual line finder circuits and final selector circuits are not busy when one of them is seized to make the selection of a line by means of the common control circuit, so that any line finder or final selector can be seized for other calls in the time unit under consideration: when this happens these line finders and final selector circuits will all be connected in parallel to the common control circuit on account of the operation of their respective relays LFA, FA. The common control circuit then sends the indication coming from the scanning circuit simultaneously through all the line finders and all the final selectors connected to the corresponding registers. When one or more of said registers responds to the impulse received from the scanning device, and returns an impulse through the wire C, the cold cathode tubes operate in the same manner as that already described.

Relay Si operates, in the manner already indicated, in two or more registers which have simultaneously responded to the impulses from the scanning device; each of said registers then connects the two test relays T and D*t* (Fig. 12) to the wire A. These test relays effect a double test operation in accordance with a well-known method, so that these relays can only operate, and finally close their contacts in order to proceed with the operations already described, in one only of these registers. In the other register or registers in which the test relays have been unable to operate immediately, a circuit is closed through back contact *t1* of relay T and a make contact *ot3*, which causes the short-circuiting of the winding of relay B; this relay, which was energised after the seizure of the register through the contact *lh2*, then releases slowly. In releasing it suppresses the earth on the anode circuit of the tube V*ia*, so that the relay S*i* falls back. The register is then restored to the selective position, the selective operations then being resumed.

It has been explained that the common control circuit can effect the selection and hunting for several line finders and several final selectors simultaneously. This makes it necessary, as soon as the cold cathode tubes have recorded an indication of selection for a call, for the sending of an indication of selection to the registers serving other calls in the same multi-switch to be stopped; thus, there can be no confusion due to the fact that two or more registers are trying to effect the recording successively, by the cold cathode tubes, of the selective information relating to the call which they are handling, during the time in which the cold cathode tubes are already busy with the recording or before they are prepared for the next recording. This is done by means of the tube LFSVD (Fig. 7) in co-operation with the triode SVA4, which acts as suppressor tube. When the tube LFSVD is fired at the same time as a combination of tubes LFSVA . . . LFSVC, it modifies the potential of its cathode which was —150 v., being connected to the negative terminal of a 150 v. battery through the winding of relay LFSF and an individual resistance. The potential of the cathode is brought to about —75 v. The cathode of the tube LFSVD is connected to one point of a potential divider LFSPT, through a rectifier cell LFSRD. The potential of said point of the potential divider is normally —142 v. The potential divider has on the one hand its two ends respectively connected to the negative terminal of a 150 v. battery, and to the positive terminal of a 50 v. battery and on the other hand another point connected to the grid of the suppressor tube SVA4; this point is normally at the potential of —21.5 v. A second variable potential divider APT applies a potential of 20 v. through the rectifier cell ARC to the grid of the tube SVA4, thus preventing this grid from falling to a more negative potential.

When the grid of suppressor tube SVA4 is at —21.5 v. potential, the cathode is maintained at an adjacent potential; this potential moreover is transmitted to the cathode of the amplifier tube SVA3, which, under these conditions, can respond to the impulses sent to its grid through the assembly of rectifier cell systems.

When the tube LFSVD is ionised, the potential of the point of the potential divider LFSPT, which was originally —142 v., is raised to —75 v. Owing to this, the potential of the point of the potential divider connected to the grid of the suppressor tube SVA4 is modified so as to be raised to about 0 volt; owing to this, the cathode of this tube is at about the same potential. Moreover, the cathode of the amplifier tube SVA3 has its potential raised to about 0 volt, and owing to this, is rendered strongly positive with respect to the grid, the said tube then stops transmitting any impulse which might then arrive from the final selector in hunting for a wanted line. At the same moment, the cathode of suppressor or tube SVA4 is connected through the wire I to the call detector (Fig. 2), where it acts in an identical manner on the cathode of suppressor tube VAD2, thus preventing the transmission of impulses by the impulse regenerator tube VAD4, on to the wire III. Consequently, if other lines in the same group of 100 lines were calling, they could not send their selective information, that is to say, the impulse characteristic of the tens digit and the units digit of the number of the calling line, to the other line finders and other registers.

It will be noted that the tube LFSVD is extinguished at the same time as the other cold cathode tubes when the relay LFSC operates, and the relay LFSB releases. The transmission of impulses to the final selectors is then prevented owing to the fact that the contact *lfsc1* (Fig. 8) through a gate, connects the impulse source P*a6* to the grid circuit of the amplifier tube SVA3, so that from this moment, only those impulses which arrive during the time unit characteristic of the class of line can be transmitted. Moreover, the transmission of selective impulses in the linefinders is then prevented because the wire III is disconnected by the contact *lfsb3* at normal.

Tube LFSVD can, moreover, be extinguished at the moment when relay LFSB releases owing to the fact that its function has been transmitted to another tube as previously explained.

When a call appears on a line, impulses are sent by the call detector on the wire II, impulses are simultaneously sent on the wire III, and these impulses are characteristic of the whole of the tens and units digits of the number of the calling line. The impulses transmitted on the wire II are sent by the impulse generator tube VAD4 and are placed in the call detector circuit (Fig. 2) under the control of a short impulse *d1* which is applied to the potentiometer CDT, and which is so situated in time that the impulse begins a little earlier than the impulse regenerated by the tube SVA3 in the common control circuit of the final selector, under the control of the short impulses *d2* (Fig. 7). Moreover, the impulses regenerated on the wire II are also a little longer than the impulses regenerated by the tube SVA3, so that they end a little later. The impulses on the wire II are transmitted through a rectifier cell, to a point of the potential divider LFSPT (Fig. 7) which is normally at the potential —39 v.; the potential of this point is modified by the impulses so that the suppressor tube SVA4 modifies the potential of the cathode of the amplifier tube SVA3 in such a way as to render it positive with respect to the grid potential of said tube.

In this way the impulse which is produced in the common control circuit during the time unit characteristic of the calling line is completely suppressed. Consequently, a register which controls the hunting by a final selector of a line which is already calling, will not receive impulses during the time unit characteristic of this line, and it therefore will not be able to complete its selection as long as the calling line has not been selected by a line finder. From this moment the line will be busy in the normal manner and a register controlling the hunting for such a line will receive the busy indication, as will be described for the final selector.

The release of the connection is indicated at any moment by disconnecting earth from the wire E, which causes the release of relay LFA and of magnet LFHM if the latter is operative. The release of the latter causes the return of the horizontal bars to normal, thus opening the contacts A . . . E and re-establishing the back contact LFHB1 . . . 4.

When the line finder finds the calling line, the potential of the battery is transmitted to the wire C of the subscriber's line owing to the fact that the battery is applied through make contact *lfa*7 and a 240-ohm resistance to the wire C of the line finder. The line then ceases to be calling and no impulse will be sent from the moment onwards, from this line to the call detector; consequently the impulse regenerator ceases to operate and relay DT (Fig. 2) is released.

However, it may happen that another subscriber's line is transmitting a call at this moment and this line will continue to send its impulses to the call detector, and the regenerators will continue to operate.

In this case, in order to obtain the momentary release of relay DT so as to release the switch CCS, earth is applied from make contact *ccda*8, of the cord circuit (Fig. 10), through contact E of switch CCS and make contact *dt*2 (Fig. 2), to the cathode circuit of the left hand amplifier tube VAD1 of the call detector circuit.

Amplifier tube VAD1 then ceases to operate, so that the regenerator acting on the relay DT is also stopped and the relay DT releases.

The opening of contact *dt*3 causes the release of horizontal magnet CCSHM and the return of its horizontal bar to normal; contacts A . . . E are opened and the connection between the call detector and the cord circuit is broken.

The earth applied to the cathode circuit of the amplifier tube VAD1 is disconnected by the contact *dt*2, from the moment when relay DT releases, but at the same moment contact *dt*4 has opened the energisation circuit of the relay DT, which circuit is only closed by the back contact DHB3, when the horizontal bar has returned to normal, so that the relay DT cannot be again energised for the next call until this has happened.

The maintenance of the connection is now entirely under the control of the relay Lb (Fig. 13) in the register circuit; said relay is no longer energised by the call detector circuit, but is then maintained operated by means of contact *is*1, under the control of relay Is (Fig. 12) of the register circuit; the relay Is is energised in series with the loop of the calling subscriber's line, as soon as the relay Lt (Fig. 13) is energised and has closed its contact *lt*3 and *lt*7.

When relay Is has operated, the tone indicating that the register is ready to receive dialling information is sent to the calling subscriber by means of transformer DTC, said tone being suppressed when the first dialling impulse is received, as is well known in the art.

The dialling impulses, characteristic of the wanted subscriber's number, are received and stored in any well known manner. When the pulses are all receiver, a relay Fg (not shown) is energised and closes the energisation circuit of relay Fs (Fig. 13) through the following circuit: make-contact *fg*2 (of relay Fg not shown), back contact *fo*1, make contact *oe*5, make contact *oa*7 of the normal calling class-of-line relays which are in operation.

The contacts of relay Fs prepare the operation of the selection control tubes Va2 . . . 4 for the final control of selection. The grid of tube Va2 is connected by means of make contacts *ch*2, *or*2 back, *fs*6 make, *ph*3 back, to one of the four sources Pc selected by means of the interconnection device of the register of dialling impulses. The grid of tube Va3 is connected through: back contact *ot*4, back contact *si*5, make contact *fs*2, back contact *ph*6, to one of the five sources Pa2 . . . 6 which are also selected by means of the dialling impulse register interconnecting device. The grid of tube Va4 is connected through: make contact *fs*4, back contact *ph*1, back contact *or*3, to one of the sources Pb1 . . . 5; said sources are also selected by means of the interconnecting device of the register and dialling impulses. When relay Lt (Fig. 13) is energised an earth, connected by means of the make contact *lt*5 (Fig. 12), make contact *lh*6 and wire CAL, permits the energisation of relay CCDA of the cord circuit (Fig. 10), as already described. Relay CCDA makes it possible to connect the wires C and D of the register to the outgoing C and D wires by means of contacts *ccda*3 and *ccda*2.

The object of a group selector circuit is to effect the selection of a subscriber's line, under the control of a register, in accordance with the tens and units digits of the said subscriber's number. The same type of multi-switch as already described, is used in the group selector circuit.

A multiswitch of this type is employed to serve 100 subscribers' lines and comprises a certain number of individual final selectors.

Each individual final selector circuit (Fig. 16) comprises a so-called "horizontal magnet" HM which forms part of the multi-switch and a relay FA.

The common control circuit, shown in Figs. 7 and 8, has also been provided in common for all the individual final selectors serving a group of 100 lines. This circuit controls the operation of a vertical bar and of a horizontal bar of the multi-switch to complete a connection for a single call at a time, under the control of the register which controls the selection operations by the final selector and after the seizure of the desired outlet. The operation of the final selector circuit will be described at the same time as that of the common control circuit.

The selections by the tens and units digits are not carried out separately; one selection operation is carried out at a time under the control of the tens and units digits of the wanted subscriber's number, stored in the register, in order to select a particular line from the 100 lines which may be reached through the multi-switch.

The selective operations cannot therefore begin as long as the wanted subscriber's number has not been completely dialled.

Arrangements have been provided in the common control circuit of the final selector so that a class indication chosen from several such indications may be allocated to each line by means of jumpering. The common control circuit is arranged to transmit this condition to the register which is handling the call in such a way that the latter can, if necessary, modify or prevent the operations relating to the establishment of the communication, according to the class of line.

Two different methods have been provided for handling the calls to groups (PBX), these two methods of procedure may be used separately or in accordance with any suitable combination.

The method of handling calls to groups (PBX) will now be explained. Firstly, each group of 100 lines may comprise any number of small groups (PBX), each of the lines of said groups having consecutive numbers, preferably in the same decade, that is to say, having the same tens digit.

The common calling number of such groups is that of the line having the lowest number. The other lines of the groups may be called individually by their own number. If busy, the selection of any line of a group except the last, causes hunting among the remaining lines of the group.

This is interesting when a large number of small groups (PBX) is employed comprising only two or three city lines and equally distributed over all the groups of 100 lines to equalise the traffic.

Secondly, a limited number of groups (PBX) can be formed in each of the groups of 100 lines by combining any assembly of lines in one group. Thus, for example, it is possible to form an assembly of 6 groups (PBX) of this type, with the arrangements indicated in the common control circuit. The common calling number of the group which causes hunting in the other lines of the group, when busy, may be that of any one of the group; in other words this common calling number is not necessarily the lowest or the highest number of the lines of the group. The other lines of the group may be called individually by their number but do not cause any hunting if they are busy.

This possibility is interesting when a single line has to be transformed into a group (PBX) or when the number of lines in a group of the type previously mentioned has to be increased, in the particular case in which no lines are available making it possible to form or to increase a group of consecutive lines, but in which it is possible to employ other lines in the group of 100 lines, and when at the same time it is desired to reach such lines by a hunting operation without changing the call number of the existing line or group.

When the final selector has been seized by the group selector, the relay FA (Fig. 16) of said final selector is energised through the following circuit: earth, back contact $ok5$ in the register (Fig. 12), back contact $ct3$, make contact $lt4$, make contact $lh10$, contact OB of multi-switch RS, wire OB, and, in the cord circuit (Figs. 10 and 9), make contact $ccda4$, and, in the final selector (Fig. 16), back contact $hm2$ associated with the horizontal magnet HM, relay FA, battery; the earth of contact $ok5$ (Fig. 12) also causes the operation of the relay Ch (Fig. 12) in the register.

The operation of relay FA immediately connects the final selector circuit to the corresponding common control circuit respectively connecting the wires A, C and D to the common control circuit through the make contacts $fa5$, $fa2$, $fa6$.

Moreover, relay FA prepares a holding circuit for itself through the E-wire, in series with the winding of the horizontal magnet HM and the make contact $fa4$, but the magnet HM cannot operate at that particular moment, because direct earth is connected to both ends of its winding; the E-wire is in fact directly connected to earth through make contact $ccda5$, associated with the cord circuit (Fig. 9).

The common control circuit is brought into operative condition, earth being transmitted in said common control circuit through the following circuit: back contact HB3 of the horizontal bar (Fig. 16), make contact $fa1$, via lead $w20$ to Fig. 7, back contact $lfsh1$, back contact $lfsc3$. This earth energises relay LFSB in series with the resistance to the battery. Through its contact $lfsb1$, relay LFSB applies earth to the anodes of the cold cathode tubes LFSVA, LFSVB, LFSVC, LFSVD; through its contact $lfsb4$, it applies a —150 v. potential to the cathode of the left-hand portion SVA3 of the double triode SVA3, SVA4, thus preparing the common control circuit to control the selection of the wanted line by the final selector.

A 100,000 ohm resistance $Rg$ (Fig. 8) is provided in the common control circuit for each of the 100 lines accessible to one group of final selectors; one end of each resistance is connected to one of the 100 terminals which are connected, as desired, to 7 electric impulse sources $Pd4$ . . . $Pd10$. There is one terminal to each line.

The other end of each resistance $Rg$ is connected through an individual rectifier $Rcs$ with 3 successive stages of rectifiers in series, ARCS, and the rectifiers BRCS and CRCS, already described, said stages including shunted rectifiers ARCP and the rectifiers BRCP and CRCP, already described, and thence to the —40 v. potential supplied by the potentiometer OPT located in the common control circuit; this potential is applied through the high resistance ORH (Fig. 7) to the grid of the amplifier tube SVA3, SVA4. The branch rectifiers ARCP are connected to current sources $Pa1-5$.

It will be assumed that the resistance $Rg$ (Fig. 8) is connected to one of the sources $Pd4$ . . . $10$ and that said source has a potential of —16 v. No current can flow from this source to the potentiometer OPT, and, thence to the grid circuit of tube SVA3, except when this potential of —16 v. exists simultaneously on the three rectifiers ARCP, BRCP, CRCP, connected to the scanning circuit. When the potential supplied by the three sources or by any one thereof connected to ARCP, BRCP, CRCP is —40 v., and when the potential applied to $Rg$ is —16 v., there is in effect a potential of —40 v. on the circuit connecting the resistance $Rg$ to the common control circuit of the final selector and to the potentiometer OPT, because said —40 v. potential can be transmitted through a branch rectifier, such as ARCP, which then has a low resistance; the difference of potential between the lower terminal of $Rg$ and the source connected to the branch rectifier is then absorbed in the resistance $Rg$ and no current flows to the potentiometer. The branch rectifiers, as already described, act as gates which may open or close the circuit terminating in potentiometer OPT. Current can only flow to the potentiometer when the normally open gate device is closed by application of —16 v. potential by the associated sources. It will be clear from this that current will only flow from one of the sources Pd to the potentiometer when all the gates controlling the circuit connecting resistance $Rg$ of an individual line to the common potentiometer OPT are closed simultaneously. Consequently it is only at this moment that the potential of the potentiometer and consequently that of the tube SVA3, is brought to about −16 v., due to the relative values of the various resistances placed in the circuit.

It will now be seen that the three sets of sources Pa, Pb and Pc are connected to the gates in such a way that the moment at which these three gates are closed differs for each of the 100 lines; each of the lines will thus supply an impulse to the grid circuit of tube SVA3 for a single time unit which characterises this line. Fig. 19 is again referred to for the combinations of sources for identifying each line. Again it will be noted that this table mentions time units numbered from 1 to 120, arrangements being provided so that the sixth unit of each group of six is not used for sending impulses, 100 units out of 120 being used for the 100 lines. Each outlet of a final selector has its D wire permanently connected in the common control circuit (Fig. 8) to an individual rectifier ARCP connected to one of the sources Pa1 . . . 5. Each group of 5 outlets connected to different sources Pa is associated with a second common stage made up of the gate BRCS and BRCP; thus in all, in the second stage, there are 20 gates which in turn are divided up into four groups of 5. In each second stage group the 5 gates are each connected to one of the five different sources Pb1 . . . 5. The gates of one group are connected to a third stage of gates made up of rectifiers CRCS and CRCP; four gates, such as the foregoing are provided, each being connected to one of the sources Pc1 . . . 4.

As indicated, each of the lines is connected to an individual rectifier associated with one of the sources Pa1 . . . 5; but it is also connected to one of the sources Pd4 to Pd10 through rectifier Rcs, resistance Rg and a jumpering connection.

This connection characterises a certain class to which the line belongs; a connection to a particular source Pd, for example, indicates that said line is a single line or that it is the first line of a group (PBX).

It is obvious that the −16 v. potential supplied by the source Pd connected to the line will be absorbed in resistance Rg and that the potential on the upper terminal of this resistance will be kept at −40 v., unless the sources Pa, Pb, Pc to which the individual test wire is connected are each supplying a −16 v. potential. Consequently, for each individual line of class No. 4, the potential on the upper terminal of Rg must be brought to a value which can influence the grid of SVA3 during the period in which source Pd4 is relatively positive; i. e. in the time units Nos. 361 . . . 480. Similarly, a line or lines connected to Pd5, for example, a first line (PBX) can only affect the potential of the grid circuit in the time units 481 . . . 600.

It is clear from the above that, for each individual line, a −16 v. impulse will only be applied to the grid circuit of tube SVA3 for one only of the 1200 time units characterising the line concerned.

For example, line 25 will send an impulse, according to the table of Fig. 19, in time unit No. 31, under the control of sources Pa1, Pb1 and Pc2. When this line is connected, for example, to source Pd5, said source supresses the impulses in all time units except the fifth period of 120 time units, so that under these conditions, an impulse is only sent in the 31st time unit of the fifth period, i. e. in time unit No. 511.

As the isolated lines are connected to the impulse source Pd4, it is clear that all the isolated lines which are available for sending an impulse are those which occur in a series of time units numbered 361 to 480. All these impulses are sent through the final selector to the register circuit through the back contact hm1 (Fig. 16), make contact fa6, back contact HB1 and the wire D to the register.

Figure 15:
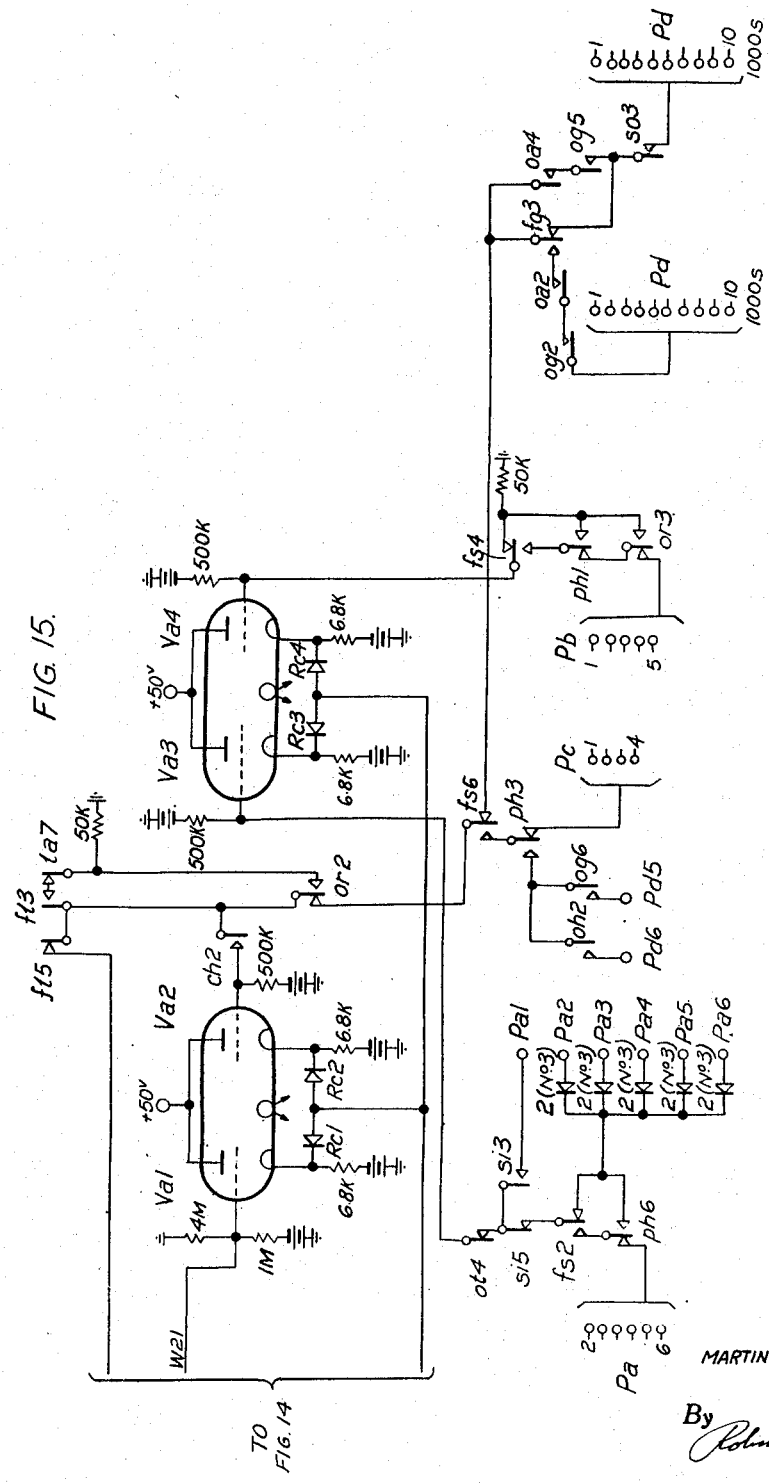

The positive impulses back on the D wire are sent to the grid of the thermionic tube Va1 (Fig. 15) through the back contact ok4 (Fig. 12), lead w21 to Fig. 14, and via Fig. 14 to Fig. 15. Normally, the grid of Va1 is very negative, as has already been explained, owing to the fact that the resistance inserted between the positive earth and the grid is of four megohms, while the resistance inserted between the negative battery of 48 v. and the grid is only of 1 megohm. The grid of the twin tube Va2 and that of each of the two other twin tubes Va3, Va4, are also very negative owing to the fact that they are connected permanently to a negative battery through 500,000 ohms.

It will be assumed that the register controller has recorded the two digits on a decimal basis in accordance with a well known method and that the said digits have been translated in accordance with a system on a 4, 5, 6 basis, as was necessary for the control of the selection in a system like that under consideration. The translating means provided may be of a well known type, and have been employed in register controllers for some years. Switching devices such as weak current electromagnetic relays of the telephone type, then effect the connection of one source in each of the groups of sources Pc, Pb, Pa in accordance with the translation that has just been made; said sources are connected through the following circuits; back contact ph3, make contact fs6, back contact or2, make contact ch2, and grid of the tube Va2; back contact or3, back contact ph1, make contact fs4, and grid of the tube va4; back contact ph6, make contact fs2, back contact si5, back contact ot4, and grid of the tube Va3.

The circuit arrangements previously described have been provided in accordance with switching system practice, which has been in use for a number of years, and are within the competence of any switching circuit engineer it is therefore considered that the insertion of detailed circuits and the description of such arrangements would uselessly prolong the specification and would be liable to make the invention less clear.

By means of the above arrangement, all impulses received on the grid of tube Va1 except those in the time position of the wanted line will be suppressed, but the wanted line impulse will be delivered to the grid of the tube Vo2. The voltage impulse produced on the terminals of the load resistance of Vo1 is then applied to the final selector through the rectifier Rcp and lead w15 to the wire C.

The impulse sent on the C wire will also cause the firing of the cold cathode tube Via (Fig. 14), of which the cathode is at the potential of −150 v., which causes the energisation of relay Si through the following circuit: cathode and anode of tube Via, back contact ph5, relay Si, back contact ok6, make contact b1, earth. The tubes Vabu, Voa . . . Voh which are shut off are not fired at the moment concerned, on account of the control exerted on their control electrode by the associated rectifier systems.

Relay Ot is energised through the following circuit: back contact or1, back contact cs5, make contact si4; the closing of contact ot1 causes the connection of the test relay T (Fig. 12) to the wire OA.

The impulse from tube Vo1 is retransmitted by the register to the common control circuit through the following circuit: make contact lh3, C contacts of switch RS (Fig. 12), C wire (Fig. 10), make contact ccda3 (Fig. 9), wire C (Fig. 16), back contact HB2 in the final selector, make contact fa2, and lead w22 to cold cathode tubes LFSVA1 ... 6, LSFVB1 ... 5, LFSVC1 ... 4; it arrives in the time unit following the one in which the tube SVA3 has received an impulse.

As has been previously explained an impulse arriving in any time unit will always cause the ionisation of tube LSFVD and of one tube in each of the three groups LFSVA, LSFVB, and LFSVC, so that a combination of three tubes taken from each of the 3 groups, characterises each of the time units.

For example, in the case of an impulse from outlet No. 25 during a period of transmission of the source Pd5, an impulse is produced in time unit No. 511, that is, in time unit 120×4+31, as has previously been explained, and will arrive on the cold cathode tubes of the common control circuit in time unit No. 512.

This impulse is received in a time unit in which only the sources Ra2, Rb1 and Rc2 are at relatively positive potential, so that the tubes LFSVA2, LFSVB1 and LFSVC2 are ionised and cause the operation of their anode relays LFSAB, LFSBA and LFSCB.

It will be seen that each of the two groups of outlets of the switch corresponds to 60 time units taken in the cycle of 120 time units. Each of the two sets of 60 time units comprises 6×5×2 combinations of the sources Ra, Rb, Rc. Referring to the common control circuit, it will be seen that the relays LFSCA ... LFSCD correspond to the four time units Rc, LFSCA, LFSCB, LFSCC, LFSCD characterising respectively the two groups of 50 outlets, 00-49, and 50-99, LFSCA, LFSCC, and LFSCB, LFSCD each respectively characterising the two groups of 25 series of contacts 00-24, 50-74; and 25-49, 75-99 which are controlled by the vertical magnets 1-25, and 26-50. The first group of outlets is connected by a selection operation by one of the horizontal servo-magnets LFSHMA; the second group of outlets is connected by a selection operation by the other horizontal servo-magnet LFSHMB. The relays LFSD and LFSE (Fig. 8) respectively are actuated to control the selection operations under the control of the relays LFSCA, LFSCB and the relays LFSCC and LFSCD.

If we refer to the table in Fig. 19, we find the impulse sources Pa, Pb and Pc for each of the outlets. As has been indicated, the sources Ra, Rb and Rc are used in relation to the sources Pa, Pb and Pc in such a way that outlet No. 25 which corresponds in said table to the sources Pa1, Pb1 and Pc2, also corresponds to the sources Ra2, Rb1, and Rc2, the register tubes LFSVA2, LFSVB1 and LFSVC2 and the associated relays LFSAB, LFSBA and LFSCB operating for outlet No. 25. This is in accordance with the combination of contacts making it possible to actuate the vertical magnets shown in Fig. 8, the contacts lfsba2, lfsab6 and lfscb1 causing the operation of the vertical magnet VM No. 26. Similarly, for outlet No. 74, the sources Ra6, Rb5 and Rc3 will cause the energisation of relays LFSAF, LFSBE, LESCC and magnet VM No. 25 will be energised through the contacts lfsaf5, lfsbe1, and lfscc1.

First of all, a circuit is completed for one of the 50 vertical magnets LFVM; thus, for example, this circuit is as follows for out No. 25: make contacts of relays LFSAB, LFSBA and LFSCB actuated by the tubes LFSVA2, LFSVB1 and LFSVC2, and vertical magnet No. 26.

Secondly, one of the relays LFSD and LFSE pulls up, on account of the operation of one of the relays LFSCA ... LFSCD in series with one of the tubes LFSVC1 ... 4; the relay LFSD operates under the control of one of the relays LFSCA or LFSCB through contacts lfsca2 or lfscb2; relay LFSE operates under the control of one of the relays LFSCC or LFSCD through the contacts lfscc2 or lfscd2. The vertical magnet which has operated completes a holding circuit for itself through its own make contact lfvm1, one of the make contacts lfsd5 or lfse5, relay LFSH and earth. Relay LFSH, however, does not operate at this time because it has earth on each terminal.

At the same time, the vertical magnet LFVM which has been energised actuates the associated vertical bar upwards; the vertical bar No. 26 is actuated in the case of a call to outlet No. 25, and vertical bar No. 25 is actuated in the case of the outlet No. 74. These two bars control contacts which are respectively connected to outlets No. 25 and 75 and the outlets No. 24 and 74.

A circuit is closed by one of the contacts lfsd3 or lfse3 to one of the contacts associated with each vertical bar actuated, so that a special circuit can be completed determined by the selected outlet for the purpose of class-of-outlet indication, as described in connection with the operation of the line finder.

As has been indicated, the register circuit has caused the connection of the test relay T on the wire OA (Fig. 12). Relay T is then energised, through the following circuit: earth, relay T, make contact ot1 and circuit already described, as far as wire A in the final selector (Fig. 16), back contact HB4, make contact fa5, via lead w23 to Fig. 7, relay LFSC in the common control circuit, 240-ohm resistance, battery. The relay LFSC pulls up. The closing of contact t1 completes a double test circuit through relays Dt, T in accordance with a well known method; the relay Dt is energised also, provided that the line concerned has only been selected by the register controller concerned. The contacts ot6 and dt3 are both maintained open, so that all the class-of-line relays Oa ... Oh, which are in the operative position, fall back. Contact dt4 is closed and energises relay Cs (Fig. 12). The closing of contact cs2 causes the energisation of relay Or (Fig. 13) provided that all the relays of outlets Oa ... Oh have returned to normal, due to the opening of contacts ot6 and dt3. The contact or1 is opened and restores relay Ot and its associated contacts to normal, so that earth is again applied to the relays and class-of-outlet tubes Oa ... Oh, Voa ... Voh. The operation of relay LFSC in the common control circuit completes a holding circuit for that one of the relays LFSD or LFSE which has operated, so that this relay, like the magnet LFVM which has operated and is controlled by LFSD or LFSE, is rendered independent of the position of the anode relays LFSCA . . . LFSCD.

As has been indicated, the return impulse transmitted by the register through the wire C has energised the tube LFSVD. The relay LFSF (Fig. 7) is energised in series with the tube LFSVD and short-circuits the winding of relay LFSB, so that said relay begins to release slowly. Before the relay LFSB can release completely, relay LFSC can operate, so that the circuit of the relay LFSB is opened by the back contact lfsc3, relay LFSB then releasing immediately. In releasing it opens its contact lfsb1, which in turn opens the anode circuits of all the cold cathode tubes, so that the tubes which were ionised are extinguished, thus causing the release of the corresponding anode relays. The opening of contact lfsb4 does not put the tube SVA3 out of action, since contact lfsc4 is closed.

The release of the anode relays causes the operation of relay LFSH (Fig. 8), which opens the energizing circuit of relay LFSB (Fig. 7).

After having thus determined the identity of the line selected, a control operation will be effected in order to determine the class-of-outlet; for this purpose the make contacts LFVB1 and LFVB2 (Fig. 8) associated with the vertical bars are connected by jumpering, in a manner already described for the line finder operation for each of the lines, to one of the 20 class-of-outlet wires COL, according to the class to which the outlet belongs.

When relay LFSC has operated, the source Pa6 is also connected through make contact lfsc1 and a rectifier to the potentiometer OPT; in these conditions the impulses which might arrive in any other time units than those corresponding to the 20 classes-of-outlets are eliminated.

Consequently, according to the class of line, earth will be connected to one of the 20 class-of-outlet wires through the contact of the vertical bar which corresponds to the selected line; impulses will be transmitted in the corresponding time unit corresponding to the amplifier tube SVA3, which is maintained in working condition due to the fact that the battery is maintained on its cathode through the make contact lfsc4, before the contact lfsb4 has been able to open, said tube then being able to respond to the impulses.

Figure 16:
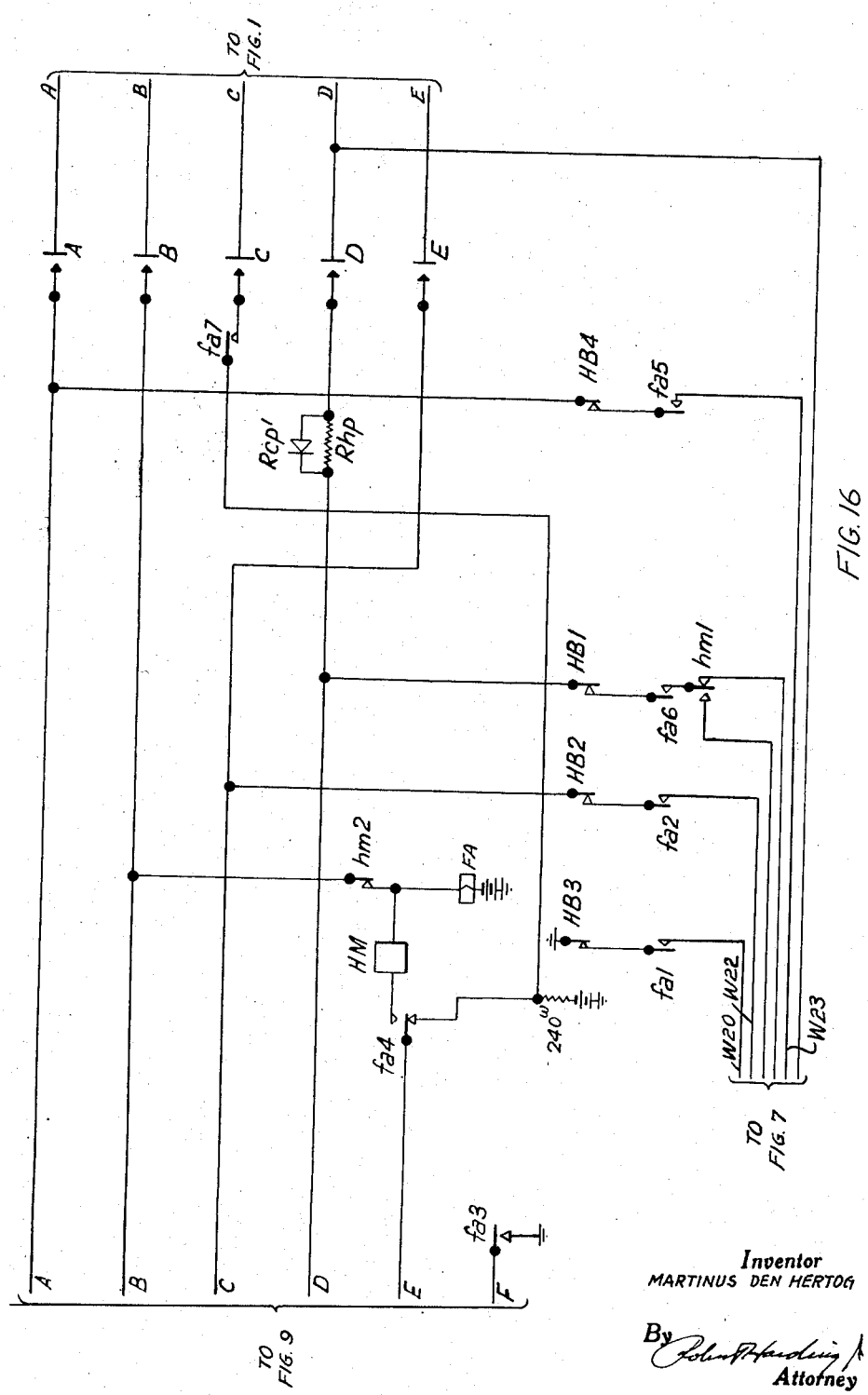
Fig. 16 shows the final selector circuit.

The regenerated impulse is then transmitted to Fig. 16 and via back contact hm1, make contact fa6, back contact HB1, wire D to Fig. 9, make contact ccda2, wire D of Fig. 10, to the register. In the register the operation of contacts or2, or3 (Fig. 15), during the checking of the release of the class of outlet relays Oa . . . Oh, has disconnected the grids of the tubes Va2, Va4, from the sources Pc and Pb in order to connect them to earth through a 50,000 ohm resistance. Owing to this, the cathodes of tubes Va2 and Va4 are positive so that from this moment, the rectifiers Rc2, Rc4 are non-conductive and cannot absorb the impulses from the source d3 connected to the grid circuit of the tube Vo2. At the same moment, the tube Va3 on account of the release of relay Ot, is connected to the impulse source Pa1 through the back contact ot4 and the make contact si3. Consequently, rectifier Rc3 now absorbs all the impulses coming from the source d3 which correspond to the transmission periods of the sources Pa2 to Pa6 (Fig. 14). It does not absorb the impulses corresponding to the periods of transmission of the source Pa1. Consequently, the register may be influenced by the impulses arriving in one of the time units corresponding exclusively to the periods of transmission of Pa1, and will not react to any of the impulses which might arrive during periods corresponding to the control of selection.

When the impulse corresponding to the class selected is applied to the wire D in a time unit of transmission of the source Pa1, the tubes Va1 and Va3 are simultaneously conductive and an impulse is sent to tube Vo2. The impulse generator, comprising the tube Vo1, then produces a regenerated impulse which begins at the moment when the source d3 is positive, this impulse being transmitted on the wire C via lead 15. This impulse has no effect on the common control circuit of the final selector, since its contact lfsb1 (Fig. 7) open, but it is applied to the tubes Voa . . . Voh (Fig. 14) in the register. According to the time unit (Fig. 14) in which said impulse is received, it will coincide with the impulses Rb, Rc and Ra1 applied through rectifiers to the resistances of the control electrodes of a particular pair of tubes Voa . . . Voh. In the case of a call to an isolated line, the tubes Voa, Voe controlling the operation of relays Oa, Oe are fired, and the corresponding relays pull up.

The relay OK (Fig. 13) is then energized through back contact ot5, back contact bu4, make contact dt2, back contact ph6, make contact oe4, make contact oa1.

The operation of relays Oa and Oe release the relay Or on account of the opening of the contacts oa3 and oe3 and relay Si (Fig. 14) is released on account of the opening of contact ok6. The opening of contact ok5 (Fig. 12) removes ground from the wire B, so that relay FA (Fig. 16) in the final selector completes the following holding circuit for itself; magnet HM, make contact fa4 and inlet wire E earthed.

As soon as the magnet HM has operated, it opens its back contact hm2, thus removing ground from the wire B of the final selector. The relay Ch (Fig. 12) had momentarily remained held, after the removal of earth at ok5 from the wire B, by the earth coming from the selector through said wire B, back contact hm2, magnet HM, make contact fa4, wire E and earth; it now releases, thus checking the complete operation of the magnet HM and the final selector.

The earth through the make contact dt4 (Fig. 12), make contact cs1, back contact ch1, make contact ok4, in the register and the wire D through the final selector (Fig. 16) now causes the energisation of the horizontal servo-magnet LFSHMA or LFSHMB (Fig. 7) in the common control circuit of the final selector, which has been connected to the wire D on account of the operation of one of the relays LFSD or LFSE (Fig. 8). The horizontal servo-magnet operates the horizontal bar.

If the magnet LFSHMA has been energised, the horizontal bar of the final selector in which the horizontal magnet HM has been previously energised, is actuated in a certain direction, towards the left, for example, while if the magnet LFSHMB has operated, the horizontal bar is actuated in the other direction, for example to the right.

The contacts A . . . E are actuated in order to make the connection to the desired line, and back contacts HB1 ... 4 of the selector circuit are also actuated in order completely to disconnect the individual circuit of said selector from the associated common control circuit.

The test relays T, Dt (Fig. 12) in the register return to normal. The relay Cs releases due to the opening of contact dt4 and that of contact HB1 (Fig. 16) in the final selector circuit, since the relay Cs is held through the following circuit: wire D, back contact HB1, make contact fa6, make contact hm1, make contact lfshma1 or lfshmb1, earth.

The relay DT produces at dt2 the release of the relay OK. The register controller is then completely released in the well known manner, the connection then being completed between the calling and desired lines in a manner which is equally well known.

When a line is engaged, the electrical condition characterising the availability of said line is replaced by an electrical condition characteristic of the busy condition. This is done by preventing the line-identifying, time unit impulses, which in the case of a free line, are supplied by one of the sources Pd4–Pd10, connected to the individual resistance Rg (Fig. 8), and occur during the time of that source, from reaching the amplifier tube SVA3 (Fig. 7), and by replacing these impulses by others, also identifying the line, but supplied by one of the sources Pd1 or Pd2, according to whether the line is engaged by a local call or by a toll call. In this case, the source Pd1 is connected (at a point not shown), to the D wire of the desired line by the cord circuit used in the existing connection, while the source Pd2 is connected (at a point not shown) to the D wire of the desired line, by the inlet circuit employed in the toll connection. A resistance Rhp in parallel with a rectifier Rcp' (Fig. 16) is inserted on the wire D of the final selector in series with this connection, as has been shown. Consequently, when the source Pd4 is relatively positive (−16 v.), the wire coming from the resistance Rg is maintained at a potential of −40 v., because this wire is connected through the wire D of the subscriber over another final selector circuit which has engaged the line to the source Pd1 or Pd2 which at this moment is at the potential of −40 v.; while the rectifier Rcp' inserted in the wire D of the final selector circuit has a low resistance under these conditions, the difference of potential existing between this wire (−40 v.) and the source Pd4 (−16 v.) is absorbed in the resistance Rg. In this way the line-identifying impulses during the time of the impulses Pd4–Pd10 will no longer be transmitted to the amplifier tube SVA3. Instead a line-identifying impulse will be sent during the time unit in which one of the two sources Pd1 or Pd2 is positive, according to whether it is the source Pd1 or Pd2 which is connected over the other circuit to the wire D of the subscriber. When this source is positive (that is in the time units 1 ... 120 for the source Pd1 and in the time units 121 ... 240 for the source Pd2), current will flow from this source connected to the other circuit through the resistance Rhp (Fig. 16) inserted in the D-wire of the other final selector circuit (rectifier Rcp' which is in parallel with resistance Rhp is not conductive under these conditions), and, thence to the subscriber's D wire and to the rectifiers ARCS, BRCS, CRCS of the common control circuit. When the gates associated with the line are all three conductive, which happens in one of the 120 time units characterising this line, the potential of the D wire and consequently that of the grid circuit of the amplifier tube, is modified, the tube SVA3 then causing the transmission of one impulse through the regenerator circuit which comprises the tube SVA1.

It will be noticed that, although the subscriber's D wire may now be at a potential of −16 v. during a period in which the source Pd4 is at −40 v., this source cannot influence the potential of the D wire owing to the fact that the rectifier Rcs in series with the resistance Rg is not conductive under these conditions.

When a busy single line is wanted, it is clear from the foregoing that no impulse will be transmitted for this line during the time unit in which Pd4 is at −16 v., but that an impulse will be sent while Pd1 or Pd2 is at −16 v.; when the line is engaged in a local call, the impulse will be sent while Pd1 is at −16 v., and when the line is toll busy, the impulse is sent while Pd2 is at −16 v. The impulse will be received in the register in the time unit following that in which the impulse is transmitted by the gate for the line concerned, according to the table of Fig. 19. The connections of the register are so arranged that the tube Vo2 (Fig. 14) is influenced by an impulse in a time unit determined among the 100 possible time units, independently of the periods 1 ... 120, 121 ... 240, 241 ... 360, 361 ... 480 in which the said time unit may occur. This time unit is determined in the register exclusively by the combination of the tens and units digits of the desired subscriber's number, as has been previously indicated.

Consequently, if the line is locally busy, the tube Vo2 of the register operates under the action of an impulse produced by the desired line during the period 1 ... 120; if the line is toll busy, the tube will operate when it receives impulses during the period 121 ... 240. In both cases, the register, responding to the impulse received, regenerates said impulse and sends it on through the C-wire to the common control circuit in accordance with a method previously described, thus producing the ionisation of the cold cathode tubes in the common control circuit, as has been explained; said tubes are in fact controlled by sources characterising the time units 1 ... 120 in an identical manner for any of the successive periods of 120 time units. The tube Vabu in the register (Fig. 14) is controlled by a rectifier Rcbu connected to the impulse source Rd1, in such a way that it can be ionised in any one of the 120 time units of the first period; when the register responds to an impulse in any time unit of the first period 1 ... 120, the tube Vabu is ionised, thus operating relay Bu and recording the local busy condition of the desired line. If an impulse arrives in any one of the time units 121 ... 240, a different tube (not shown), which is controlled by a rectifier connected to the source Rd2, is ionised and records the toll busy condition of the desired line.

In addition to these tubes, the tube Via at the register (Fig. 14), which is not controlled by a rectifier, is ionised in the same manner as for the call to a free line, in order to give the register a signal indicating that the selection is finished.

According to the selective signals which have been received by the cold cathode tubes in the common control circuit, this circuit will now signal to the register the class of the wanted line exactly in accordance with the same method as for a free line. As it has been assumed that the line concerned was a single line, the relays Oa and Oe are energised.

In the case in which the desired line is a PBX line of a group comprising lines with non-consecutive numbers (large PBX groups), the resistance Rg (Fig. 8) is connected to one of the sources Pd5 to Pd10, as indicated in the table headed "Distributor Connection for Class of Lines" (the insert to Fig. 8); this source will be brought to a potential of −16 v. in the corresponding period, so that an impulse will be sent in one of the 100 time units which characterise this line during the period determined by the source Pd which has been connected, provided that the line is free. If this is the case, the operation is exactly the same as that described for a free single line; in effect, when the register responds to an impulse during one of the periods corresponding to one of the sources Pd5 . . . Pd10, it produces in the register the ionisation of a cold cathode tube in order to indicate that the selection is completed exactly as was the impulse which had been received during the period corresponding to the source Pd4, because the register responds during any one of these periods to an impulse received in a time unit which characterises a combination of tens and units digits, thus causing ionisation of the tube Via during any one of these periods, this tube not being controlled by any source through a rectifier. Moreover, the cold cathode tubes of the common control circuit may operate exactly in the same manner during any period corresponding to the sources Pd, owing to the fact that they are controlled by sources which only characterise one individual time unit in a group of 120 time units.

The specific "class-of-line" indication, as it has been given for the line (PBX) has no influence on the operation, inasmuch the line has been found free.

PBX lines of this type (large group), while having their resistance Rg connected to one of the sources Pd5 . . . Pd10, are engaged or busied exactly according to the method already described for a single line, so that the impulses supplied by the sources connected through Rg are suppressed and impulses are supplied in their place by one of the sources Pd1 or Pd2 through the desired subscriber's D-wire.

Consequently, when a desired line of this type is busy, the operation is first of all exactly the same as for a busy single line, as has already been described, until the moment when the class-of-line indication is received.

With regard to those lines which do not correspond to the common call number of the group, i. e. lines other than the first line of a large group, the class-of-line indication is given as for a single line, and consequently the call is treated in the same way as for a busy single line; that part of the connection which has been completed is released, and a busy tone is sent to the calling subscriber, the common control circuit being restored to normal.

With regard to the line corresponding to the common calling number of the group, i. e. the first line, the class-of-line indication is one of those listed as "first line of the first group" (PBX), "first line of the second group" (PBX), etc.; in other words, an impulse will be sent in one of the time units 78, 84, 96, 102, 108 or 114 according to the group number (PBX).

When the register receives this class-of-line indication, it is set in such a manner that it has now to hunt for one of the other lines of the group. This is done in the following way:

Prior to the class-of-line signal, operation of the relay Si (Fig. 14) causes in the register, as before, the operation of the relay Ot (Fig. 13) through back contact or1, back contact cs5, and make contact si4. Relay T (Fig. 12) is now connected to the A wire and, through contact HB4 (Fig. 16), make contact fa5 in the final selector circuit, causes the operation of relay LFSC (Fig. 7) in the common control circuit. The double-test operation takes place and causes the energisation of relay Dt, followed by that of relay Cs.

The operation of contact ot6 and dt3 causes the release of all the class-of-line relays Oa . . . Oh. Relay Or (Fig. 13) pulls up, and opens its contact or1 in order to release relay Ot. The circuit of the tubes and relays characterising the classes of lines is also closed by the back contact ot6 (Fig. 14).

The control of the impulses received on the grids of tubes Va2, Va3 and Va4 is now modified. The grid of tube Va2 is connected to earth through make contact ch2 and make contact or2. The grid of tube Va3 is connected to source Pa1 through back contact ot4, make contact si3, and the grid of Va4 is connected to earth through make contact fs4, back contact ph1, make contact or3. Thus, there can be no impulse coincidence except during the transmission periods corresponding to the source Pa1, which are reserved for the class-of-line signals.

As may be seen on the table of Fig. 8, the impulse (time position No. 78) characterising the first line of the first group (PBX) operates relays Oc, Og. Relay Bu (Fig. 14) being energised, relay Ph (Fig. 13) is energised through make contact og1, make contact oc1, and make contact bu2; a holding circuit is completed through make contact ph2 and back contact lm1. The operation of contact ph5 (Fig. 14) restores tube Via and relay Si to normal and causes the connection of relay Si to tube Vib. Relay Bu releases its armature through the opening of contact ph4.

The controls on the grids of tubes Va2 . . . 4 are again modified. The source Pd5 is connected to Va2 through make contact og6, make contact ph3, make contact fs6, back contact or2 and make contact ch2. Sources Pa2 . . . 6 are connected in parallel to the tube Va3 through rectifiers, make contact ph6, make contact fs2, back contact si5 and back contact ot4. Tube Va4 is connected to earth through make contact fs4 and make contact ph1.

The register is now in condition to respond to line-identification impulses only during the time units which correspond to periods of emission of the sources Pa2 . . . 6, and to respond to the said impulses only when they occur during the periods of transmission of the sources Pd5.

The need for two differentiations for the groups (PBX) will now be apparent, since small groups with consecutive lines can be connected to Pd4, as are single lines. The transmission of line identification impulses during the different periods of emission of sources Pd5, Pd6 . . . at the moment of the first test operations, is of no significance and has not been recorded. The transmission of class-of-line impulses by means of sources Pa, Pb, Pc through one of the 20 class-of-line wires in the common control circuit has indicated the desired group (PBX). The recording of these impulses is employed to control another selection in the final selector for the lines of the desired group (PBX), said lines having all their identification impulses in the period Pd allocated to the group (PBX). Thus, the source Pd allocated to the group (PBX) is a criterion for the selection of a free line (PBX) other than the first. It is clear that during the selecting operation in the group (PBX) the register does not respond to the impulses which might arrive from the free single lines or from busy lines, owing to the fact that said impulses arrive during one of the periods respectively corresponding to time units 361 . . . 480 and 1 . . . 240; only the impulses coming from the free lines of the desired group (PBX) which transmit their impulses during the period in which the register can receive them, can act on this circuit, which occurs during the periods corresponding to time units 481 . . . 600 for the first group (PBX), 601 . . . 720 for the second group (PBX) etc.

When a revertive impulse arrives from the final selector on the grid of Va1 during the period Pd5, for example, an impulse is produced by Vo1 and returned to the common control circuit to record the identity of the selected line. The impulse produced also causes the operation of tube Vib and relay Si.

It will be seen that when relay Ph (Fig. 13) has been energised and has caused the release of relay Si, the circuit of the wire A has been opened at ph8 and ot1 and that consequently the relay LFSC of the common control circuit of the final selector is released.

The release of relay LFSC in the common control circuit then causes the release of relay LFSD or LFSE, which in turn releases the vertical magnet LFVM, so that the vertical bar which has been actuated returns to normal.

The relay LFSB (Fig. 7) of the common control circuit can then be re-energised through the back contact lfsc3, back contact lfsh1 via w20, make contact fa1 (Fig. 16), back contact HB3 and earth. Battery is connected to the tube SVA3 (Fig. 7) through make contact lfsb4, the circuit then again being brought into the condition in which impulses are supplied for each of the lines to the register circuit through the gates and the amplifying-and-regenerating stage.

In the case under consideration, the register will respond to the impulse sent by the common control circuit in any time unit in the period corresponding to the wanted group (PBX), that is to say, to the impulses coming from any free line having its resistance Rg connected to one of the sources Pd5 . . . corresponding to the wanted group, said register then being able to send an impulse in the period in which said source is positive.

When the register responds, it acts exactly as described for a call to a single free line, at the moment in which such a line sends an impulse to indicate its free condition, and the subsequent operations to complete the routing of the call are exactly the same as those already described.

It should be mentioned here that the class-of-line indication for the line of a group (PBX) of the type concerned, other than the first, will be that of a single line, that is to say, it will be characterised by the time unit No. 6.

A small group (PBX) having consecutive lines may be made up by providing, by means of jumpering, a class-of-line indication for all the lines except the last, the class-of-line wire being connected to the wire COL No. 12; these lines will then send an impulse in time unit No. 72 as class-of-line indication, while the last line of the group will be connected as a single line, that is, to the wire No. 1.

The resistances Rg of all the lines of this type of group (PBX) must be connected to the source Pd4, as though they were single lines.

When a call has to be routed to any free line of a group, the call will be completed exactly as indicated for a free single line, since the class-of-line indication has no influence on the routing of such call.

When calling any busy line of the group, except the last, the register receives the indication that said line is busy, exactly as previously described, after which the class-of-line indication will be signalled in the usual way. As this signalling is of the type indicating a small group (PBX), thus indicating that the next line in numerical order must be tested, the register, upon receiving this signal, sets itself and the common control circuit in the selecting position, as described for the type of group (PBX) comprising lines which are not consecutive, with this difference however, that the register is now set in a position enabling it to respond to the impulses corresponding to the line having a calling number following that of the previously selected line; consequently, this next line is now selected in accordance with the manner already described for a single line. If it is free, it is seized in a normal way; if it is busy, and if it is not the last line of the group, the operation of selecting the next line is repeated, this process continuing until a free line or the last line of the group is found. This last line is characterised by the fact that its class-of-line indication is that of a single line, so that if it also is busy, it will be treated as a busy single line.

In order to simplify the register circuit, the lines of the group of this type (PBX) must have calling numbers only differing in their units digit, so that in order to select a next line, if necessary, it is only required to change the marking corresponding to the units digit.

The detailed operations which take place in the register for this class of PBX line will now be explained.

When the indication characterising the condition of the selected line is received, the relay Bu (Fig. 14) is energised, as also the relay Si as previously described. The relay Ot Fig. 13) pulls up, as also the test relays T, Dt. The operation of Dt operates Cs. The opening of contacts ot6 and dt3 releases the class-of-line relays which were pulled up. Relay Or is energised, causing the release of relay Ot.

Contacts or2 and or3 connect the grids of the tubes Va2, Va4 to earth, and the contact si3 connects the grid of the tube Va3 to the source Pa1, so that the register, as before, is in the position for receiving a class-of-line indication. The sources Pa2 . . . 6 are disconnected at si5.

The class-of-line relays, which are energised when it is a question of a line (PBX) of the type in which the lines are consecutive, are Oc, Of (see in this connection the line category No. 12 in the table of Fig. 8). The relay Ph (Fig. 13) is energised through the following circuit: make contact of5, make contact oc1, make contact bu2. A holding circuit is then completed through make contact ph2 and back contact lm1.

In the present case, the relay Ia is also energised through make contacts oc6, of6, cs2. Relay Lm is slow acting and is in parallel with the relay I*a* and will only be energised shortly after said relay I*a*.

Relay I*a* causes the device which has recorded the units digit to advance one step. For example, if a single-motion register switch is employed of a well known type having 11 positions, the operation of the relay I*a* will complete a stepping circuit for the storing switch, said switch advancing one step in the well known manner. The translation of the recorded number made by well known cross-connecting arrangements will thus be modified and the source P*a* previously connected to back contact *ph*6 is disconnected in order to be replaced by the adjacent source. The opening of contact *ph*4 has released relay B*u* and the opening of contacts *bu*2 and *lm*1, has released relay P*h*.

The simultaneous opening of contacts *ot*1 and *ph*3 has released relays T, D*t* Fig. 12) in the register and relay LFSC (Fig. 7) in the common control circuit. Relay LFSB in the common control circuit is re-energised and applies battery to the cathode of tube SVA3. Revertive impulses are then sent in the register; in the latter the grids of the tubes V*a*2, V*a*3, V*a*4 are again respectively connected to the source P*c* through the make contact *ch*2, back contact *or*2, make contact *fs*6, back contact *ph*3; to the source P*a*, through back contact *ot*4, back contact *si*5, make contact *fs*2, back contact *ph*6; to the source P*b* through make contact *fs*4, back contact *ph*1, back contact *or*3. When the impulse from the next line is received, the same operations take place in the register as before, the successive lines of the PBX group will be tested in the manner previously indicated as far as the last, if necessary, which gives an indication identical with that of a single line, so that if the last line is busy, the register returns to normal and the connection is released.

In order to facilitate the understanding of the methods employed for the selection, it is now desirable to consider how the three elements contributing to the establishment of the communications act in cooperation. Their action is the same in all the selection stages, whether it is the calling subscriber or the wanted subscriber who is being hunted.

Figure 20:
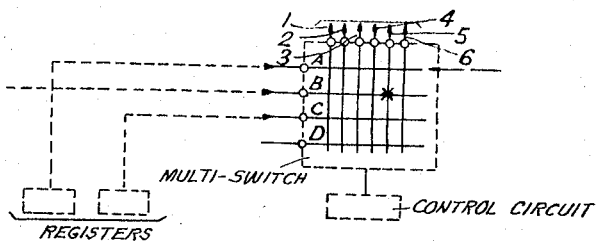
Fig. 20 shows schematically the three elements, multi-switch, common control circuit, register, which are employed in selecting a line in any selecting stage.

Fig. 20 shows schematically the three elements: multiswitch; common control circuit; register, which take part in the selection of a line in any stage of selection.

At a given moment, any multiswitch may comprise available electro-switches (such as D), electro-switches engaged in an existing call (such as B connected for example to the outlet No. 5) and electro-switch (such as A and C) each temporarily associated with a register and which have to be directed either on to a particular outlet (case of a line to a subscriber) or on to a line belonging to a particular group (case of a junction to another stage of selection, for example). It is in fact possible to make the common control circuit available simultaneously to several registers without any danger of reversing communications.

Figure 21:
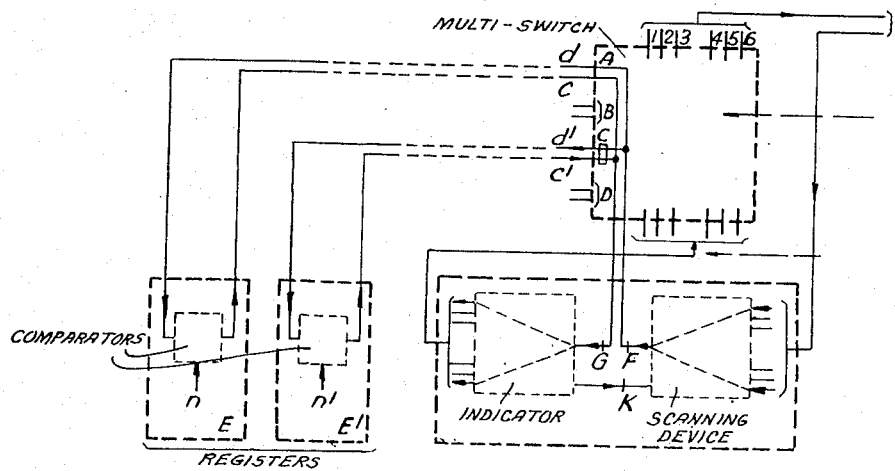
Fig. 21 shows how common control circuits may be made available to two or more registers at the same time.

Fig. 21 shows how a common control circuit may be made available to two (or more) registers at once.

The electro-switches and the lines connecting them comprise a certain number of wires. During the establishment of the communication, these wires serve to connect the register with the electro-switches successively introduced into the communication and the common control circuits which are temporarily associated therewith. Two of these wires (*c*, *d*) are shown in Fig. 21. Owing to the simultaneous association of the two registers E, E' with the same common control circuit, two wires *c* and two wires *d* are connected in parallel inside the multiswitch during the time of establishment of the connection in the latter. These two wires will serve for the checking and control of the connection.

The multiswitch is shown in Fig. 21. The scanning device and the indicator are contained in the common control circuit and the comparator is placed in the register. In the case of Fig. 21, there are two comparators associated with a scanning device and an indicator. The impulse characteristic of the condition required by each of the registers E and E' enters the comparator of these registers at the points *n* and *n'*.

Through the point F, the scanning device transmits the successive impulses which characterise the scanned lines. The impulses are transmitted by the wires *d*, *d'* to the comparators of the two registers E, E'. As soon as one of these comparators receives an impulse which coincides with the one which is received at the point *n* (or *n'*), an impulse is sent by the comparator on the wire *c* (or *c'*), and thus transmitted to the input G of the indicator.

The impulse received by the indicator causes the appearance of a potential on one of the control wires, the one corresponding to the line scanned. At the same time the incoming impulse, whatever its position in time, modifies the potential of the wire *k* which is connected to the output of the scanning device and which then blocks the transmission of any fresh impulse by the scanning device.

The result is that no other comparator than that which has operated can then operate. Moreover, the outgoing impulse of the comparator which has operated acts locally in the register of which it forms part in order to set up the remaining selection operations.

The connection of the line which has been found satisfactory by the register is not immediate, the register proceeds to one or even several other test operations. It may happen in fact, that the conditions required by the two registers are the same and that the characteristic impulse appears at the same moment on the points *n* and *n'*.

In such a case, the two registers send a simultaneous impulse on the wires *c* and *c'* and the two electroswitches can be connected on the same outlet.

It is then that the second test is made in order to make sure that two registers have not seized the same line. If only one comparator has operated, that of the register E for example, the connection of the electroswitch A to the selected line takes place and the wires *d* and *c* are cut off from the common control circuit. The scanning device of the latter is triggered off and returns impulses on the wire *d'* going to the register E'. When a scanned line satisfies the conditions required by this register, an impulse is sent on the wire *c'* to cause the operation of the indicator again.

If the two comparators have operated, the second test device acts in order to leave only one register in engagement with the selected line and to return the second to its original position (this operation is similar to that known as "double test" in systems in use). The first register controls the connection of the outgoing line; then the second in turn begins to hunt for another line as soon as the first is connected.

It should be noted that there is no mutual engagement of the common control circuit and the selectors (electro-switches), since the common control circuit is always simultaneously available to all the selectors. A calling subscriber who is slow to dial on the total busy state of a desired group of lines, cannot alter the handling of the other communications which reach the common control circuit through other electroswitches of the multiswitch. The common control circuit is never engaged by a communication longer than is necessary for the operation of the magnets of the multiswitch, that is to say, about 100 milliseconds.

What is claimed is:

1. An automatic telecommunication exchange comprising incoming substation lines, call detector equipment common to a group of substation lines, means associated with a group of incoming substation lines for generating electrical calling pulses for different time positions in a cycle of time positions, one time position being individually allocated to each substation line of a group, means in the call detector equipment for responding to any number of calling pulses in a cycle of time positions from a corresponding number of calling lines, and a group of non-numerical connecting equipments connected to said call detector equipment and adapted to extend each of a plurality of concurrently calling lines in turn under control of said call detector equipment, said call detector equipment comprising means for retransmitting the calling pulses of a calling line to the non-numerical connecting equipment, each said non-numerical connecting equipment including means to select an incoming line, in accordance with the position in the substation line group time cycle of a calling pulse transmitted thereto by a call detector circuit.

2. An automatic telecommunication exchange, as claimed in claim 1, in which the call detector equipment retransmitting means retransmits pulses corresponding to all simultaneously calling lines, and in which a non-numerical connecting equipment is arranged to respond to one of a plurality of calling line pulses transmitted thereto by the call detector equipment and to extend the corresponding calling line.

3. An automatic telecommunication exchange, as claimed in claim 2, and in which the call detector equipment is arranged to make connection in turn to a plurality of non-numerical equipments and to control the setting of the non-numerical equipments in turn by means of the calling pulses of a plurality of simultaneously-calling lines.

4. An automatic telecommunication exchange comprising incoming substation lines, call detector equipment common to a group of substation lines for detecting calls originating on substation lines of the group, single connecting means for connecting said substation lines with said call detector equipment, means in the call detector equipment for responding concurrently to information regarding the identities of a plurality of calling substation lines received over said single connecting means, a plurality of non-numerical connecting equipments adapted to extend each of a plurality of concurrently calling lines in turn under control of said detector equipment, register controllers connected with said non-numerical equipments, means for taking a register controller into use before the associated non-numerical equipment is set on to a calling line and including means for making connection from a call detector equipment to a free non-numerical equipment which has access to a free register controller or from a non-numerical equipment to a free call detector equipment which has access to a free register controller.

5. An automatic telecommunication exchange, as claimed in claim 4, in which the non-numerical equipment consists of cross-bar multi-switches, in which the call-detector equipment comprises cross-bar multi-switches for making connection between any one of a plurality of call-detector circuits and a free non-numerical equipment and in which the test circuit for a free non-numerical equipment passes through the non-numerical equipment to associated register-controllers, or passes through register controllers to associated non-numerical equipment.

6. An automatic telecommunication exchange comprising incoming substation lines, call detector equipment common to a group of said lines for detecting calls originating on lines of said group, a plurality of final selectors connected to said lines, a plurality of register controllers, means including a plurality of non-numerical equipments controlled by said call detector equipment for connecting a free register controller with a calling line, means controlled by said register controller for operating one of said final selectors to select a called line and connect said line through certain of said non-numerical equipments to said calling line, and means under control of said call detector equipment for suppressing the operation of said last-mentioned means with the initiation of a call by said called line.

7. An automatic telecommunication exchange, as claimed in claim 6, in which the call detector equipment for controlling direct connections from a line when calling and to a line when being called is responsive to electrical pulses in a cycle of time positions each of which positions identifies a different line in a group of lines, and in which the pulses used for controlling connection from a line, when that line is calling, and to the same line when the line is being called, are in substantially the same time position, but the calling line pulse is slightly in advance of the called line pulse, and in which means for responding to a called line pulse for controlling connection to a line comprise means for responding to the first pulse generated by the initiation of a call by the wanted line and means operated by said calling line pulse responsive means for preventing the corresponding but slightly later called line pulse from being effective.

8. An automatic telecommunication exchange, comprising register controllers and selector equipment including common control equipment and a plurality of selector switches associated therewith, circuit means for connecting a plurality of said register controllers in turn to one of said common control equipments, each of said connected register controllers to be used for setting up a different connection, and means for causing each register controller, as it becomes connected to a common control equipment, to initiate a selection control operation between said common control equipment and said register controller regardless of the stage of completion of the selection control operation of another register controller connected to said common control equipment.

9. An automatic telecommunication exchange, as claimed in claim 8, further comprising means for making a selection by cooperation of a common control equipment and any of a plurality of register controllers associated therewith, means under control of a common control equipment for blocking the operation of other simultaneously connected register controllers when a selection is made by said common control equipment in cooperation with one of a plurality of simultaneously connected register controllers, means for setting one of the associated individual selector switches in accordance with the selection made, and means for immediately releasing said blocking means so as to render operative said other connected register controllers for resuming selection control operations between the common control equipment and the remaining simultaneously connected register controllers after said individual selector switch has been set.

10. An automatic telecommunication exchange, as claimed in claim 8, and in which the common control equipment comprises means for sending revertive selection control signals back to the register controllers, each signal completely identifying a corresponding outlet from the associated individual selector switches.

11. An automatic telecommunication exchange, as claimed in claim 10, further comprising control signal sources associated with the common control equipment for transmitting to the selector switches a series of electrical pulses in successive time positions in a cycle of time positions, in which cycle each time position is characteristic of a single outlet.

12. An automatic telecommunication exchange, as claimed in claim 11, in which each register controller comprises means for detecting an electrical pulse having a predetermined time position and means for returning a pulse to the selector equipment at a moment having a predetermined time relation with the detected pulse, means in the selector equipment for responding to said returned pulse, including means for registering its time relation to the corresponding transmitted pulse, and means controlled by said returned pulse responding means for controlling the setting of an individual selector switch.

13. An automatic telecommunication exchange, as claimed in claim 12, further comprising means for suppressing further transmitted pulses under control of said returned pulse responding means and in which said predetermined time relation between a pulse detected by the register controller and the returned pulse is such that the pulse to be transmitted next after the detected pulse and subsequent pulses are suppressed.

14. An automatic telecommunication exchange, as claimed in claim 13, and in which the individual selector switches associated with a single common control equipment are the individual switches of a cross-bar multi-switch.

15. An automatic telecommunication exchange, as claimed in claim 8, and in which the individual selector switches associated with a single common control equipment are the individual switches of a cross-bar multi-switch.

16. An automatic telecommunication exchange, as claimed in claim 8, and in which the common control equipment comprises means for sending revertive selection control signals back to the register controllers, each signal completely identifying a corresponding outlet from the associated individual selector switches, said means comprising control signal sources associated with the common control equipment for transmitting a series of electrical pulses in successive time positions in a cycle of time positions, in which cycle each time position is characteristic of a single outlet, and further comprising a single signal channel, the electrical pulse sources comprising a plurality of stages of electrical gates in reverse tree formation between said outlets and said single signal channel, the stages of gates being controlled by electrical pulses from said sources, sources for producing one complete cycle being allocated to each stage, the different time pulses of a cycle being allocated to different gates of the same stage, and the cycles having a relation, such that taken together they determine a cycle having a number of pulse positions larger than any one of them.

17. An automatic telecommunication exchange, as claimed in claim 16, in which each register controller comprises means for detecting an electrical pulse having a predetermined time position and means for returning a pulse to the selector equipment at a moment having a predetermined time relation with the detected pulse, means in the selector equipment for responding to said returned pulse including means registering its time relation to the corresponding transmitted pulse, and means controlled by said returned pulse responding means for controlling the setting of an individual selector switch.

18. An automatic telecommunication exchange, as claimed in claim 8, in which each register controller comprises means for detecting an electrical pulse having a predetermined time position and means for returning a pulse to the selector equipment at a moment having a predetermined time relation with the detected pulse, means in the selector equipment for responding to said returned pulse including means for registering its time relation to the corresponding transmitted pulse, means controlled by said returned pulse responding means for controlling the setting of an individual selector switch, test equipment in each register controller for applying a test over a channel to the common control equipment after the register controller has detected a pulse, and means for causing the test equipment of only one register controller to operate after two or more register controllers respond to the same pulse and for causing the other or others of said responding register controllers to be automatically returned to the selection control condition to await further control operations in association with the common control equipment.

19. An automatic telecommunication exchange, as claimed in claim 18, further comprising means for suppressing further transmitted pulses under control of said returned pulse responding means, said means including means responsive to the predetermined time relation between a pulse detected by the register controller and the returned pulse for including the suppression of the pulse to be transmitted next after the detected pulse as well as subsequent pulses.

20. An automatic telecommunication exchange, comprising incoming substation lines, call detector equipment common to a group of substation lines for detecting calls originated on substation lines of the group, means in the call detector equipment for responding concurrently to information regarding the identities of a plurality of calling substation lines, a plurality of non-numerical connecting equipments adapted to extend each of a plurality of concurrently-calling lines in turn under control of said call detector equipment, register controllers and selector equipment including common control equipment and a plurality of selector switches, line finders, and final selectors, associated therewith, circuit means for connecting a plurality of said register controllers, in turn to one of said common control equipments, each of said connected register controllers to be used for setting up a different connection, means for causing each register controller, as it becomes connected to a common control circuit, to initiate a selection control operation between common control equipment and register controllers regardless of the stage of completion of the selection control operation of another register controller connected to said common control equipment.

21. An automatic telecommunication exchange, as claimed in claim 20, in which there is a common control equipment for the call detector circuits, a common control equipment for the line finders and final selectors, and a common control equipment for the register controllers, means for sending suppressor pulses corresponding to calling lines from a call detector circuit to a final selector common control equipment for the purpose of suppressing final selector operation in said final selector common control equipment, means for sending pulses characteristic of calling lines from a call detector circuit to a line finder common control equipment for controlling a line finder, and means for sending a return pulse from a line finder common control equipment to a call detector circuit to suppress further calling line pulses while setting of a line finder takes place, and means for transmitting line pulses from a call detector common control equipment to a register controller and suppressor pulses from a register controller to said call detector common control equipment when a line pulse has been selected, to prevent transmission of further line pulses while an individual final selector switch is set.

22. An automatic telecommunication exchange, as claimed in claim 21, in which the line finders and final selectors are individual switches in cross-bar multi-switches, each multi-switch having an individual common control equipment, in which each call detector circuit comprises an individual switch of a cross-bar multi-switch giving access to register controllers, in which each call detector multi-switch has an individual common control equipment, in which each register controller has an individual switch forming part of a cross-bar multi-switch giving access to conversational cord circuits between line finders and selectors, in which each register controller multi-switch has its own common control equipment, and in which the setting of an individual switch of a register controller cross-bar multi-switch is controlled from the call detector equipment.

23. An automatic telecommunication exchange, as claimed in claim 20, in which the line finders and final selectors are individual switches in cross-bar multi-switches, each multi-switch having an individual common control equipment, in which each call detector circuit comprises an individual switch of a cross-bar multi-switch giving access to register controllers, in which each call detector multi-switch has an individual common control equipment, in which each register controller has an individual switch forming part of a cross-bar multi-switch giving access to conversational cord circuits between line finders and selectors, in which each register controller multi-switch has its own common control equipment, and in which the setting of an individual switch of a register controller cross-bar multi-switch is controlled from the call detector equipment.

24. An automatic telecommunication exchange, as claimed in claim 23, in which the call detector switches give direct access to the cord circuits and further comprising means for testing the cord circuits for availability via circuits passing to the register controllers, whereby the availability of an associated register controller is also tested.

25. An automatic telecommunication exchange, as claimed in claim 24, in which the setting of the detector and register controller cross-bar multi-switches is also controlled by means of electrical time pulses.

26. An automatic telecommunication exchange comprising incoming substation lines, call detector equipment common to a group of said substation lines for detecting calls originating on substation lines of the group, single connecting means for connecting said substation means with said call detector equipment, means in said call detector equipment for responding concurrently to information regarding the identities of a plurality of calling substation lines received over said single connecting means, a plurality of non-numerical connecting equipments adapted to extend each of a plurality of concurrently calling lines in turn under control of said call detector equipment, register controllers connected with said non-numerical equipments, means for taking a register controller into use before the associated non-numerical equipment is set on to a calling line and including means for making connection from a call detector equipment to a free non-numerical equipment which has access to a free register controller or from a non-numerical equipment to a free call detector equipment which has access to a free register controller, and means for busying all non-numerical equipments having access to the same register controllers as the selected non-numerical equipment until a free register controller is individually connected up for use with the selected non-numerical equipment.

27. An automatic telecommunication exchange as claimed in claim 26, in which the non-numerical equipment consists of cross-bar multi-switches, in which the call detector equipment comprises cross-bar multi-switches for making connection between any one of a plurality of call detector circuits and a free non-numerical equipment, and in which the test circuit for a free non-numerical equipment passes through the non-numerical equipment to associated register controllers or passes through register controllers to associated non-numerical equipment.

28. An automatic telecommunication exchange, comprising register controllers and selector equipment including common control equipment and a plurality of selector switches associated therewith, circuit means for connecting a plurality of said register controllers in turn to one of said common control equipments, each of said connected register controllers to be used for setting up a different connection, means for causing each register controller, as it becomes connected to a common control equipment, to take part in a selection control operation between said common control equipment and said register controller regardless of the stage of completion of the selective control operation of another register controller connected to said common control equipment, means whereby a selection is made by cooperation of a common control equipment and any of a plurality of register controllers associated therewith, means under control of a common control equipment for blocking the operation of other simultaneously connected register controllers when a selection is made by said common control equipment in cooperation with one of a plurality of simultaneously connected register controllers, means for setting one of the associated individual selector switches in accordance with the selection made, means for immediately releasing said blocking means, so as to render operative said other connected register controllers for resuming selection control operations between the common control equipment and the remaining simultaneously connected register controllers after said individual switch has been set, and means in the register controllers for physically operating a part of a selector switch individual to the incoming path thereto in order to make connection to a selected outlet.

29. An automatic telecommunication exchange, as claimed in claim 28, in which a number of individual selector switches are included in a cross-bar multi-switch having an individual common control equipment and a common bar corresponding to a selected outlet and an individual bar corresponding to an incoming channel means under control of the control circuit for operating said common bar, and means under control of the register controller for operating said individual bar.

MARTINUS DEN HERTOG.

References Cited in the file of this patent

UNITED STATES PATENTS

| Number | Name | Date |
|---|---|---|
| 2,149,646 | Voss | Mar. 7, 1939 |
| 2,195,309 | Holden | Mar. 20, 1940 |
| 2,195,317 | Martin | Mar. 26, 1940 |
| 2,204,055 | Skellett | June 11, 1940 |
| 2,224,692 | Pearce | Dec. 10, 1940 |
| 2,242,776 | Clark | May 20, 1941 |
| 2,530,132 | Deloraine | Aug. 29, 1950 |
| 2,584,987 | Deloraine | Feb. 12, 1952 |